US010714095B2

(12) United States Patent
Orr et al.

(10) Patent No.: US 10,714,095 B2
(45) Date of Patent: Jul. 14, 2020

(54) INTELLIGENT ASSISTANT FOR HOME AUTOMATION

(71) Applicant: Apple Inc., Cupertino, CA (US)

(72) Inventors: Ryan M. Orr, La Honda, CA (US); Garett R. Nell, Seattle, WA (US); Benjamin L. Brumbaugh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/174,046

(22) Filed: Oct. 29, 2018

(65) Prior Publication Data

US 2019/0074015 A1 Mar. 7, 2019

Related U.S. Application Data

(63) Continuation of application No. 14/503,105, filed on Sep. 30, 2014, now Pat. No. 10,170,123.

(Continued)

(51) Int. Cl.

*G10L 17/22* (2013.01)
*G05B 15/02* (2006.01)

(Continued)

(52) U.S. Cl.

CPC .............. *G10L 17/22* (2013.01); *G05B 15/02* (2013.01); *G06F 3/167* (2013.01); *H04L 12/282* (2013.01);

(Continued)

(58) Field of Classification Search

CPC ....... G10L 17/22; G06F 3/167; H04L 12/282; H04L 12/2816; G05B 15/02;

(Continued)

(56) References Cited

U.S. PATENT DOCUMENTS 6,400,996 B1 6/2002 Hoffberg et al.
7,315,809 B2 1/2008 Xun (Continued)

FOREIGN PATENT DOCUMENTS

AU 2015203483 A1 7/2015
CA 2694314 A1 8/2010

(Continued)

OTHER PUBLICATIONS

Machine translation for JP 2011-250027 (Year: 2011).*

(Continued)

*Primary Examiner* — Qian Yang
(74) *Attorney, Agent, or Firm* — Dentons US LLP

(57) ABSTRACT

This relates to systems and processes for using a virtual assistant to control electronic devices. In one example process, a user can speak an input in natural language form to a user device to control one or more electronic devices. The user device can transmit the user speech to a server to be converted into a textual representation. The server can identify the one or more electronic devices and appropriate commands to be performed by the one or more electronic devices based on the textual representation. The identified one or more devices and commands to be performed can be transmitted back to the user device, which can forward the commands to the appropriate one or more electronic devices for execution. In response to receiving the commands, the one or more electronic devices can perform the commands and transmit their current states to the user device.

39 Claims, 15 Drawing Sheets

Related U.S. Application Data

(60) Provisional application No. 62/005,893, filed on May 30, 2014.

(51) Int. Cl.
*H04L 12/28* (2006.01)
*G06F 3/16* (2006.01)

(52) U.S. Cl.
CPC .................... *H04L 12/2816* (2013.01); *G05B 2219/23373* (2013.01); *G05B 2219/23386* (2013.01); *G05B 2219/2642* (2013.01)

(58) Field of Classification Search
CPC ........... G05B 2219/23386; G05B 2219/23373; G05B 2219/2642; G05B 19/418
See application file for complete search history.

(56) References Cited

U.S. PATENT DOCUMENTS 7,315,818 B2 1/2008 Stevens et al.
7,318,020 B1 1/2008 Kim
7,319,957 B2 1/2008 Robinson et al.
7,321,783 B2 1/2008 Kim, II
7,322,023 B2 1/2008 Shulman et al.
7,324,833 B2 1/2008 White et al.
7,324,947 B2 1/2008 Jordan et al.
7,328,155 B2 2/2008 Endo et al.
7,328,250 B2 2/2008 Wang et al.
7,333,998 B2 2/2008 Heckerman et al.
7,337,108 B2 2/2008 Florencio et al.
7,345,670 B2 3/2008 Armstrong
7,345,671 B2 3/2008 Robbin et al.
7,349,953 B2 3/2008 Lisitsa et al.
7,353,139 B1 4/2008 Burrell et al.
7,356,748 B2 4/2008 Taleb
7,359,493 B1 4/2008 Wang et al.
7,359,671 B2 4/2008 Richenstein et al.
7,359,851 B2 4/2008 Tong et al.
7,360,158 B1 4/2008 Beeman
7,362,738 B2 4/2008 Taube et al.
7,363,227 B2 4/2008 Mapes-Riordan et al.
7,363,586 B1 4/2008 Briggs et al.
7,365,260 B2 4/2008 Kawashima
7,366,461 B1 4/2008 Brown
7,369,984 B2 5/2008 Fairweather
7,369,993 B1 5/2008 Atal
7,373,291 B2 5/2008 Garst
7,373,612 B2 5/2008 Risch et al.
7,376,556 B2 5/2008 Bennett
7,376,632 B1 5/2008 Sadek et al.
7,376,645 B2 5/2008 Bernard
7,378,963 B1 5/2008 Begault et al.
7,379,874 B2 5/2008 Schmid et al.
7,380,203 B2 5/2008 Keely et al.
7,383,170 B2 6/2008 Mills et al.
7,386,110 B2 6/2008 Petrunka et al.
7,386,438 B1 6/2008 Franz et al.
7,386,449 B2 6/2008 Sun et al.
7,386,799 B1 6/2008 Clanton et al.
7,389,224 B1 6/2008 Elworthy
7,389,225 B1 6/2008 Jensen et al.
7,392,185 B2 6/2008 Bennett
7,394,947 B2 7/2008 Li et al.
7,398,209 B2 7/2008 Kennewick et al.
7,401,300 B2 7/2008 Nurmi
7,403,938 B2 7/2008 Harrison et al.
7,403,941 B2 7/2008 Bedworth et al.
7,404,143 B2 7/2008 Freelander et al.
7,409,337 B1 8/2008 Potter et al.
7,409,347 B1 8/2008 Bellegarda
7,412,389 B2 8/2008 Yang
7,412,470 B2 8/2008 Masuno et al.
7,415,100 B2 8/2008 Cooper et al.
7,415,469 B2 8/2008 Singh et al.
7,418,382 B1 8/2008 Maes
7,418,389 B2 8/2008 Chu et al.
7,418,392 B1 8/2008 Mozer et al.
7,426,467 B2 9/2008 Nashida et al.
7,426,468 B2 9/2008 Coifman et al.
7,427,024 B1 9/2008 Gazdzinski et al.
7,428,541 B2 9/2008 Houle
7,430,508 B2 9/2008 Williamson et al.
7,433,869 B2 10/2008 Gollapudi
7,433,921 B2 10/2008 Ludwig et al.
7,436,947 B2 10/2008 Wadler et al.
7,441,184 B2 10/2008 Frerebeau et al.
7,443,316 B2 10/2008 Lim
7,444,589 B2 10/2008 Zellner
7,447,360 B2 11/2008 Li et al.
7,447,624 B2 11/2008 Fuhrmann et al.
7,447,635 B1 11/2008 Konopka et al.
7,447,637 B1 11/2008 Grant et al.
7,451,081 B1 11/2008 Gajic et al.
7,454,351 B2 11/2008 Jeschke et al.
7,460,652 B2 12/2008 Chang
7,461,043 B2 12/2008 Hess
7,467,087 B1 12/2008 Gillick et al.
7,467,164 B2 12/2008 Marsh
7,472,061 B1 12/2008 Alewine et al.
7,472,065 B2 12/2008 Aaron et al.
7,475,010 B2 1/2009 Chao
7,475,015 B2 1/2009 Epstein et al.
7,475,063 B2 1/2009 Datta et al.
7,477,238 B2 1/2009 Fux et al.
7,477,240 B2 1/2009 Yanagisawa
7,478,037 B2 1/2009 Strong
7,478,091 B2 1/2009 Mojsilovic et al.
7,478,129 B1 1/2009 Chemtob
7,479,948 B2 1/2009 Kim et al.
7,479,949 B2 1/2009 Jobs et al.
7,483,832 B2 1/2009 Tischer
7,483,894 B2 1/2009 Cao
7,487,089 B2 2/2009 Mozer
7,487,093 B2 2/2009 Mutsuno et al.
7,490,034 B2 2/2009 Finnigan et al.
7,490,039 B1 2/2009 Shaffer et al.
7,493,251 B2 2/2009 Gao et al.
7,493,560 B1 2/2009 Kipnes et al.
7,496,498 B2 2/2009 Chu et al.
7,496,512 B2 2/2009 Zhao et al.
7,499,923 B2 3/2009 Kawatani
7,502,738 B2 3/2009 Kennewick et al.
7,505,795 B1 3/2009 Lim et al.
7,508,324 B2 3/2009 Suraqui
7,508,373 B2 3/2009 Lin et al.
7,516,123 B2 4/2009 Betz et al.
7,519,327 B2 4/2009 White
7,519,398 B2 4/2009 Hirose
7,522,927 B2 4/2009 Fitch et al.
7,523,036 B2 4/2009 Akabane et al.
7,523,108 B2 4/2009 Cao
7,526,466 B2 4/2009 Au
7,526,738 B2 4/2009 Ording et al.
7,528,713 B2 5/2009 Singh et al.
7,529,671 B2 5/2009 Rockenbeck et al.
7,529,676 B2 5/2009 Koyama
7,535,997 B1 5/2009 McQuaide, Jr. et al.
7,536,029 B2 5/2009 Choi et al.
7,536,565 B2 5/2009 Girish et al.
7,538,685 B1 5/2009 Cooper et al.
7,539,619 B1 5/2009 Seligman et al.
7,539,656 B2 5/2009 Fratkina et al.
7,541,940 B2 6/2009 Upton
7,542,967 B2 6/2009 Hurst-Hiller et al.
7,542,971 B2 6/2009 Thione et al.
7,543,232 B2 6/2009 Easton, Jr. et al.
7,546,382 B2 6/2009 Healey et al.
7,546,529 B2 6/2009 Reynar et al.
7,548,895 B2 6/2009 Pulsipher
7,552,045 B2 6/2009 Barliga et al.
7,552,055 B2 6/2009 Lecoeuche
7,555,431 B2 6/2009 Bennett
7,555,496 B1 6/2009 Lantrip et al.

(56) References Cited

U.S. PATENT DOCUMENTS

| | | | |
|---|---|---|---|
| 7,558,381 | B1 | 7/2009 | Ali et al. |
| 7,558,730 | B2 | 7/2009 | Davis et al. |
| 7,559,026 | B2 | 7/2009 | Girish et al. |
| 7,561,069 | B2 | 7/2009 | Horstemeyer |
| 7,562,007 | B2 | 7/2009 | Hwang |
| 7,562,032 | B2 | 7/2009 | Abbosh et al. |
| 7,565,104 | B1 | 7/2009 | Brown et al. |
| 7,565,380 | B1 | 7/2009 | Venkatachary |
| 7,568,151 | B2 | 7/2009 | Bergeron et al. |
| 7,571,092 | B1 | 8/2009 | Nieh |
| 7,571,106 | B2 | 8/2009 | Cao et al. |
| 7,577,522 | B2 | 8/2009 | Rosenberg |
| 7,580,551 | B1 | 8/2009 | Srihari et al. |
| 7,580,576 | B2 | 8/2009 | Wang et al. |
| 7,580,839 | B2 | 8/2009 | Tamura et al. |
| 7,584,092 | B2 | 9/2009 | Brockett et al. |
| 7,584,093 | B2 | 9/2009 | Potter et al. |
| 7,584,278 | B2 | 9/2009 | Rajarajan et al. |
| 7,584,429 | B2 | 9/2009 | Fabritius |
| 7,593,868 | B2 | 9/2009 | Margiloff et al. |
| 7,596,269 | B2 | 9/2009 | King et al. |
| 7,596,499 | B2 | 9/2009 | Anguera et al. |
| 7,596,606 | B2 | 9/2009 | Codignotto |
| 7,596,765 | B2 | 9/2009 | Almas |
| 7,599,918 | B2 | 10/2009 | Shen et al. |
| 7,603,349 | B1 | 10/2009 | Kraft et al. |
| 7,603,381 | B2 | 10/2009 | Burke et al. |
| 7,606,444 | B1 | 10/2009 | Erol et al. |
| 7,606,712 | B1 | 10/2009 | Smith et al. |
| 7,607,083 | B2 | 10/2009 | Gong et al. |
| 7,609,179 | B2 | 10/2009 | Diaz-Gutierrez et al. |
| 7,610,258 | B2 | 10/2009 | Yuknewicz et al. |
| 7,613,264 | B2 | 11/2009 | Wells et al. |
| 7,614,008 | B2 | 11/2009 | Ording |
| 7,617,094 | B2 | 11/2009 | Aoki et al. |
| 7,620,407 | B1 | 11/2009 | Donald et al. |
| 7,620,549 | B2 | 11/2009 | Di Cristo et al. |
| 7,620,894 | B1 | 11/2009 | Kahn |
| 7,623,119 | B2 | 11/2009 | Autio et al. |
| 7,624,007 | B2 | 11/2009 | Bennett |
| 7,627,481 | B1 | 12/2009 | Kuo et al. |
| 7,630,900 | B1 | 12/2009 | Strom |
| 7,630,901 | B2 | 12/2009 | Omi |
| 7,633,076 | B2 | 12/2009 | Huppi et al. |
| 7,634,409 | B2 | 12/2009 | Kennewick et al. |
| 7,634,413 | B1 | 12/2009 | Kuo et al. |
| 7,634,718 | B2 | 12/2009 | Nakajima |
| 7,634,732 | B1 | 12/2009 | Blagsvedt et al. |
| 7,636,657 | B2 | 12/2009 | Ju et al. |
| 7,640,158 | B2 | 12/2009 | Detlef et al. |
| 7,640,160 | B2 | 12/2009 | Di Cristo et al. |
| 7,643,990 | B1 | 1/2010 | Bellegarda |
| 7,647,225 | B2 | 1/2010 | Bennett et al. |
| 7,649,454 | B2 | 1/2010 | Singh et al. |
| 7,649,877 | B2 | 1/2010 | Vieri et al. |
| 7,653,883 | B2 | 1/2010 | Hotelling et al. |
| 7,656,393 | B2 | 2/2010 | King et al. |
| 7,657,424 | B2 | 2/2010 | Bennett |
| 7,657,828 | B2 | 2/2010 | Lucas et al. |
| 7,657,844 | B2 | 2/2010 | Gibson et al. |
| 7,657,849 | B2 | 2/2010 | Chaudhri et al. |
| 7,660,715 | B1 | 2/2010 | Thambiratnam |
| 7,663,607 | B2 | 2/2010 | Hotelling et al. |
| 7,664,558 | B2 | 2/2010 | Lindahl et al. |
| 7,664,638 | B2 | 2/2010 | Cooper et al. |
| 7,668,710 | B2 | 2/2010 | Doyle |
| 7,669,134 | B1 | 2/2010 | Christie et al. |
| 7,672,841 | B2 | 3/2010 | Bennett |
| 7,672,952 | B2 | 3/2010 | Isaacson et al. |
| 7,673,238 | B2 | 3/2010 | Girish et al. |
| 7,673,251 | B1 | 3/2010 | Wibisono |
| 7,673,340 | B1 | 3/2010 | Cohen et al. |
| 7,676,026 | B1 | 3/2010 | Baxter, Jr. |
| 7,676,365 | B2 | 3/2010 | Hwang et al. |
| 7,676,463 | B2 | 3/2010 | Thompson et al. |
| 7,679,534 | B2 | 3/2010 | Kay et al. |
| 7,680,649 | B2 | 3/2010 | Park |
| 7,681,126 | B2 | 3/2010 | Roose |
| 7,683,886 | B2 | 3/2010 | Willey |
| 7,683,893 | B2 | 3/2010 | Kim |
| 7,684,985 | B2 | 3/2010 | Dominach et al. |
| 7,684,990 | B2 | 3/2010 | Caskey et al. |
| 7,684,991 | B2 | 3/2010 | Stohr et al. |
| 7,689,245 | B2 | 3/2010 | Cox et al. |
| 7,689,408 | B2 | 3/2010 | Chen et al. |
| 7,689,409 | B2 | 3/2010 | Heinecke |
| 7,689,412 | B2 | 3/2010 | Wu et al. |
| 7,689,421 | B2 | 3/2010 | Li et al. |
| 7,693,715 | B2 | 4/2010 | Hwang et al. |
| 7,693,717 | B2 | 4/2010 | Kahn et al. |
| 7,693,719 | B2 | 4/2010 | Chu et al. |
| 7,693,720 | B2 | 4/2010 | Kennewick et al. |
| 7,698,131 | B2 | 4/2010 | Bennett |
| 7,702,500 | B2 | 4/2010 | Blaedow |
| 7,702,508 | B2 | 4/2010 | Bennett |
| 7,703,091 | B1 | 4/2010 | Martin et al. |
| 7,706,510 | B2 | 4/2010 | Ng |
| 7,707,026 | B2 | 4/2010 | Liu |
| 7,707,027 | B2 | 4/2010 | Balchandran et al. |
| 7,707,032 | B2 | 4/2010 | Wang et al. |
| 7,707,221 | B1 | 4/2010 | Dunning et al. |
| 7,707,226 | B1 | 4/2010 | Tonse |
| 7,707,267 | B2 | 4/2010 | Lisitsa et al. |
| 7,710,262 | B2 | 5/2010 | Ruha |
| 7,711,129 | B2 | 5/2010 | Lindahl et al. |
| 7,711,550 | B1 | 5/2010 | Feinberg et al. |
| 7,711,565 | B1 | 5/2010 | Gazdzinski |
| 7,711,672 | B2 | 5/2010 | Au |
| 7,712,053 | B2 | 5/2010 | Bradford et al. |
| 7,716,056 | B2 | 5/2010 | Weng et al. |
| 7,716,216 | B1 | 5/2010 | Harik et al. |
| 7,720,674 | B2 | 5/2010 | Kaiser et al. |
| 7,720,683 | B1 | 5/2010 | Vermeulen et al. |
| 7,721,226 | B2 | 5/2010 | Barabe et al. |
| 7,721,301 | B2 | 5/2010 | Wong et al. |
| 7,724,242 | B2 | 5/2010 | Hillis et al. |
| 7,724,696 | B1 | 5/2010 | Parekh |
| 7,725,307 | B2 | 5/2010 | Bennett |
| 7,725,318 | B2 | 5/2010 | Gavalda et al. |
| 7,725,320 | B2 | 5/2010 | Bennett |
| 7,725,321 | B2 | 5/2010 | Bennett |
| 7,725,838 | B2 | 5/2010 | Williams |
| 7,729,904 | B2 | 6/2010 | Bennett |
| 7,729,916 | B2 | 6/2010 | Coffman et al. |
| 7,734,461 | B2 | 6/2010 | Kwak et al. |
| 7,735,012 | B2 | 6/2010 | Naik |
| 7,739,588 | B2 | 6/2010 | Reynar et al. |
| 7,742,953 | B2 | 6/2010 | King et al. |
| 7,743,188 | B2 | 6/2010 | Haitani et al. |
| 7,747,616 | B2 | 6/2010 | Yamada et al. |
| 7,752,152 | B2 | 7/2010 | Paek et al. |
| 7,756,707 | B2 | 7/2010 | Garner et al. |
| 7,756,708 | B2 | 7/2010 | Cohen et al. |
| 7,756,868 | B2 | 7/2010 | Lee |
| 7,756,871 | B2 | 7/2010 | Yacoub et al. |
| 7,757,173 | B2 | 7/2010 | Beaman |
| 7,757,182 | B2 | 7/2010 | Elliott et al. |
| 7,761,296 | B1 | 7/2010 | Bakis et al. |
| 7,763,842 | B2 | 7/2010 | Hsu et al. |
| 7,774,202 | B2 | 8/2010 | Spengler et al. |
| 7,774,204 | B2 | 8/2010 | Mozer et al. |
| 7,774,388 | B1 | 8/2010 | Runchey |
| 7,777,717 | B2 | 8/2010 | Fux et al. |
| 7,778,432 | B2 | 8/2010 | Larsen |
| 7,778,595 | B2 | 8/2010 | White et al. |
| 7,778,632 | B2 | 8/2010 | Kurlander et al. |
| 7,778,830 | B2 | 8/2010 | Davis et al. |
| 7,779,353 | B2 | 8/2010 | Grigoriu et al. |
| 7,779,356 | B2 | 8/2010 | Griesmer |
| 7,779,357 | B2 | 8/2010 | Naik |
| 7,783,283 | B2 | 8/2010 | Kuusinen et al. |
| 7,783,486 | B2 | 8/2010 | Rosser et al. |
| 7,788,590 | B2 | 8/2010 | Taboada et al. |
| 7,788,663 | B2 | 8/2010 | Illowsky et al. |

(56) References Cited

U.S. PATENT DOCUMENTS 7,796,980 B1 9/2010 McKinney et al.
7,797,265 B2 9/2010 Brinker et al.
7,797,269 B2 9/2010 Rieman et al.
7,797,331 B2 9/2010 Theimer et al.
7,797,629 B2 9/2010 Fux et al.
7,801,721 B2 9/2010 Rosart et al.
7,801,728 B2 9/2010 Ben-David et al.
7,801,729 B2 9/2010 Mozer
7,805,299 B2 9/2010 Coifman
7,809,550 B1 10/2010 Barrows
7,809,565 B2 10/2010 Coifman
7,809,569 B2 10/2010 Attwater et al.
7,809,570 B2 10/2010 Kennewick et al.
7,809,610 B2 10/2010 Cao
7,809,744 B2 10/2010 Nevidomski et al.
7,818,165 B2 10/2010 Carlgren et al.
7,818,176 B2 10/2010 Freeman et al.
7,818,215 B2 10/2010 King et al.
7,818,291 B2 10/2010 Ferguson et al.
7,818,672 B2 10/2010 Mccormack et al.
7,822,608 B2 10/2010 Cross, Jr. et al.
7,823,123 B2 10/2010 Sabbouh
7,826,945 B2 11/2010 Zhang et al.
7,827,047 B2 11/2010 Anderson et al.
7,831,246 B1 11/2010 Smith et al.
7,831,423 B2 11/2010 Schubert
7,831,426 B2 11/2010 Bennett
7,831,432 B2 11/2010 Bodin et al.
7,835,504 B1 11/2010 Donald et al.
7,836,437 B2 11/2010 Kacmarcik et al.
7,840,348 B2 11/2010 Kim et al.
7,840,400 B2 11/2010 Lavi et al.
7,840,447 B2 11/2010 Kleinrock et al.
7,840,581 B2 11/2010 Ross et al.
7,840,912 B2 11/2010 Elias et al.
7,844,394 B2 11/2010 Kim
7,848,924 B2 12/2010 Nurminen et al.
7,848,926 B2 12/2010 Goto et al.
7,853,444 B2 12/2010 Wang et al.
7,853,445 B2 12/2010 Bachenko et al.
7,853,574 B2 12/2010 Kraenzel et al.
7,853,577 B2 12/2010 Sundaresan et al.
7,853,664 B1 12/2010 Wang et al.
7,853,900 B2 12/2010 Nguyen et al.
7,865,817 B2 1/2011 Ryan et al.
7,869,998 B1 1/2011 Di Fabbrizio et al.
7,869,999 B2 1/2011 Amato et al.
7,870,118 B2 1/2011 Jiang et al.
7,870,133 B2 1/2011 Krishnamoorthy et al.
7,873,149 B2 1/2011 Schultz et al.
7,873,519 B2 1/2011 Bennett
7,873,654 B2 1/2011 Bernard
7,877,705 B2 1/2011 Chambers et al.
7,880,730 B2 2/2011 Robinson et al.
7,881,283 B2 2/2011 Cormier et al.
7,881,936 B2 2/2011 Longe et al.
7,885,390 B2 2/2011 Chaudhuri et al.
7,885,844 B1 2/2011 Cohen et al.
7,886,233 B2 2/2011 Rainisto et al.
7,889,101 B2 2/2011 Yokota
7,889,184 B2 2/2011 Blumenberg et al.
7,889,185 B2 2/2011 Blumenberg et al.
7,890,330 B2 2/2011 Ozkaragoz et al.
7,890,652 B2 2/2011 Bull et al.
7,895,039 B2 2/2011 Braho et al.
7,895,531 B2 2/2011 Radtke et al.
7,899,666 B2 3/2011 Varone
7,904,297 B2 3/2011 Mirkovic et al.
7,908,287 B1 3/2011 Katragadda
7,912,289 B2 3/2011 Kansal et al.
7,912,699 B1 3/2011 Saraclar et al.
7,912,702 B2 3/2011 Bennett
7,912,720 B1 3/2011 Hakkani-Tur et al.
7,912,828 B2 3/2011 Bonnet et al.
7,913,185 B1 3/2011 Benson et al.
7,916,979 B2 3/2011 Simmons
7,917,367 B2 3/2011 Di Cristo et al.
7,917,497 B2 3/2011 Harrison et al.
7,920,678 B2 4/2011 Cooper et al.
7,920,682 B2 4/2011 Byrne et al.
7,920,857 B2 4/2011 Lau et al.
7,925,525 B2 4/2011 Chin
7,925,610 B2 4/2011 Elbaz et al.
7,929,805 B2 4/2011 Wang et al.
7,930,168 B2 4/2011 Weng et al.
7,930,183 B2 4/2011 Odell et al.
7,930,197 B2 4/2011 Ozzie et al.
7,936,339 B2 5/2011 Marggraff et al.
7,936,861 B2 5/2011 Martin et al.
7,936,863 B2 5/2011 John et al.
7,937,075 B2 5/2011 Zellner
7,941,009 B2 5/2011 Li et al.
7,945,294 B2 5/2011 Zhang et al.
7,945,470 B1 5/2011 Cohen et al.
7,949,529 B2 5/2011 Weider et al.
7,949,534 B2 5/2011 Davis et al.
7,949,752 B2 5/2011 Lange et al.
7,953,679 B2 5/2011 Chidlovskii et al.
7,957,975 B2 6/2011 Burns et al.
7,958,136 B1 6/2011 Curtis et al.
7,962,179 B2 6/2011 Huang
7,974,835 B2 7/2011 Balchandran et al.
7,974,844 B2 7/2011 Sumita
7,974,972 B2 7/2011 Cao
7,975,216 B2 7/2011 Woolf et al.
7,983,478 B2 7/2011 Liu et al.
7,983,915 B2 7/2011 Knight et al.
7,983,917 B2 7/2011 Kennewick et al.
7,983,919 B2 7/2011 Conkie
7,983,997 B2 7/2011 Allen et al.
7,984,062 B2 7/2011 Dunning et al.
7,986,431 B2 7/2011 Emori et al.
7,987,151 B2 7/2011 Schott et al.
7,987,244 B1 7/2011 Lewis et al.
7,991,614 B2 8/2011 Washio et al.
7,992,085 B2 8/2011 Wang-Aryattanwanich et al.
7,996,228 B2 8/2011 Miller et al.
7,996,589 B2 8/2011 Schultz et al.
7,996,769 B2 8/2011 Fux et al.
7,996,792 B2 8/2011 Anzures et al.
7,999,669 B2 8/2011 Singh et al.
8,000,453 B2 8/2011 Cooper et al.
8,005,664 B2 8/2011 Hanumanthappa
8,005,679 B2 8/2011 Jordan et al.
8,006,180 B2 8/2011 Tunning et al.
8,014,308 B2 9/2011 Gates et al.
8,015,006 B2 9/2011 Kennewick et al.
8,015,011 B2 9/2011 Nagano et al.
8,015,144 B2 9/2011 Zheng et al.
8,018,431 B1 9/2011 Zehr et al.
8,019,271 B1 9/2011 Izdepski
8,019,604 B2 9/2011 Ma
8,020,104 B2 9/2011 Robarts et al.
8,024,195 B2 9/2011 Mozer et al.
8,024,415 B2 9/2011 Horvitz et al.
8,027,836 B2 9/2011 Baker et al.
8,031,943 B2 10/2011 Chen et al.
8,032,383 B1 10/2011 Bhardwaj et al.
8,036,901 B2 10/2011 Mozer
8,037,034 B2 10/2011 Plachta et al.
8,041,557 B2 10/2011 Liu
8,041,570 B2 10/2011 Mirkovic et al.
8,041,611 B2 10/2011 Kleinrock et al.
8,042,053 B2 10/2011 Darwish et al.
8,046,363 B2 10/2011 Cha et al.
8,046,374 B1 10/2011 Bromwich et al.
8,050,500 B1 11/2011 Batty et al.
8,054,180 B1 11/2011 Scofield et al.
8,055,502 B2 11/2011 Clark et al.
8,055,708 B2 11/2011 Chitsaz et al.
8,056,070 B2 11/2011 Goller et al.
8,060,824 B2 11/2011 Brownrigg, Jr. et al.
8,064,753 B2 11/2011 Freeman
8,065,143 B2 11/2011 Yanagihara

(56) References Cited

U.S. PATENT DOCUMENTS 8,065,155 B1 11/2011 Gazdzinski
8,065,156 B2 11/2011 Gazdzinski
8,068,604 B2 11/2011 Leeds et al.
8,069,046 B2 11/2011 Kennewick et al.
8,069,422 B2 11/2011 Sheshagiri et al.
8,073,681 B2 12/2011 Baldwin et al.
8,073,695 B1 12/2011 Hendricks et al.
8,077,153 B2 12/2011 Benko et al.
8,078,473 B1 12/2011 Gazdzinski
8,082,153 B2 12/2011 Coffman et al.
8,082,498 B2 12/2011 Salamon et al.
8,090,571 B2 1/2012 Elshishiny et al.
8,095,364 B2 1/2012 Longe et al.
8,099,289 B2 1/2012 Mozer et al.
8,099,395 B2 1/2012 Pabla et al.
8,099,418 B2 1/2012 Inoue et al.
8,103,510 B2 1/2012 Sato
8,107,401 B2 1/2012 John et al.
8,112,275 B2 2/2012 Kennewick et al.
8,112,280 B2 2/2012 Lu
8,117,037 B2 2/2012 Gazdzinski
8,117,542 B2 2/2012 Radtke et al.
8,121,413 B2 2/2012 Hwang et al.
8,121,837 B2 2/2012 Agapi et al.
8,122,094 B1 2/2012 Kotab
8,122,353 B2 2/2012 Bouta
8,130,929 B2 3/2012 Wilkes et al.
8,131,557 B2 3/2012 Davis et al.
8,135,115 B1 3/2012 Hogg, Jr. et al.
8,138,912 B2 3/2012 Singh et al.
8,140,330 B2 3/2012 Cevik et al.
8,140,335 B2 3/2012 Kennewick et al.
8,140,567 B2 3/2012 Padovitz et al.
8,145,489 B2 3/2012 Freeman et al.
8,150,694 B2 4/2012 Kennewick et al.
8,150,700 B2 4/2012 Shin et al.
8,155,956 B2 4/2012 Cho et al.
8,156,005 B2 4/2012 Vieri
8,160,877 B1 4/2012 Nucci et al.
8,160,883 B2 4/2012 Lecoeuche
8,165,321 B2 4/2012 Paquier et al.
8,165,886 B1 4/2012 Gagnon et al.
8,166,019 B1 4/2012 Lee et al.
8,166,032 B2 4/2012 Sommer et al.
8,170,790 B2 5/2012 Lee et al.
8,175,872 B2 5/2012 Kristjansson et al.
8,175,876 B2 5/2012 Bou-Ghazale et al.
8,179,370 B1 5/2012 Yamasani et al.
8,188,856 B2 5/2012 Singh et al.
8,190,359 B2 5/2012 Bourne
8,190,596 B2 5/2012 Nambiar et al.
8,195,467 B2 6/2012 Mozer et al.
8,195,468 B2 6/2012 Kennewick et al.
8,200,489 B1 6/2012 Baggenstoss
8,200,495 B2 6/2012 Braho et al.
8,201,109 B2 6/2012 Van Os et al.
8,204,238 B2 6/2012 Mozer
8,205,788 B1 6/2012 Gazdzinski et al.
8,209,183 B1 6/2012 Patel et al.
8,213,911 B2 7/2012 Williams et al.
8,219,115 B1 7/2012 Nelissen
8,219,406 B2 7/2012 Yu et al.
8,219,407 B1 7/2012 Roy et al.
8,219,608 B2 7/2012 alSafadi et al.
8,224,649 B2 7/2012 Chaudhari et al.
8,228,299 B1 7/2012 Maloney et al.
8,233,919 B2 7/2012 Haag et al.
8,234,111 B2 7/2012 Lloyd et al.
8,239,206 B1 8/2012 LeBeau et al.
8,239,207 B2 8/2012 Seligman et al.
8,244,712 B2 8/2012 Serlet et al.
8,250,071 B1 8/2012 Killalea et al.
8,254,829 B1 8/2012 Kindred et al.
8,255,216 B2 8/2012 White
8,255,217 B2 8/2012 Stent et al.
8,260,247 B2 9/2012 Lazaridis et al.
8,260,617 B2 9/2012 Dhanakshirur et al.
8,270,933 B2 9/2012 Riemer et al.
8,271,287 B1 9/2012 Kermani
8,275,621 B2 9/2012 Alewine et al.
8,279,171 B2 10/2012 Hirai et al.
8,280,438 B2 10/2012 Barbera
8,285,546 B2 10/2012 Reich
8,285,551 B2 10/2012 Gazdzinski
8,285,553 B2 10/2012 Gazdzinski
8,290,777 B1 10/2012 Nguyen et al.
8,290,778 B2 10/2012 Gazdzinski
8,290,781 B2 10/2012 Gazdzinski
8,296,124 B1 10/2012 Holsztynska et al.
8,296,145 B2 10/2012 Clark et al.
8,296,146 B2 10/2012 Gazdzinski
8,296,153 B2 10/2012 Gazdzinski
8,296,380 B1 10/2012 Kelly et al.
8,296,383 B2 10/2012 Lindahl
8,300,776 B2 10/2012 Davies et al.
8,300,801 B2 10/2012 Sweeney et al.
8,301,456 B2 10/2012 Gazdzinski
8,311,189 B2 11/2012 Champlin et al.
8,311,834 B1 11/2012 Gazdzinski
8,311,835 B2 11/2012 Lecoeuche
8,311,838 B2 11/2012 Lindahl et al.
8,312,017 B2 11/2012 Martin et al.
8,321,786 B2 11/2012 Lunati et al.
8,326,627 B2 12/2012 Kennewick et al.
8,332,205 B2 12/2012 Krishnan et al.
8,332,218 B2 12/2012 Cross et al.
8,332,224 B2 12/2012 Di Cristo et al.
8,332,748 B1 12/2012 Karam
8,335,689 B2 12/2012 Wittenstein et al.
8,340,975 B1 12/2012 Rosenberger
8,345,665 B2 1/2013 Vieri et al.
8,346,563 B1 1/2013 Hjelm et al.
8,352,183 B2 1/2013 Thota et al.
8,352,268 B2 1/2013 Naik et al.
8,352,272 B2 1/2013 Rogers et al.
8,355,919 B2 1/2013 Silverman et al.
8,359,234 B2 1/2013 Vieri
8,370,145 B2 2/2013 Endo et al.
8,370,158 B2 2/2013 Gazdzinski
8,371,503 B2 2/2013 Gazdzinski
8,374,871 B2 2/2013 Ehsani et al.
8,375,320 B2 2/2013 Kotler et al.
8,380,504 B1 2/2013 Peden et al.
8,380,507 B2 2/2013 Herman et al.
8,381,107 B2 2/2013 Rottler et al.
8,381,135 B2 2/2013 Hotelling et al.
8,386,485 B2 2/2013 Kerschberg et al.
8,386,926 B1 2/2013 Matsuoka
8,391,844 B2 3/2013 Lamiraux et al.
8,396,714 B2 3/2013 Rogers et al.
8,401,163 B1 3/2013 Kirchhoff et al.
8,406,745 B1 3/2013 Upadhyay et al.
8,423,288 B2 4/2013 Stahl et al.
8,428,758 B2 4/2013 Naik et al.
8,433,572 B2 4/2013 Caskey et al.
8,433,778 B1 4/2013 Shreesha et al.
8,442,821 B1 5/2013 Vanhoucke
8,447,612 B2 5/2013 Gazdzinski
8,452,597 B2 5/2013 Bringert et al.
8,457,959 B2 6/2013 Kaiser
8,458,115 B2 6/2013 Cai et al.
8,458,278 B2 6/2013 Christie et al.
8,464,150 B2 6/2013 Davidson et al.
8,473,289 B2 6/2013 Jitkoff et al.
8,479,122 B2 7/2013 Hotelling et al.
8,484,027 B1 7/2013 Murphy
8,489,599 B2 7/2013 Bellotti
8,498,857 B2 7/2013 Kopparapu et al.
8,514,197 B2 8/2013 Shahraray et al.
8,515,750 B1 8/2013 Lei et al.
8,521,513 B2 8/2013 Millett et al.
8,521,531 B1 8/2013 Kim
8,527,276 B1 9/2013 Senior et al.
8,537,033 B2 9/2013 Gueziec

(56) References Cited

U.S. PATENT DOCUMENTS 8,543,375 B2 9/2013 Hong
8,543,397 B1 9/2013 Nguyen
8,543,398 B1 9/2013 Strope et al.
8,560,229 B1 10/2013 Park et al.
8,571,851 B1 10/2013 Tickner et al.
8,583,416 B2 11/2013 Huang et al.
8,583,511 B2 11/2013 Hendrickson
8,589,869 B2 11/2013 Wolfram
8,589,911 B1 11/2013 Sharkey et al.
8,595,004 B2 11/2013 Koshinaka
8,600,743 B2 12/2013 Lindahl et al.
8,600,746 B1 12/2013 Lei et al.
8,600,930 B2 12/2013 Sata et al.
8,606,090 B2 12/2013 Eyer
8,606,568 B1 12/2013 Tickner et al.
8,606,576 B1 12/2013 Barr et al.
8,620,659 B2 12/2013 Di Cristo et al.
8,620,662 B2 12/2013 Bellegarda
8,626,681 B1 1/2014 Jurca et al.
8,638,363 B2 1/2014 King et al.
8,639,516 B2 1/2014 Lindahl et al.
8,645,137 B2 2/2014 Bellegarda et al.
8,645,138 B1 2/2014 Weinstein et al.
8,654,936 B1 2/2014 Tofighbakhsh et al.
8,655,646 B2 2/2014 Lee et al.
8,655,901 B1 2/2014 Li et al.
8,660,843 B2 2/2014 Falcon et al.
8,660,849 B2 2/2014 Gruber et al.
8,660,970 B1 2/2014 Fiedorowicz
8,661,112 B2 2/2014 Creamer et al.
8,661,340 B2 2/2014 Goldsmith et al.
8,670,979 B2 3/2014 Gruber et al.
8,675,084 B2 3/2014 Bolton et al.
8,676,904 B2 3/2014 Lindahl et al.
8,677,377 B2 3/2014 Cheyer et al.
8,681,950 B2 3/2014 Vlack et al.
8,682,667 B2 3/2014 Haughay et al.
8,687,777 B1 4/2014 Lavian et al.
8,688,446 B2 4/2014 Yanagihara et al.
8,688,453 B1 4/2014 Joshi et al.
8,695,074 B2 4/2014 Saraf et al.
8,696,364 B2 4/2014 Cohen
8,706,472 B2 4/2014 Ramerth et al.
8,706,474 B2 4/2014 Blume et al.
8,706,503 B2 4/2014 Cheyer et al.
8,713,119 B2 4/2014 Lindahl et al.
8,713,418 B2 4/2014 King et al.
8,719,006 B2 5/2014 Bellegarda et al.
8,719,014 B2 5/2014 Wagner et al.
8,731,610 B2 5/2014 Appaji
8,731,912 B1 5/2014 Tickner et al.
8,731,942 B2 5/2014 Cheyer et al.
8,739,208 B2 5/2014 Rodriguez et al.
8,744,852 B1 6/2014 Seymour et al.
8,760,537 B2 6/2014 Johnson et al.
8,762,145 B2 6/2014 Ouchi et al.
8,762,156 B2 6/2014 Chen et al.
8,762,469 B2 6/2014 Lindahl et al.
8,768,693 B2 7/2014 Lempel et al.
8,768,702 B2 7/2014 Boettcher et al.
8,775,154 B2 7/2014 Clinchant et al.
8,775,931 B2 7/2014 Fux et al.
8,781,456 B2 7/2014 Prociw
8,781,841 B1 7/2014 Wang
8,798,255 B2 8/2014 Lubowich et al.
8,798,995 B1 8/2014 Edara et al.
8,799,000 B2 8/2014 Guzzoni et al.
8,805,690 B1 8/2014 LeBeau et al.
8,812,302 B2 8/2014 Xiao et al.
8,838,457 B2 9/2014 Cerra et al.
8,855,915 B2 10/2014 Furuhata et al.
8,861,925 B1 10/2014 Ohme
8,862,252 B2 10/2014 Rottler et al.
8,868,409 B1 10/2014 Mengibar et al.
8,880,405 B2 11/2014 Cerra et al.
8,886,534 B2 11/2014 Nakano et al.
8,886,540 B2 11/2014 Cerra et al.
8,886,541 B2 11/2014 Friedlander
8,892,446 B2 11/2014 Cheyer et al.
8,893,023 B2 11/2014 Perry et al.
8,898,568 B2 11/2014 Bull et al.
8,903,716 B2 12/2014 Chen et al.
8,909,693 B2 12/2014 Frissora et al.
8,930,176 B2 1/2015 Li et al.
8,930,191 B2 1/2015 Gruber et al.
8,938,394 B1 1/2015 Faaborg et al.
8,938,450 B2 1/2015 Spivack et al.
8,938,688 B2 1/2015 Bradford et al.
8,942,986 B2 1/2015 Cheyer et al.
8,943,423 B2 1/2015 Merrill et al.
8,972,240 B2 3/2015 Brockett et al.
8,972,432 B2 3/2015 Shaw et al.
8,972,878 B2 3/2015 Mohler et al.
8,983,383 B1 3/2015 Haskin
8,989,713 B2 3/2015 Doulton
8,990,235 B2 3/2015 King et al.
8,994,660 B2 3/2015 Neels et al.
8,996,350 B1 3/2015 Dub et al.
8,996,376 B2 3/2015 Fleizach et al.
8,996,381 B2 3/2015 Mozer et al.
8,996,639 B1 3/2015 Faaborg et al.
9,009,046 B1 4/2015 Stewart
9,020,804 B2 4/2015 Barbaiani et al.
9,026,425 B2 5/2015 Nikoulina et al.
9,031,834 B2 5/2015 Coorman et al.
9,037,967 B1 5/2015 Al-Jefri et al.
9,043,208 B2 5/2015 Koch et al.
9,049,255 B2 6/2015 MacFarlane et al.
9,049,295 B1 6/2015 Cooper et al.
9,053,706 B2 6/2015 Jitkoff et al.
9,058,811 B2 6/2015 Wang et al.
9,063,979 B2 6/2015 Chiu et al.
9,070,366 B1 6/2015 Mathias et al.
9,071,701 B2 6/2015 Donaldson et al.
9,076,448 B2 7/2015 Bennett et al.
9,076,450 B1 7/2015 Sadek et al.
9,081,411 B2 7/2015 Kalns et al.
9,081,482 B1 7/2015 Zhai et al.
9,082,402 B2 7/2015 Yadgar et al.
9,098,467 B1 8/2015 Blanksteen et al.
9,101,279 B2 8/2015 Ritchey et al.
9,112,984 B2 8/2015 Sejnoha et al.
9,117,447 B2 8/2015 Gruber et al.
9,123,338 B1 9/2015 Sanders et al.
9,171,541 B2 10/2015 Kennewick et al.
9,171,546 B1 10/2015 Pike
9,190,062 B2 11/2015 Haughay
9,208,153 B1 12/2015 Zaveri et al.
9,218,809 B2 12/2015 Bellegarda
9,218,819 B1 12/2015 Stekkelpak et al.
9,223,537 B2 12/2015 Brown et al.
9,255,812 B2 2/2016 Maeoka et al.
9,258,604 B1 2/2016 Bilobrov et al.
9,262,612 B2 2/2016 Cheyer
9,280,535 B2 3/2016 Varma et al.
9,286,910 B1 3/2016 Li et al.
9,292,487 B1 3/2016 Weber
9,292,489 B1 3/2016 Sak et al.
9,299,344 B2 3/2016 Braho et al.
9,300,718 B2 3/2016 Khanna
9,305,543 B2 4/2016 Fleizach et al.
9,305,548 B2 4/2016 Kennewick et al.
9,311,912 B1 4/2016 Swietlinski et al.
9,313,317 B1 4/2016 LeBeau et al.
9,318,108 B2 4/2016 Gruber et al.
9,325,809 B1 4/2016 Barros et al.
9,330,659 B2 5/2016 Ju et al.
9,330,720 B2 5/2016 Lee
9,338,493 B2 5/2016 Van Os et al.
9,349,368 B1 5/2016 LeBeau et al.
9,361,084 B1 6/2016 Costa
9,367,541 B1 6/2016 Servan et al.
9,377,871 B2 6/2016 Waddell et al.
9,378,740 B1 6/2016 Rosen et al.

(56) References Cited

U.S. PATENT DOCUMENTS

| | | | |
|---|---|---|---|
| 9,380,155 | B1 | 6/2016 | Reding et al. |
| 9,383,827 | B1 | 7/2016 | Faaborg et al. |
| 9,390,726 | B1 | 7/2016 | Smus et al. |
| 9,396,722 | B2 | 7/2016 | Chung et al. |
| 9,401,147 | B2 | 7/2016 | Jitkoff et al. |
| 9,406,224 | B1 | 8/2016 | Sanders et al. |
| 9,412,392 | B2 | 8/2016 | Lindahl |
| 9,423,266 | B2 | 8/2016 | Clark et al. |
| 9,424,840 | B1 | 8/2016 | Hart et al. |
| 9,436,918 | B2 | 9/2016 | Pantel et al. |
| 9,437,186 | B1 | 9/2016 | Liu et al. |
| 9,437,189 | B2 | 9/2016 | Epstein et al. |
| 9,454,957 | B1 | 9/2016 | Mathias et al. |
| 9,465,833 | B2 | 10/2016 | Aravamudan et al. |
| 9,471,566 | B1 | 10/2016 | Zhang et al. |
| 9,484,021 | B1 | 11/2016 | Mairesse et al. |
| 9,495,129 | B2 | 11/2016 | Fleizach et al. |
| 9,501,741 | B2 | 11/2016 | Cheyer et al. |
| 9,502,025 | B2 | 11/2016 | Kennewick et al. |
| 9,508,028 | B2 | 11/2016 | Bannister et al. |
| 9,510,044 | B1 | 11/2016 | Pereira et al. |
| 9,535,906 | B2 | 1/2017 | Lee et al. |
| 9,536,527 | B1 | 1/2017 | Carlson |
| 9,547,647 | B2 | 1/2017 | Badaskar |
| 9,548,050 | B2 | 1/2017 | Gruber et al. |
| 9,569,549 | B1 | 2/2017 | Jenkins et al. |
| 9,575,964 | B2 | 2/2017 | Yadgar et al. |
| 9,578,173 | B2 | 2/2017 | Sanghavi et al. |
| 9,607,612 | B2 | 3/2017 | Deleeuw |
| 9,620,113 | B2 | 4/2017 | Kennewick et al. |
| 9,620,126 | B2 | 4/2017 | Chiba |
| 9,626,955 | B2 | 4/2017 | Fleizach et al. |
| 9,633,004 | B2 | 4/2017 | Giuli et al. |
| 9,633,660 | B2 | 4/2017 | Haughay |
| 9,652,453 | B2 | 5/2017 | Mathur et al. |
| 9,658,746 | B2 | 5/2017 | Cohn et al. |
| 9,665,567 | B2 | 5/2017 | Liu et al. |
| 9,668,121 | B2 | 5/2017 | Naik et al. |
| 9,672,725 | B2 | 6/2017 | Dotan-Cohen et al. |
| 9,691,378 | B1 | 6/2017 | Meyers et al. |
| 9,697,827 | B1 | 7/2017 | Lilly et al. |
| 9,720,907 | B2 | 8/2017 | Bangalore et al. |
| 9,721,566 | B2 | 8/2017 | Newendorp et al. |
| 9,734,839 | B1 | 8/2017 | Adams |
| 9,741,343 | B1 | 8/2017 | Miles et al. |
| 9,747,083 | B1 | 8/2017 | Roman et al. |
| 9,755,605 | B1 | 9/2017 | Li et al. |
| 9,842,584 | B1 | 12/2017 | Hart et al. |
| 9,934,785 | B1 | 4/2018 | Hulaud |
| 9,948,728 | B2 | 4/2018 | Linn et al. |
| 9,966,068 | B2 | 5/2018 | Cash et al. |
| 9,967,381 | B1 | 5/2018 | Kashimba et al. |
| 9,990,176 | B1 | 6/2018 | Gray |
| 10,037,758 | B2 | 7/2018 | Jing et al. |
| 10,049,663 | B2 | 8/2018 | Orr et al. |
| 10,096,319 | B1 | 10/2018 | Jin et al. |
| 10,170,123 | B2 | 1/2019 | Orr et al. |
| 2003/0187659 | A1 | 10/2003 | Cho et al. |
| 2004/0030560 | A1 | 2/2004 | Takami et al. |
| 2006/0218244 | A1 | 9/2006 | Rasmussen et al. |
| 2007/0050191 | A1 | 3/2007 | Weider et al. |
| 2008/0001785 | A1 | 1/2008 | Elizarov et al. |
| 2008/0010050 | A1 | 1/2008 | Fux et al. |
| 2008/0010355 | A1 | 1/2008 | Vieri et al. |
| 2008/0010605 | A1 | 1/2008 | Frank et al. |
| 2008/0012950 | A1 | 1/2008 | Lee et al. |
| 2008/0013751 | A1 | 1/2008 | Hiselius |
| 2008/0015863 | A1 | 1/2008 | Agapi et al. |
| 2008/0015864 | A1 | 1/2008 | Ross et al. |
| 2008/0016575 | A1 | 1/2008 | Vincent et al. |
| 2008/0021708 | A1 | 1/2008 | Bennett et al. |
| 2008/0021886 | A1 | 1/2008 | Wang-Aryattanwanich et al. |
| 2008/0022208 | A1 | 1/2008 | Morse |
| 2008/0027711 | A1 | 1/2008 | Rajendran et al. |
| 2008/0027726 | A1 | 1/2008 | Hansen et al. |
| 2008/0031475 | A1 | 2/2008 | Goldstein |
| 2008/0033719 | A1 | 2/2008 | Hall et al. |
| 2008/0033723 | A1 | 2/2008 | Jang et al. |
| 2008/0034032 | A1 | 2/2008 | Healey et al. |
| 2008/0034044 | A1 | 2/2008 | Bhakta et al. |
| 2008/0034081 | A1 | 2/2008 | Marshall et al. |
| 2008/0036743 | A1 | 2/2008 | Westerman et al. |
| 2008/0040339 | A1 | 2/2008 | Zhou et al. |
| 2008/0042970 | A1 | 2/2008 | Liang et al. |
| 2008/0043936 | A1 | 2/2008 | Liebermann |
| 2008/0043943 | A1 | 2/2008 | Sipher et al. |
| 2008/0046239 | A1 | 2/2008 | Boo |
| 2008/0046250 | A1 | 2/2008 | Agapi et al. |
| 2008/0046422 | A1 | 2/2008 | Lee et al. |
| 2008/0046820 | A1 | 2/2008 | Lee et al. |
| 2008/0046948 | A1 | 2/2008 | Verosub |
| 2008/0048908 | A1 | 2/2008 | Sato |
| 2008/0050027 | A1 | 2/2008 | Bashyam et al. |
| 2008/0052063 | A1 | 2/2008 | Bennett et al. |
| 2008/0052073 | A1 | 2/2008 | Goto et al. |
| 2008/0052077 | A1 | 2/2008 | Bennett et al. |
| 2008/0052080 | A1 | 2/2008 | Narayanan et al. |
| 2008/0052262 | A1 | 2/2008 | Kosinov et al. |
| 2008/0055194 | A1 | 3/2008 | Baudino et al. |
| 2008/0056459 | A1 | 3/2008 | Vallier et al. |
| 2008/0056579 | A1 | 3/2008 | Guha |
| 2008/0057922 | A1 | 3/2008 | Kokes et al. |
| 2008/0059190 | A1 | 3/2008 | Chu et al. |
| 2008/0059200 | A1 | 3/2008 | Puli |
| 2008/0059876 | A1 | 3/2008 | Hantler et al. |
| 2008/0062141 | A1 | 3/2008 | Chaudhri |
| 2008/0065382 | A1 | 3/2008 | Gerl et al. |
| 2008/0065387 | A1 | 3/2008 | Cross et al. |
| 2008/0066135 | A1 | 3/2008 | Brodersen et al. |
| 2008/0071529 | A1 | 3/2008 | Silverman et al. |
| 2008/0071544 | A1 | 3/2008 | Beaufays et al. |
| 2008/0071742 | A1 | 3/2008 | Yang et al. |
| 2008/0072143 | A1 | 3/2008 | Assadollahi |
| 2008/0075296 | A1 | 3/2008 | Lindahl et al. |
| 2008/0076972 | A1 | 3/2008 | Dorogusker et al. |
| 2008/0077310 | A1 | 3/2008 | Murlidar et al. |
| 2008/0077384 | A1 | 3/2008 | Agapi et al. |
| 2008/0077386 | A1 | 3/2008 | Gao et al. |
| 2008/0077391 | A1 | 3/2008 | Chino et al. |
| 2008/0077393 | A1 | 3/2008 | Gao et al. |
| 2008/0077406 | A1 | 3/2008 | Ganong, III |
| 2008/0077859 | A1 | 3/2008 | Schabes et al. |
| 2008/0079566 | A1 | 4/2008 | Singh et al. |
| 2008/0080411 | A1 | 4/2008 | Cole |
| 2008/0082332 | A1 | 4/2008 | Mallett et al. |
| 2008/0082338 | A1 | 4/2008 | O"Neil et al. |
| 2008/0082390 | A1 | 4/2008 | Hawkins et al. |
| 2008/0082576 | A1 | 4/2008 | Bodin et al. |
| 2008/0082651 | A1 | 4/2008 | Singh et al. |
| 2008/0084974 | A1 | 4/2008 | Dhanakshirur |
| 2008/0085689 | A1 | 4/2008 | Zellner |
| 2008/0086306 | A1 | 4/2008 | Hirota et al. |
| 2008/0091406 | A1 | 4/2008 | Baldwin et al. |
| 2008/0091426 | A1 | 4/2008 | Rempel et al. |
| 2008/0091428 | A1 | 4/2008 | Bellegarda |
| 2008/0091443 | A1 | 4/2008 | Strope et al. |
| 2008/0096531 | A1 | 4/2008 | Mcquaide et al. |
| 2008/0096533 | A1 | 4/2008 | Manfredi et al. |
| 2008/0096726 | A1 | 4/2008 | Riley et al. |
| 2008/0097937 | A1 | 4/2008 | Hadjarian |
| 2008/0098302 | A1 | 4/2008 | Roose |
| 2008/0098480 | A1 | 4/2008 | Henry et al. |
| 2008/0100579 | A1 | 5/2008 | Robinson et al. |
| 2008/0101584 | A1 | 5/2008 | Gray et al. |
| 2008/0103774 | A1 | 5/2008 | White |
| 2008/0109222 | A1 | 5/2008 | Liu |
| 2008/0109402 | A1 | 5/2008 | Wang et al. |
| 2008/0114480 | A1 | 5/2008 | Harb |
| 2008/0114598 | A1 | 5/2008 | Prieto et al. |
| 2008/0114604 | A1 | 5/2008 | Wei et al. |
| 2008/0114841 | A1 | 5/2008 | Lambert |
| 2008/0115084 | A1 | 5/2008 | Scott et al. |
| 2008/0118143 | A1 | 5/2008 | Gordon et al. |
| 2008/0119953 | A1 | 5/2008 | Reed |

(56) References Cited

U.S. PATENT DOCUMENTS

2008/0120102 A1 5/2008 Rao
2008/0120112 A1 5/2008 Jordan et al.
2008/0120196 A1 5/2008 Reed et al.
2008/0120311 A1 5/2008 Reed
2008/0120312 A1 5/2008 Reed
2008/0120330 A1 5/2008 Reed
2008/0120342 A1 5/2008 Reed et al.
2008/0122796 A1 5/2008 Jobs et al.
2008/0124695 A1 5/2008 Myers et al.
2008/0126075 A1 5/2008 Thorn et al.
2008/0126077 A1 5/2008 Thorn
2008/0126091 A1 5/2008 Clark et al.
2008/0126093 A1 5/2008 Sivadas
2008/0126100 A1 5/2008 Grost et al.
2008/0126491 A1 5/2008 Portele et al.
2008/0129520 A1 6/2008 Lee
2008/0130867 A1 6/2008 Bowen
2008/0131006 A1 6/2008 Oliver
2008/0132221 A1 6/2008 Willey et al.
2008/0132295 A1 6/2008 Horowitz
2008/0133215 A1 6/2008 Sarukkai
2008/0133228 A1 6/2008 Rao
2008/0133230 A1 6/2008 Herforth et al.
2008/0133241 A1 6/2008 Baker et al.
2008/0133244 A1 6/2008 Bodin et al.
2008/0133245 A1 6/2008 Proulx et al.
2008/0133479 A1 6/2008 Zelevinsky et al.
2008/0133956 A1 6/2008 Fadell
2008/0140413 A1 6/2008 Millman et al.
2008/0140415 A1 6/2008 Shostak
2008/0140416 A1 6/2008 Shostak
2008/0140652 A1 6/2008 Millman et al.
2008/0140657 A1 6/2008 Azvine et al.
2008/0140702 A1 6/2008 Reed et al.
2008/0141125 A1 6/2008 Ghassabian et al.
2008/0141180 A1 6/2008 Reed et al.
2008/0141182 A1 6/2008 Barsness et al.
2008/0146245 A1 6/2008 Appaji
2008/0146290 A1 6/2008 Sreeram et al.
2008/0147408 A1 6/2008 Da Palma et al.
2008/0147411 A1 6/2008 Dames et al.
2008/0147874 A1 6/2008 Yoneda et al.
2008/0150900 A1 6/2008 Han
2008/0154577 A1 6/2008 Kim et al.
2008/0154599 A1 6/2008 Muschett et al.
2008/0154600 A1 6/2008 Tian et al.
2008/0154603 A1 6/2008 Oddo
2008/0154612 A1 6/2008 Evermann et al.
2008/0154828 A1 6/2008 Antebi et al.
2008/0157867 A1 7/2008 Krah
2008/0161113 A1 7/2008 Hansen et al.
2008/0162120 A1 7/2008 Mactavish et al.
2008/0162137 A1 7/2008 Saitoh et al.
2008/0162471 A1 7/2008 Bernard
2008/0163119 A1 7/2008 Kim et al.
2008/0163131 A1 7/2008 Hirai et al.
2008/0165144 A1 7/2008 Forstall et al.
2008/0165980 A1 7/2008 Pavlovic et al.
2008/0165994 A1 7/2008 Caren et al.
2008/0167013 A1 7/2008 Novick et al.
2008/0167858 A1 7/2008 Christie et al.
2008/0167876 A1 7/2008 Bakis et al.
2008/0168052 A1 7/2008 Ott et al.
2008/0168144 A1 7/2008 Lee
2008/0168366 A1 7/2008 Kocienda et al.
2008/0172698 A1 7/2008 Berger et al.
2008/0183473 A1 7/2008 Nagano et al.
2008/0186960 A1 8/2008 Kocheisen et al.
2008/0189099 A1 8/2008 Friedman et al.
2008/0189106 A1 8/2008 Low et al.
2008/0189110 A1 8/2008 Freeman et al.
2008/0189114 A1 8/2008 Fail et al.
2008/0189360 A1 8/2008 Kiley et al.
2008/0189606 A1 8/2008 Rybak
2008/0195312 A1 8/2008 Aaron et al.
2008/0195388 A1 8/2008 Bower et al.
2008/0195391 A1 8/2008 Marple et al.
2008/0195601 A1 8/2008 Ntoulas et al.
2008/0195630 A1 8/2008 Exartier et al.
2008/0195940 A1 8/2008 Gail et al.
2008/0200142 A1 8/2008 Abdel-Kader et al.
2008/0201000 A1 8/2008 Heikkila et al.
2008/0201306 A1 8/2008 Cooper et al.
2008/0201375 A1 8/2008 Khedouri et al.
2008/0201434 A1 8/2008 Holmes et al.
2008/0204379 A1 8/2008 Perez-Noguera
2008/0207176 A1 8/2008 Brackbill et al.
2008/0208585 A1 8/2008 Ativanichayaphong et al.
2008/0208587 A1 8/2008 Ben-David et al.
2008/0208864 A1 8/2008 Cucerzan et al.
2008/0212796 A1 9/2008 Denda
2008/0215678 A1 9/2008 Coletrane et al.
2008/0219641 A1 9/2008 Sandrew et al.
2008/0221866 A1 9/2008 Katragadda et al.
2008/0221879 A1 9/2008 Cerra et al.
2008/0221880 A1 9/2008 Cerra et al.
2008/0221887 A1 9/2008 Rose et al.
2008/0221889 A1 9/2008 Cerra et al.
2008/0221903 A1 9/2008 Kanevsky et al.
2008/0222118 A1 9/2008 Scian et al.
2008/0226130 A1 9/2008 Kansal et al.
2008/0228463 A1 9/2008 Mori et al.
2008/0228485 A1 9/2008 Owen
2008/0228490 A1 9/2008 Fischer et al.
2008/0228495 A1 9/2008 Cross et al.
2008/0228496 A1 9/2008 Yu et al.
2008/0228928 A1 9/2008 Donelli et al.
2008/0229185 A1 9/2008 Lynch
2008/0229218 A1 9/2008 Maeng
2008/0235017 A1 9/2008 Satomura et al.
2008/0235018 A1 9/2008 Eggen et al.
2008/0235023 A1 9/2008 Kennewick et al.
2008/0235024 A1 9/2008 Goldberg et al.
2008/0235027 A1 9/2008 Cross
2008/0240569 A1 10/2008 Tonouchi
2008/0242280 A1 10/2008 Shapiro et al.
2008/0242322 A1 10/2008 Scott et al.
2008/0242363 A1 10/2008 Onda et al.
2008/0243501 A1 10/2008 Hafsteinsson et al.
2008/0243834 A1 10/2008 Rieman et al.
2008/0244390 A1 10/2008 Fux et al.
2008/0244446 A1 10/2008 Lefevre et al.
2008/0247519 A1 10/2008 Abella et al.
2008/0247529 A1 10/2008 Barton et al.
2008/0248797 A1 10/2008 Freeman et al.
2008/0249770 A1 10/2008 Kim et al.
2008/0249778 A1 10/2008 Barton et al.
2008/0253577 A1 10/2008 Eppolito
2008/0254419 A1 10/2008 Cohen
2008/0254425 A1 10/2008 Cohen et al.
2008/0255837 A1 10/2008 Kahn et al.
2008/0255842 A1 10/2008 Simhi et al.
2008/0255845 A1 10/2008 Bennett
2008/0256613 A1 10/2008 Grover
2008/0259022 A1 10/2008 Mansfield et al.
2008/0261572 A1 10/2008 Tsui et al.
2008/0262828 A1 10/2008 Och et al.
2008/0262838 A1 10/2008 Nurminen et al.
2008/0262846 A1 10/2008 Burns et al.
2008/0263139 A1 10/2008 Martin
2008/0267416 A1 10/2008 Goldstein et al.
2008/0270118 A1 10/2008 Kuo et al.
2008/0270138 A1 10/2008 Knight et al.
2008/0270139 A1 10/2008 Shi et al.
2008/0270140 A1 10/2008 Hertz et al.
2008/0270151 A1 10/2008 Mahoney et al.
2008/0270344 A1 10/2008 Yurick et al.
2008/0273672 A1 11/2008 Didcock et al.
2008/0277473 A1 11/2008 Kotlarsky et al.
2008/0281510 A1 11/2008 Shahine
2008/0281582 A1 11/2008 Hsu et al.
2008/0288259 A1 11/2008 Chambers et al.
2008/0288460 A1 11/2008 Poniatowski et al.
2008/0292112 A1 11/2008 Valenzuela et al.

(56) References Cited

U.S. PATENT DOCUMENTS

| | | | |
|---|---|---|---|
| 2008/0294418 | A1 | 11/2008 | Cleary et al. |
| 2008/0294517 | A1 | 11/2008 | Hill |
| 2008/0294651 | A1 | 11/2008 | Masuyama et al. |
| 2008/0294981 | A1 | 11/2008 | Balzano et al. |
| 2008/0298563 | A1 | 12/2008 | Rondeau et al. |
| 2008/0298766 | A1 | 12/2008 | Wen et al. |
| 2008/0299523 | A1 | 12/2008 | Chai et al. |
| 2008/0300857 | A1 | 12/2008 | Barbaiani et al. |
| 2008/0300871 | A1 | 12/2008 | Gilbert |
| 2008/0300877 | A1 | 12/2008 | Gilbert et al. |
| 2008/0300878 | A1 | 12/2008 | Bennett |
| 2008/0300886 | A1 | 12/2008 | Patch |
| 2008/0301567 | A1 | 12/2008 | Martin et al. |
| 2008/0303645 | A1 | 12/2008 | Seymour et al. |
| 2008/0306727 | A1 | 12/2008 | Thurmair et al. |
| 2008/0312909 | A1 | 12/2008 | Hermansen et al. |
| 2008/0312928 | A1 | 12/2008 | Goebel et al. |
| 2008/0313335 | A1 | 12/2008 | Jung et al. |
| 2008/0316183 | A1 | 12/2008 | Westerman et al. |
| 2008/0319735 | A1 | 12/2008 | Kambhatla et al. |
| 2008/0319738 | A1 | 12/2008 | Liu et al. |
| 2008/0319753 | A1 | 12/2008 | Hancock |
| 2008/0319763 | A1 | 12/2008 | Di Fabbrizio et al. |
| 2008/0319783 | A1 | 12/2008 | Yao et al. |
| 2009/0003115 | A1 | 1/2009 | Lindahl et al. |
| 2009/0005012 | A1 | 1/2009 | Van Heugten |
| 2009/0005891 | A1 | 1/2009 | Batson et al. |
| 2009/0006096 | A1 | 1/2009 | Li et al. |
| 2009/0006097 | A1 | 1/2009 | Etezadi et al. |
| 2009/0006099 | A1 | 1/2009 | Sharpe et al. |
| 2009/0006100 | A1 | 1/2009 | Badger et al. |
| 2009/0006343 | A1 | 1/2009 | Platt et al. |
| 2009/0006345 | A1 | 1/2009 | Platt et al. |
| 2009/0006488 | A1 | 1/2009 | Lindahl et al. |
| 2009/0006671 | A1 | 1/2009 | Batson et al. |
| 2009/0007001 | A1 | 1/2009 | Morin et al. |
| 2009/0011709 | A1 | 1/2009 | Akasaka et al. |
| 2009/0012748 | A1 | 1/2009 | Beish et al. |
| 2009/0012775 | A1 | 1/2009 | El Hady et al. |
| 2009/0018828 | A1 | 1/2009 | Nakadai et al. |
| 2009/0018829 | A1 | 1/2009 | Kuperstein |
| 2009/0018834 | A1 | 1/2009 | Cooper et al. |
| 2009/0018835 | A1 | 1/2009 | Cooper et al. |
| 2009/0018839 | A1 | 1/2009 | Cooper et al. |
| 2009/0018840 | A1 | 1/2009 | Lutz et al. |
| 2009/0022329 | A1 | 1/2009 | Mahowald |
| 2009/0024595 | A1 | 1/2009 | Chen |
| 2009/0028435 | A1 | 1/2009 | Wu et al. |
| 2009/0030685 | A1 | 1/2009 | Cerra et al. |
| 2009/0030800 | A1 | 1/2009 | Grois |
| 2009/0030978 | A1 | 1/2009 | Johnson et al. |
| 2009/0043580 | A1 | 2/2009 | Mozer et al. |
| 2009/0043583 | A1 | 2/2009 | Agapi et al. |
| 2009/0043763 | A1 | 2/2009 | Peng |
| 2009/0044094 | A1 | 2/2009 | Rapp et al. |
| 2009/0048821 | A1 | 2/2009 | Yam et al. |
| 2009/0048841 | A1 | 2/2009 | Pollet et al. |
| 2009/0048845 | A1 | 2/2009 | Burckart et al. |
| 2009/0049067 | A1 | 2/2009 | Murray |
| 2009/0055168 | A1 | 2/2009 | Wu et al. |
| 2009/0055175 | A1 | 2/2009 | Terrell et al. |
| 2009/0055179 | A1 | 2/2009 | Cho et al. |
| 2009/0055186 | A1 | 2/2009 | Lance et al. |
| 2009/0055380 | A1 | 2/2009 | Peng et al. |
| 2009/0055381 | A1 | 2/2009 | Wu et al. |
| 2009/0055648 | A1 | 2/2009 | Kim et al. |
| 2009/0058823 | A1 | 3/2009 | Kocienda |
| 2009/0058860 | A1 | 3/2009 | Fong et al. |
| 2009/0060351 | A1 | 3/2009 | Li et al. |
| 2009/0060472 | A1 | 3/2009 | Bull et al. |
| 2009/0063974 | A1 | 3/2009 | Bull et al. |
| 2009/0064031 | A1 | 3/2009 | Bull et al. |
| 2009/0070097 | A1 | 3/2009 | Wu et al. |
| 2009/0070102 | A1 | 3/2009 | Maegawa |
| 2009/0070109 | A1 | 3/2009 | Didcock et al. |
| 2009/0070114 | A1 | 3/2009 | Staszak |
| 2009/0074214 | A1 | 3/2009 | Bradford et al. |
| 2009/0076792 | A1 | 3/2009 | Lawson-Tancred |
| 2009/0076796 | A1 | 3/2009 | Daraselia |
| 2009/0076798 | A1 | 3/2009 | Oh et al. |
| 2009/0076819 | A1 | 3/2009 | Wouters et al. |
| 2009/0076821 | A1 | 3/2009 | Brenner et al. |
| 2009/0076825 | A1 | 3/2009 | Bradford et al. |
| 2009/0077047 | A1 | 3/2009 | Cooper et al. |
| 2009/0077165 | A1 | 3/2009 | Rhodes et al. |
| 2009/0077464 | A1 | 3/2009 | Goldsmith et al. |
| 2009/0079622 | A1 | 3/2009 | Seshadri et al. |
| 2009/0083034 | A1 | 3/2009 | Hernandez et al. |
| 2009/0083035 | A1 | 3/2009 | Huang et al. |
| 2009/0083036 | A1 | 3/2009 | Zhao et al. |
| 2009/0083037 | A1 | 3/2009 | Gleason et al. |
| 2009/0083047 | A1 | 3/2009 | Lindahl et al. |
| 2009/0089058 | A1 | 4/2009 | Bellegarda |
| 2009/0091537 | A1 | 4/2009 | Huang et al. |
| 2009/0092239 | A1 | 4/2009 | Macwan et al. |
| 2009/0092260 | A1 | 4/2009 | Powers |
| 2009/0092261 | A1 | 4/2009 | Bard |
| 2009/0092262 | A1 | 4/2009 | Costa et al. |
| 2009/0094029 | A1 | 4/2009 | Koch et al. |
| 2009/0094033 | A1 | 4/2009 | Mozer et al. |
| 2009/0097634 | A1 | 4/2009 | Nambiar et al. |
| 2009/0097637 | A1 | 4/2009 | Boscher et al. |
| 2009/0098903 | A1 | 4/2009 | Donaldson et al. |
| 2009/0100049 | A1 | 4/2009 | Cao |
| 2009/0100454 | A1 | 4/2009 | Weber |
| 2009/0104898 | A1 | 4/2009 | Harris |
| 2009/0106026 | A1 | 4/2009 | Ferrieux |
| 2009/0106376 | A1 | 4/2009 | Tom et al. |
| 2009/0106397 | A1 | 4/2009 | O'Keefe |
| 2009/0112572 | A1 | 4/2009 | Thorn |
| 2009/0112576 | A1 | 4/2009 | Jackson et al. |
| 2009/0112592 | A1 | 4/2009 | Candelore et al. |
| 2009/0112596 | A1 | 4/2009 | Syrdal et al. |
| 2009/0112677 | A1 | 4/2009 | Rhett |
| 2009/0112892 | A1 | 4/2009 | Cardie et al. |
| 2009/0119587 | A1 | 5/2009 | Allen et al. |
| 2009/0123021 | A1 | 5/2009 | Jung et al. |
| 2009/0123071 | A1 | 5/2009 | Iwasaki |
| 2009/0125477 | A1 | 5/2009 | Lu et al. |
| 2009/0125602 | A1 | 5/2009 | Bhatia et al. |
| 2009/0125813 | A1 | 5/2009 | Shen et al. |
| 2009/0125947 | A1 | 5/2009 | Ibaraki |
| 2009/0128505 | A1 | 5/2009 | Partridge et al. |
| 2009/0132253 | A1 | 5/2009 | Bellegarda |
| 2009/0132255 | A1 | 5/2009 | Lu |
| 2009/0137286 | A1 | 5/2009 | Luke et al. |
| 2009/0138263 | A1 | 5/2009 | Shozakai et al. |
| 2009/0138430 | A1 | 5/2009 | Nambiar et al. |
| 2009/0138736 | A1 | 5/2009 | Chin |
| 2009/0138828 | A1 | 5/2009 | Schultz et al. |
| 2009/0144036 | A1 | 6/2009 | Jorgensen et al. |
| 2009/0144049 | A1 | 6/2009 | Haddad et al. |
| 2009/0144428 | A1 | 6/2009 | Bowater et al. |
| 2009/0144609 | A1 | 6/2009 | Liang et al. |
| 2009/0146848 | A1 | 6/2009 | Ghassabian |
| 2009/0150147 | A1 | 6/2009 | Jacoby et al. |
| 2009/0150156 | A1 | 6/2009 | Kennewick et al. |
| 2009/0152349 | A1 | 6/2009 | Bonev et al. |
| 2009/0153288 | A1 | 6/2009 | Hope et al. |
| 2009/0154669 | A1 | 6/2009 | Wood et al. |
| 2009/0157382 | A1 | 6/2009 | Bar |
| 2009/0157384 | A1 | 6/2009 | Toutanova et al. |
| 2009/0157401 | A1 | 6/2009 | Bennett |
| 2009/0158200 | A1 | 6/2009 | Palahnuk et al. |
| 2009/0158323 | A1 | 6/2009 | Bober et al. |
| 2009/0158423 | A1 | 6/2009 | Orlassino et al. |
| 2009/0160803 | A1 | 6/2009 | Hashimoto |
| 2009/0163243 | A1 | 6/2009 | Barbera |
| 2009/0164301 | A1 | 6/2009 | O'Sullivan et al. |
| 2009/0164441 | A1 | 6/2009 | Cheyer |
| 2009/0164655 | A1 | 6/2009 | Pettersson et al. |
| 2009/0164937 | A1 | 6/2009 | Alviar et al. |
| 2009/0167508 | A1 | 7/2009 | Fadell et al. |
| 2009/0167509 | A1 | 7/2009 | Fadell et al. |

(56) References Cited

U.S. PATENT DOCUMENTS

| | | | |
|---|---|---|---|
| 2009/0171578 | A1 | 7/2009 | Kim et al. |
| 2009/0171662 | A1 | 7/2009 | Huang et al. |
| 2009/0171664 | A1 | 7/2009 | Kennewick et al. |
| 2009/0172108 | A1 | 7/2009 | Singh |
| 2009/0172542 | A1 | 7/2009 | Girish et al. |
| 2009/0174667 | A1 | 7/2009 | Kocienda et al. |
| 2009/0174677 | A1 | 7/2009 | Gehani et al. |
| 2009/0177300 | A1 | 7/2009 | Lee |
| 2009/0177461 | A1 | 7/2009 | Ehsani et al. |
| 2009/0177966 | A1 | 7/2009 | Chaudhri |
| 2009/0182445 | A1 | 7/2009 | Girish et al. |
| 2009/0182549 | A1 | 7/2009 | Anisimovich et al. |
| 2009/0182702 | A1 | 7/2009 | Miller |
| 2009/0183070 | A1 | 7/2009 | Robbins |
| 2009/0187402 | A1 | 7/2009 | Scholl |
| 2009/0187577 | A1 | 7/2009 | Reznik et al. |
| 2009/0187950 | A1 | 7/2009 | Nicas et al. |
| 2009/0190774 | A1 | 7/2009 | Wang et al. |
| 2009/0191895 | A1 | 7/2009 | Singh et al. |
| 2009/0192782 | A1 | 7/2009 | Drewes |
| 2009/0192787 | A1 | 7/2009 | Roon |
| 2009/0192798 | A1 | 7/2009 | Basson et al. |
| 2009/0198497 | A1 | 8/2009 | Kwon |
| 2009/0204402 | A1 | 8/2009 | Marhawa et al. |
| 2009/0204409 | A1 | 8/2009 | Mozer et al. |
| 2009/0204478 | A1 | 8/2009 | Kaib et al. |
| 2009/0204596 | A1 | 8/2009 | Brun et al. |
| 2009/0204601 | A1 | 8/2009 | Grasset |
| 2009/0204620 | A1 | 8/2009 | Thione et al. |
| 2009/0210230 | A1 | 8/2009 | Schwarz et al. |
| 2009/0210232 | A1 | 8/2009 | Sanchez et al. |
| 2009/0213134 | A1 | 8/2009 | Stephanick et al. |
| 2009/0215466 | A1 | 8/2009 | Ahl et al. |
| 2009/0215503 | A1 | 8/2009 | Zhang et al. |
| 2009/0216396 | A1 | 8/2009 | Yamagata |
| 2009/0216528 | A1 | 8/2009 | Gemello et al. |
| 2009/0216540 | A1 | 8/2009 | Tessel et al. |
| 2009/0216704 | A1 | 8/2009 | Zheng et al. |
| 2009/0219166 | A1 | 9/2009 | MacFarlane et al. |
| 2009/0221274 | A1 | 9/2009 | Venkatakrishnan et al. |
| 2009/0222257 | A1 | 9/2009 | Sumita et al. |
| 2009/0222270 | A2 | 9/2009 | Likens et al. |
| 2009/0222488 | A1 | 9/2009 | Boerries et al. |
| 2009/0228126 | A1 | 9/2009 | Spielberg et al. |
| 2009/0228273 | A1 | 9/2009 | Wang et al. |
| 2009/0228277 | A1 | 9/2009 | Bonforte et al. |
| 2009/0228281 | A1 | 9/2009 | Singleton et al. |
| 2009/0228439 | A1 | 9/2009 | Manolescu et al. |
| 2009/0228792 | A1 | 9/2009 | Van Os et al. |
| 2009/0228842 | A1 | 9/2009 | Westerman et al. |
| 2009/0233264 | A1 | 9/2009 | Rogers et al. |
| 2009/0234638 | A1 | 9/2009 | Ranjan et al. |
| 2009/0234651 | A1 | 9/2009 | Basir et al. |
| 2009/0234655 | A1 | 9/2009 | Kwon |
| 2009/0235280 | A1 | 9/2009 | Tannier et al. |
| 2009/0239202 | A1 | 9/2009 | Stone |
| 2009/0239552 | A1 | 9/2009 | Churchill et al. |
| 2009/0240485 | A1 | 9/2009 | Dalal et al. |
| 2009/0241054 | A1 | 9/2009 | Hendricks |
| 2009/0241760 | A1 | 10/2009 | Georges |
| 2009/0247237 | A1 | 10/2009 | Mittleman et al. |
| 2009/0248182 | A1 | 10/2009 | Logan et al. |
| 2009/0248395 | A1 | 10/2009 | Alewine et al. |
| 2009/0248402 | A1 | 10/2009 | Ito et al. |
| 2009/0248420 | A1 | 10/2009 | Basir et al. |
| 2009/0248422 | A1 | 10/2009 | Li et al. |
| 2009/0248456 | A1 | 10/2009 | Fahmy et al. |
| 2009/0249198 | A1 | 10/2009 | Davis et al. |
| 2009/0249247 | A1 | 10/2009 | Tseng et al. |
| 2009/0252350 | A1 | 10/2009 | Seguin |
| 2009/0253457 | A1 | 10/2009 | Seguin |
| 2009/0253463 | A1 | 10/2009 | Shin et al. |
| 2009/0254339 | A1 | 10/2009 | Seguin |
| 2009/0254345 | A1 | 10/2009 | Fleizach et al. |
| 2009/0254819 | A1 | 10/2009 | Song et al. |
| 2009/0254823 | A1 | 10/2009 | Barrett |
| 2009/0259472 | A1 | 10/2009 | Schroeter |
| 2009/0259475 | A1 | 10/2009 | Yamagami et al. |
| 2009/0259969 | A1 | 10/2009 | Pallakoff |
| 2009/0265171 | A1 | 10/2009 | Davis |
| 2009/0265368 | A1 | 10/2009 | Crider et al. |
| 2009/0271109 | A1 | 10/2009 | Lee et al. |
| 2009/0271175 | A1 | 10/2009 | Bodin et al. |
| 2009/0271176 | A1 | 10/2009 | Bodin et al. |
| 2009/0271178 | A1 | 10/2009 | Bodin et al. |
| 2009/0271188 | A1 | 10/2009 | Agapi et al. |
| 2009/0271189 | A1 | 10/2009 | Agapi et al. |
| 2009/0274315 | A1 | 11/2009 | Carnes et al. |
| 2009/0274376 | A1 | 11/2009 | Selvaraj et al. |
| 2009/0278804 | A1 | 11/2009 | Rubanovich et al. |
| 2009/0281789 | A1 | 11/2009 | Waibel et al. |
| 2009/0284471 | A1 | 11/2009 | Longe et al. |
| 2009/0284482 | A1 | 11/2009 | Chin |
| 2009/0286514 | A1 | 11/2009 | Lichorowic et al. |
| 2009/0287583 | A1 | 11/2009 | Holmes |
| 2009/0290718 | A1 | 11/2009 | Kahn et al. |
| 2009/0292987 | A1 | 11/2009 | Sorenson |
| 2009/0296552 | A1 | 12/2009 | Hicks et al. |
| 2009/0298474 | A1 | 12/2009 | George |
| 2009/0298529 | A1 | 12/2009 | Mahajan |
| 2009/0299745 | A1 | 12/2009 | Kennewick et al. |
| 2009/0299849 | A1 | 12/2009 | Cao et al. |
| 2009/0300391 | A1 | 12/2009 | Jessup et al. |
| 2009/0300488 | A1 | 12/2009 | Salamon et al. |
| 2009/0304198 | A1 | 12/2009 | Herre et al. |
| 2009/0305203 | A1 | 12/2009 | Okumura et al. |
| 2009/0306967 | A1 | 12/2009 | Nicolov et al. |
| 2009/0306969 | A1 | 12/2009 | Goud et al. |
| 2009/0306979 | A1 | 12/2009 | Jaiswal et al. |
| 2009/0306980 | A1 | 12/2009 | Shin |
| 2009/0306981 | A1 | 12/2009 | Cromack et al. |
| 2009/0306985 | A1 | 12/2009 | Roberts et al. |
| 2009/0306988 | A1 | 12/2009 | Chen et al. |
| 2009/0306989 | A1 | 12/2009 | Kaji |
| 2009/0307162 | A1 | 12/2009 | Bui et al. |
| 2009/0307201 | A1 | 12/2009 | Dunning et al. |
| 2009/0307584 | A1 | 12/2009 | Davidson et al. |
| 2009/0307594 | A1 | 12/2009 | Kosonen et al. |
| 2009/0309352 | A1 | 12/2009 | Walker et al. |
| 2009/0313014 | A1 | 12/2009 | Shin et al. |
| 2009/0313020 | A1 | 12/2009 | Koivunen |
| 2009/0313023 | A1 | 12/2009 | Jones |
| 2009/0313026 | A1 | 12/2009 | Coffman et al. |
| 2009/0313544 | A1 | 12/2009 | Wood et al. |
| 2009/0313564 | A1 | 12/2009 | Rottler et al. |
| 2009/0316943 | A1 | 12/2009 | Frigola Munoz et al. |
| 2009/0318119 | A1 | 12/2009 | Basir et al. |
| 2009/0318198 | A1 | 12/2009 | Carroll |
| 2009/0319257 | A1 | 12/2009 | Blume et al. |
| 2009/0319266 | A1 | 12/2009 | Brown et al. |
| 2009/0319342 | A1 | 12/2009 | Shilman et al. |
| 2009/0326923 | A1 | 12/2009 | Yan et al. |
| 2009/0326936 | A1 | 12/2009 | Nagashima |
| 2009/0326938 | A1 | 12/2009 | Marila et al. |
| 2009/0326949 | A1 | 12/2009 | Douthitt et al. |
| 2009/0327977 | A1 | 12/2009 | Bachfischer et al. |
| 2010/0004918 | A1 | 1/2010 | Lee et al. |
| 2010/0004930 | A1 | 1/2010 | Strope et al. |
| 2010/0004931 | A1 | 1/2010 | Ma et al. |
| 2010/0005081 | A1 | 1/2010 | Bennett |
| 2010/0010803 | A1 | 1/2010 | Ishikawa et al. |
| 2010/0010814 | A1 | 1/2010 | Patel |
| 2010/0010948 | A1 | 1/2010 | Ito et al. |
| 2010/0013760 | A1 | 1/2010 | Hirai et al. |
| 2010/0013796 | A1 | 1/2010 | Abileah et al. |
| 2010/0017212 | A1 | 1/2010 | Attwater et al. |
| 2010/0017382 | A1 | 1/2010 | Katragadda et al. |
| 2010/0019834 | A1 | 1/2010 | Zerbe et al. |
| 2010/0023318 | A1 | 1/2010 | Lemoine |
| 2010/0023320 | A1 | 1/2010 | Di Cristo et al. |
| 2010/0023331 | A1 | 1/2010 | Duta et al. |
| 2010/0026526 | A1 | 2/2010 | Yokota |
| 2010/0030549 | A1 | 2/2010 | Lee et al. |
| 2010/0030928 | A1 | 2/2010 | Conroy et al. |

(56) References Cited

U.S. PATENT DOCUMENTS

2010/0031143 A1 2/2010 Rao et al.
2010/0036653 A1 2/2010 Kim et al.
2010/0036655 A1 2/2010 Cecil et al.
2010/0036660 A1 2/2010 Bennett
2010/0036829 A1 2/2010 Leyba
2010/0036928 A1 2/2010 Granito et al.
2010/0037183 A1 2/2010 Miyashita et al.
2010/0042400 A1 2/2010 Block et al.
2010/0042576 A1 2/2010 Roettger et al.
2010/0046842 A1 2/2010 Conwell et al.
2010/0049498 A1 2/2010 Cao et al.
2010/0049514 A1 2/2010 Kennewick et al.
2010/0050064 A1 2/2010 Liu et al.
2010/0054512 A1 3/2010 Solum
2010/0057435 A1 3/2010 Kent et al.
2010/0057443 A1 3/2010 Di Cristo et al.
2010/0057457 A1 3/2010 Ogata et al.
2010/0057461 A1 3/2010 Neubacher et al.
2010/0057643 A1 3/2010 Yang
2010/0058200 A1 3/2010 Jablokov et al.
2010/0060646 A1 3/2010 Unsal et al.
2010/0063804 A1 3/2010 Sato et al.
2010/0063825 A1 3/2010 Williams et al.
2010/0063961 A1 3/2010 Guiheneuf et al.
2010/0064113 A1 3/2010 Lindahl et al.
2010/0064218 A1 3/2010 Bull et al.
2010/0064226 A1 3/2010 Stefaniak et al.
2010/0066546 A1 3/2010 Aaron
2010/0066684 A1 3/2010 Shahraray et al.
2010/0067723 A1 3/2010 Bergmann et al.
2010/0067867 A1 3/2010 Lin et al.
2010/0070281 A1 3/2010 Conkie et al.
2010/0070517 A1 3/2010 Ghosh et al.
2010/0070521 A1 3/2010 Clinchant et al.
2010/0070899 A1 3/2010 Hunt et al.
2010/0071003 A1 3/2010 Bychkov et al.
2010/0076760 A1 3/2010 Kraenzel et al.
2010/0076993 A1 3/2010 Klawitter et al.
2010/0077350 A1 3/2010 Lim et al.
2010/0079501 A1 4/2010 Ikeda et al.
2010/0080398 A1 4/2010 Waldmann
2010/0080470 A1 4/2010 Deluca et al.
2010/0081456 A1 4/2010 Singh et al.
2010/0081487 A1 4/2010 Chen et al.
2010/0082286 A1 4/2010 Leung
2010/0082327 A1 4/2010 Rogers et al.
2010/0082328 A1 4/2010 Rogers et al.
2010/0082329 A1 4/2010 Silverman et al.
2010/0082333 A1 4/2010 Al-Shammari
2010/0082346 A1 4/2010 Rogers et al.
2010/0082347 A1 4/2010 Rogers et al.
2010/0082348 A1 4/2010 Silverman et al.
2010/0082349 A1 4/2010 Bellegarda et al.
2010/0082567 A1 4/2010 Rosenblatt et al.
2010/0082970 A1 4/2010 Lindahl et al.
2010/0086152 A1 4/2010 Rank et al.
2010/0086153 A1 4/2010 Hagen et al.
2010/0086156 A1 4/2010 Rank et al.
2010/0088020 A1 4/2010 Sano et al.
2010/0088093 A1 4/2010 Lee et al.
2010/0088100 A1 4/2010 Lindahl
2010/0094632 A1 4/2010 Davis et al.
2010/0098231 A1 4/2010 Wohlert et al.
2010/0100212 A1 4/2010 Lindahl et al.
2010/0100384 A1 4/2010 Ju et al.
2010/0100385 A1 4/2010 Davis et al.
2010/0100816 A1 4/2010 Mccloskey et al.
2010/0103776 A1 4/2010 Chan
2010/0106486 A1 4/2010 Hua et al.
2010/0106498 A1 4/2010 Morrison et al.
2010/0106500 A1 4/2010 McKee et al.
2010/0106503 A1 4/2010 Farrell et al.
2010/0114856 A1 5/2010 Kuboyama
2010/0114887 A1 5/2010 Conway et al.
2010/0121637 A1 5/2010 Roy et al.
2010/0125456 A1 5/2010 Weng et al.
2010/0125458 A1 5/2010 Franco et al.
2010/0125460 A1 5/2010 Mellott et al.
2010/0125811 A1 5/2010 Moore et al.
2010/0131269 A1 5/2010 Park et al.
2010/0131273 A1 5/2010 Aley-Raz et al.
2010/0131498 A1 5/2010 Linthicum et al.
2010/0131899 A1 5/2010 Hubert
2010/0138215 A1 6/2010 Williams
2010/0138224 A1 6/2010 Bedingfield, Sr.
2010/0138416 A1 6/2010 Bellotti
2010/0138680 A1 6/2010 Brisebois et al.
2010/0138759 A1 6/2010 Roy
2010/0138798 A1 6/2010 Wilson et al.
2010/0142740 A1 6/2010 Roerup
2010/0145694 A1 6/2010 Ju et al.
2010/0145700 A1 6/2010 Kennewick et al.
2010/0145707 A1 6/2010 Ljolje et al.
2010/0146442 A1 6/2010 Nagasaka et al.
2010/0150321 A1 6/2010 Harris et al.
2010/0153114 A1 6/2010 Shih et al.
2010/0153115 A1 6/2010 Klee et al.
2010/0153448 A1 6/2010 Harpur et al.
2010/0161311 A1 6/2010 Massuh
2010/0161313 A1 6/2010 Karttunen
2010/0161337 A1 6/2010 Pulz et al.
2010/0161554 A1 6/2010 Datuashvili et al.
2010/0164897 A1 7/2010 Morin et al.
2010/0169075 A1 7/2010 Raffa et al.
2010/0169093 A1 7/2010 Washio
2010/0169097 A1 7/2010 Nachman et al.
2010/0169098 A1 7/2010 Patch
2010/0171713 A1 7/2010 Kwok et al.
2010/0174544 A1 7/2010 Heifets
2010/0175066 A1 7/2010 Paik
2010/0179932 A1 7/2010 Yoon et al.
2010/0179991 A1 7/2010 Lorch et al.
2010/0180218 A1 7/2010 Boston et al.
2010/0185448 A1 7/2010 Meisel
2010/0185949 A1 7/2010 Jaeger
2010/0191520 A1 7/2010 Gruhn et al.
2010/0197359 A1 8/2010 Harris
2010/0199180 A1 8/2010 Brichter et al.
2010/0199215 A1 8/2010 Seymour et al.
2010/0204986 A1 8/2010 Kennewick et al.
2010/0211199 A1 8/2010 Naik et al.
2010/0211379 A1 8/2010 Gorman et al.
2010/0211644 A1 8/2010 Lavoie et al.
2010/0216509 A1 8/2010 Riemer et al.
2010/0217604 A1 8/2010 Baldwin et al.
2010/0222033 A1 9/2010 Scott et al.
2010/0222098 A1 9/2010 Garg
2010/0223055 A1 9/2010 Mclean
2010/0223056 A1 9/2010 Kadirkamanathan et al.
2010/0223131 A1 9/2010 Scott et al.
2010/0225599 A1 9/2010 Danielsson et al.
2010/0225809 A1 9/2010 Connors et al.
2010/0227642 A1 9/2010 Kim et al.
2010/0228540 A1 9/2010 Bennett
2010/0228549 A1 9/2010 Herman et al.
2010/0228691 A1 9/2010 Yang et al.
2010/0229082 A1 9/2010 Karmarkar et al.
2010/0229100 A1 9/2010 Miller et al.
2010/0231474 A1 9/2010 Yamagajo et al.
2010/0235167 A1 9/2010 Bourdon
2010/0235341 A1 9/2010 Bennett
2010/0235729 A1 9/2010 Kocienda et al.
2010/0235732 A1 9/2010 Bergman
2010/0235770 A1 9/2010 Ording et al.
2010/0235780 A1 9/2010 Westerman et al.
2010/0241418 A1 9/2010 Maeda et al.
2010/0250542 A1 9/2010 Fujimaki
2010/0250599 A1 9/2010 Schmidt et al.
2010/0255858 A1 10/2010 Juhasz
2010/0257160 A1 10/2010 Cao
2010/0257478 A1 10/2010 Longe et al.
2010/0262599 A1 10/2010 Nitz
2010/0263015 A1 10/2010 Pandey et al.
2010/0268537 A1 10/2010 Al-Telmissani

(56) References Cited

U.S. PATENT DOCUMENTS

| | | | |
|---|---|---|---|
| 2010/0268539 | A1 | 10/2010 | Xu et al. |
| 2010/0269040 | A1 | 10/2010 | Lee |
| 2010/0274753 | A1 | 10/2010 | Liberty et al. |
| 2010/0277579 | A1 | 11/2010 | Cho et al. |
| 2010/0278320 | A1 | 11/2010 | Arsenault et al. |
| 2010/0278453 | A1 | 11/2010 | King |
| 2010/0280983 | A1 | 11/2010 | Cho et al. |
| 2010/0281034 | A1 | 11/2010 | Petrou et al. |
| 2010/0286984 | A1 | 11/2010 | Wandinger et al. |
| 2010/0286985 | A1 | 11/2010 | Kennewick et al. |
| 2010/0287514 | A1 | 11/2010 | Cragun et al. |
| 2010/0290632 | A1 | 11/2010 | Lin |
| 2010/0293460 | A1 | 11/2010 | Budelli |
| 2010/0295645 | A1 | 11/2010 | Falldin et al. |
| 2010/0299133 | A1 | 11/2010 | Kopparapu et al. |
| 2010/0299138 | A1 | 11/2010 | Kim |
| 2010/0299142 | A1 | 11/2010 | Freeman et al. |
| 2010/0302056 | A1 | 12/2010 | Dutton et al. |
| 2010/0304342 | A1 | 12/2010 | Zilber |
| 2010/0304705 | A1 | 12/2010 | Hursey et al. |
| 2010/0305807 | A1 | 12/2010 | Basir et al. |
| 2010/0305947 | A1 | 12/2010 | Schwarz et al. |
| 2010/0312547 | A1 | 12/2010 | Van Os et al. |
| 2010/0312566 | A1 | 12/2010 | Odinak et al. |
| 2010/0318366 | A1 | 12/2010 | Sullivan et al. |
| 2010/0318576 | A1 | 12/2010 | Kim |
| 2010/0322438 | A1 | 12/2010 | Siotis |
| 2010/0324709 | A1 | 12/2010 | Starmen |
| 2010/0324895 | A1 | 12/2010 | Kurzweil et al. |
| 2010/0324896 | A1 | 12/2010 | Attwater et al. |
| 2010/0324905 | A1 | 12/2010 | Kurzweil et al. |
| 2010/0325131 | A1 | 12/2010 | Dumais et al. |
| 2010/0325158 | A1 | 12/2010 | Oral et al. |
| 2010/0325573 | A1 | 12/2010 | Estrada et al. |
| 2010/0325588 | A1 | 12/2010 | Reddy et al. |
| 2010/0330908 | A1 | 12/2010 | Maddern et al. |
| 2010/0332220 | A1 | 12/2010 | Hursey et al. |
| 2010/0332224 | A1 | 12/2010 | Mäkelä et al. |
| 2010/0332235 | A1 | 12/2010 | David |
| 2010/0332236 | A1 | 12/2010 | Tan |
| 2010/0332280 | A1 | 12/2010 | Bradley et al. |
| 2010/0332348 | A1 | 12/2010 | Cao |
| 2010/0332428 | A1 | 12/2010 | Mchenry et al. |
| 2010/0332976 | A1 | 12/2010 | Fux et al. |
| 2010/0333030 | A1 | 12/2010 | Johns |
| 2010/0333163 | A1 | 12/2010 | Daly |
| 2011/0002487 | A1 | 1/2011 | Panther et al. |
| 2011/0004475 | A1 | 1/2011 | Bellegarda |
| 2011/0006876 | A1 | 1/2011 | Moberg et al. |
| 2011/0009107 | A1 | 1/2011 | Guba et al. |
| 2011/0010178 | A1 | 1/2011 | Lee et al. |
| 2011/0010644 | A1 | 1/2011 | Merrill et al. |
| 2011/0015928 | A1 | 1/2011 | Odell et al. |
| 2011/0016150 | A1 | 1/2011 | Engstrom et al. |
| 2011/0016421 | A1 | 1/2011 | Krupka et al. |
| 2011/0018695 | A1 | 1/2011 | Bells et al. |
| 2011/0021211 | A1 | 1/2011 | Ohki |
| 2011/0021213 | A1 | 1/2011 | Carr |
| 2011/0022292 | A1 | 1/2011 | Shen et al. |
| 2011/0022388 | A1 | 1/2011 | Wu et al. |
| 2011/0022393 | A1 | 1/2011 | Waller et al. |
| 2011/0022394 | A1 | 1/2011 | Wide et al. |
| 2011/0022472 | A1 | 1/2011 | Zon et al. |
| 2011/0022952 | A1 | 1/2011 | Wu et al. |
| 2011/0029616 | A1 | 2/2011 | Wang et al. |
| 2011/0030067 | A1 | 2/2011 | Wilson |
| 2011/0033064 | A1 | 2/2011 | Johnson et al. |
| 2011/0034183 | A1 | 2/2011 | Haag et al. |
| 2011/0035144 | A1 | 2/2011 | Okamoto et al. |
| 2011/0035434 | A1 | 2/2011 | Lockwood |
| 2011/0038489 | A1 | 2/2011 | Visser et al. |
| 2011/0040707 | A1 | 2/2011 | Theisen et al. |
| 2011/0045841 | A1 | 2/2011 | Kuhlke et al. |
| 2011/0047072 | A1 | 2/2011 | Ciurea |
| 2011/0047149 | A1 | 2/2011 | Vaananen |
| 2011/0047161 | A1 | 2/2011 | Myaeng et al. |
| 2011/0047266 | A1 | 2/2011 | Yu et al. |
| 2011/0047605 | A1 | 2/2011 | Sontag et al. |
| 2011/0050591 | A1 | 3/2011 | Kim et al. |
| 2011/0050592 | A1 | 3/2011 | Kim et al. |
| 2011/0054647 | A1 | 3/2011 | Chipchase |
| 2011/0054894 | A1 | 3/2011 | Phillips et al. |
| 2011/0054901 | A1 | 3/2011 | Qin et al. |
| 2011/0055256 | A1 | 3/2011 | Phillips et al. |
| 2011/0060584 | A1 | 3/2011 | Ferrucci et al. |
| 2011/0060587 | A1 | 3/2011 | Phillips et al. |
| 2011/0060589 | A1 | 3/2011 | Weinberg et al. |
| 2011/0060807 | A1 | 3/2011 | Martin et al. |
| 2011/0064387 | A1 | 3/2011 | Mendeloff et al. |
| 2011/0065456 | A1 | 3/2011 | Brennan et al. |
| 2011/0066366 | A1 | 3/2011 | Ellanti et al. |
| 2011/0066436 | A1 | 3/2011 | Bezar |
| 2011/0066468 | A1 | 3/2011 | Huang et al. |
| 2011/0066634 | A1 | 3/2011 | Phillips et al. |
| 2011/0072033 | A1 | 3/2011 | White et al. |
| 2011/0072492 | A1 | 3/2011 | Mohler et al. |
| 2011/0076994 | A1 | 3/2011 | Kim et al. |
| 2011/0077943 | A1 | 3/2011 | Miki et al. |
| 2011/0080260 | A1 | 4/2011 | Wang et al. |
| 2011/0081889 | A1 | 4/2011 | Gao et al. |
| 2011/0082688 | A1 | 4/2011 | Kim et al. |
| 2011/0083079 | A1 | 4/2011 | Farrell et al. |
| 2011/0087491 | A1 | 4/2011 | Wittenstein et al. |
| 2011/0087685 | A1 | 4/2011 | Lin et al. |
| 2011/0090078 | A1 | 4/2011 | Kim et al. |
| 2011/0092187 | A1 | 4/2011 | Miller |
| 2011/0093261 | A1 | 4/2011 | Angott |
| 2011/0093265 | A1 | 4/2011 | Stent et al. |
| 2011/0093271 | A1 | 4/2011 | Bernard et al. |
| 2011/0093272 | A1 | 4/2011 | Isobe et al. |
| 2011/0099000 | A1 | 4/2011 | Rai et al. |
| 2011/0103682 | A1 | 5/2011 | Chidlovskii et al. |
| 2011/0105097 | A1 | 5/2011 | Tadayon et al. |
| 2011/0106736 | A1 | 5/2011 | Aharonson et al. |
| 2011/0106892 | A1 | 5/2011 | Nelson et al. |
| 2011/0110502 | A1 | 5/2011 | Daye et al. |
| 2011/0111724 | A1 | 5/2011 | Baptiste |
| 2011/0112825 | A1 | 5/2011 | Bellegarda |
| 2011/0112827 | A1 | 5/2011 | Kennewick et al. |
| 2011/0112837 | A1 | 5/2011 | Kurki-Suonio et al. |
| 2011/0112838 | A1 | 5/2011 | Adibi |
| 2011/0112921 | A1 | 5/2011 | Kennewick et al. |
| 2011/0116610 | A1 | 5/2011 | Shaw et al. |
| 2011/0119049 | A1 | 5/2011 | Ylonen |
| 2011/0119051 | A1 | 5/2011 | Li et al. |
| 2011/0119623 | A1 | 5/2011 | Kim |
| 2011/0119715 | A1 | 5/2011 | Chang et al. |
| 2011/0123004 | A1 | 5/2011 | Chang et al. |
| 2011/0125498 | A1 | 5/2011 | Pickering et al. |
| 2011/0125540 | A1 | 5/2011 | Jang et al. |
| 2011/0125701 | A1 | 5/2011 | Nair et al. |
| 2011/0130958 | A1 | 6/2011 | Stahl et al. |
| 2011/0131036 | A1 | 6/2011 | DiCristo et al. |
| 2011/0131038 | A1 | 6/2011 | Oyaizu et al. |
| 2011/0131045 | A1 | 6/2011 | Cristo et al. |
| 2011/0137636 | A1 | 6/2011 | Srihari et al. |
| 2011/0141141 | A1 | 6/2011 | Kankainen |
| 2011/0143726 | A1 | 6/2011 | de Silva |
| 2011/0143811 | A1 | 6/2011 | Rodriguez |
| 2011/0144857 | A1 | 6/2011 | Wingrove et al. |
| 2011/0144901 | A1 | 6/2011 | Wang |
| 2011/0144973 | A1 | 6/2011 | Bocchieri et al. |
| 2011/0144999 | A1 | 6/2011 | Jang et al. |
| 2011/0145718 | A1 | 6/2011 | Ketola et al. |
| 2011/0151830 | A1 | 6/2011 | Blanda et al. |
| 2011/0153209 | A1 | 6/2011 | Geelen |
| 2011/0153322 | A1 | 6/2011 | Kwak et al. |
| 2011/0153324 | A1 | 6/2011 | Ballinger et al. |
| 2011/0153329 | A1 | 6/2011 | Moorer |
| 2011/0153330 | A1 | 6/2011 | Yazdani et al. |
| 2011/0153373 | A1 | 6/2011 | Dantzig et al. |
| 2011/0154193 | A1 | 6/2011 | Creutz et al. |
| 2011/0157029 | A1 | 6/2011 | Tseng |
| 2011/0161072 | A1 | 6/2011 | Terao et al. |

(56) References Cited

U.S. PATENT DOCUMENTS

2011/0161076 A1 6/2011 Davis et al.
2011/0161079 A1 6/2011 Gruhn et al.
2011/0161309 A1 6/2011 Lung et al.
2011/0161852 A1 6/2011 Vainio et al.
2011/0166851 A1 7/2011 LeBeau et al.
2011/0167350 A1 7/2011 Hoellwarth
2011/0175810 A1 7/2011 Markovic et al.
2011/0179002 A1 7/2011 Dumitru et al.
2011/0179372 A1 7/2011 Moore et al.
2011/0183650 A1 7/2011 Mckee et al.
2011/0184721 A1 7/2011 Subramanian et al.
2011/0184730 A1 7/2011 LeBeau et al.
2011/0184736 A1 7/2011 Slotznick
2011/0184737 A1 7/2011 Nakano et al.
2011/0184768 A1 7/2011 Norton et al.
2011/0185288 A1 7/2011 Gupta et al.
2011/0191108 A1 8/2011 Friedlander
2011/0191271 A1 8/2011 Baker et al.
2011/0191344 A1 8/2011 Jin et al.
2011/0195758 A1 8/2011 Damale et al.
2011/0196670 A1 8/2011 Dang et al.
2011/0197128 A1 8/2011 Assadollahi et al.
2011/0199312 A1 8/2011 Okuta
2011/0201385 A1 8/2011 Higginbotham et al.
2011/0201387 A1 8/2011 Paek et al.
2011/0202526 A1 8/2011 Lee et al.
2011/0205149 A1 8/2011 Tom et al.
2011/0208511 A1 8/2011 Sikstrom et al.
2011/0208524 A1 8/2011 Haughay
2011/0209088 A1 8/2011 Hinckley et al.
2011/0212717 A1 9/2011 Rhoads et al.
2011/0216093 A1 9/2011 Griffin
2011/0218806 A1 9/2011 Alewine et al.
2011/0218855 A1 9/2011 Cao et al.
2011/0219018 A1 9/2011 Bailey et al.
2011/0223893 A1 9/2011 Lau et al.
2011/0224972 A1 9/2011 Millett et al.
2011/0228913 A1 9/2011 Cochinwala et al.
2011/0231182 A1 9/2011 Weider et al.
2011/0231184 A1 9/2011 Kerr
2011/0231188 A1 9/2011 Kennewick et al.
2011/0231432 A1 9/2011 Sata et al.
2011/0231474 A1 9/2011 Locker et al.
2011/0238191 A1 9/2011 Kristjansson et al.
2011/0238407 A1 9/2011 Kent
2011/0238408 A1 9/2011 Larcheveque et al.
2011/0238676 A1 9/2011 Liu et al.
2011/0239111 A1 9/2011 Grover
2011/0242007 A1 10/2011 Gray et al.
2011/0244888 A1 10/2011 Ohki
2011/0246471 A1 10/2011 Rakib et al.
2011/0249144 A1 10/2011 Chang
2011/0250570 A1 10/2011 Mack et al.
2011/0257966 A1 10/2011 Rychlik
2011/0258188 A1 10/2011 Abdalmageed et al.
2011/0260829 A1 10/2011 Lee
2011/0260861 A1 10/2011 Singh et al.
2011/0264643 A1 10/2011 Cao
2011/0264999 A1 10/2011 Bells et al.
2011/0274303 A1 11/2011 Filson et al.
2011/0276595 A1 11/2011 Kirkland et al.
2011/0276598 A1 11/2011 Kozempel
2011/0276944 A1 11/2011 Bergman et al.
2011/0279368 A1 11/2011 Klein et al.
2011/0282663 A1 11/2011 Talwar et al.
2011/0282888 A1 11/2011 Koperski et al.
2011/0282906 A1 11/2011 Wong
2011/0283189 A1 11/2011 McCarty
2011/0288852 A1 11/2011 Dymetman et al.
2011/0288855 A1 11/2011 Roy
2011/0288861 A1 11/2011 Kurzweil et al.
2011/0288863 A1 11/2011 Rasmussen
2011/0288866 A1 11/2011 Rasmussen
2011/0298585 A1 12/2011 Barry
2011/0301943 A1 12/2011 Patch
2011/0302162 A1 12/2011 Xiao et al.
2011/0306426 A1 12/2011 Novak et al.
2011/0307241 A1 12/2011 Waibel et al.
2011/0307491 A1 12/2011 Fisk et al.
2011/0307810 A1 12/2011 Hilerio et al.
2011/0313775 A1 12/2011 Laligand et al.
2011/0314003 A1 12/2011 Ju et al.
2011/0314032 A1 12/2011 Bennett et al.
2011/0314404 A1 12/2011 Kotler et al.
2011/0320187 A1 12/2011 Motik et al.
2012/0002820 A1 1/2012 Leichter
2012/0005602 A1 1/2012 Anttila et al.
2012/0008754 A1 1/2012 Mukherjee et al.
2012/0010886 A1 1/2012 Razavilar
2012/0011138 A1 1/2012 Dunning et al.
2012/0013609 A1 1/2012 Reponen et al.
2012/0015629 A1 1/2012 Olsen et al.
2012/0016658 A1 1/2012 Wu et al.
2012/0016678 A1 1/2012 Gruber et al.
2012/0019400 A1 1/2012 Patel et al.
2012/0020490 A1 1/2012 Leichter
2012/0022787 A1 1/2012 LeBeau et al.
2012/0022857 A1 1/2012 Baldwin et al.
2012/0022860 A1 1/2012 Lloyd et al.
2012/0022868 A1 1/2012 LeBeau et al.
2012/0022869 A1 1/2012 Lloyd et al.
2012/0022870 A1 1/2012 Kristjansson et al.
2012/0022872 A1 1/2012 Gruber et al.
2012/0022874 A1 1/2012 Lloyd et al.
2012/0022876 A1 1/2012 LeBeau et al.
2012/0022967 A1 1/2012 Bachman et al.
2012/0023088 A1 1/2012 Cheng et al.
2012/0023095 A1 1/2012 Wadycki et al.
2012/0023462 A1 1/2012 Rosing et al.
2012/0029661 A1 2/2012 Jones et al.
2012/0029910 A1 2/2012 Medlock et al.
2012/0034904 A1 2/2012 LeBeau et al.
2012/0035907 A1 2/2012 Lebeau et al.
2012/0035908 A1 2/2012 Lebeau et al.
2012/0035924 A1 2/2012 Jitkoff et al.
2012/0035925 A1 2/2012 Friend et al.
2012/0035926 A1 2/2012 Ambler
2012/0035931 A1 2/2012 LeBeau et al.
2012/0035932 A1 2/2012 Jitkoff et al.
2012/0035935 A1 2/2012 Park et al.
2012/0036556 A1 2/2012 LeBeau et al.
2012/0039539 A1 2/2012 Boiman et al.
2012/0041752 A1 2/2012 Wang et al.
2012/0042014 A1 2/2012 Desai et al.
2012/0042343 A1 2/2012 Laligand et al.
2012/0053815 A1 3/2012 Montanari et al.
2012/0053829 A1 3/2012 Agarwal et al.
2012/0053945 A1 3/2012 Gupta et al.
2012/0056815 A1 3/2012 Mehra
2012/0059655 A1 3/2012 Cartales
2012/0059813 A1 3/2012 Sejnoha et al.
2012/0062473 A1 3/2012 Xiao et al.
2012/0066212 A1 3/2012 Jennings
2012/0066581 A1 3/2012 Spalink
2012/0075054 A1 3/2012 Ge et al.
2012/0077479 A1 3/2012 Sabotta et al.
2012/0078611 A1 3/2012 Soltani et al.
2012/0078624 A1 3/2012 Yook et al.
2012/0078627 A1 3/2012 Wagner
2012/0078635 A1 3/2012 Rothkopf et al.
2012/0078747 A1 3/2012 Chakrabarti et al.
2012/0082317 A1 4/2012 Pance et al.
2012/0083286 A1 4/2012 Kim et al.
2012/0084086 A1 4/2012 Gilbert et al.
2012/0084634 A1 4/2012 Wong et al.
2012/0088219 A1 4/2012 Briscoe et al.
2012/0089331 A1 4/2012 Schmidt et al.
2012/0101823 A1 4/2012 Weng et al.
2012/0108166 A1 5/2012 Hymel
2012/0108221 A1 5/2012 Thomas et al.
2012/0110456 A1 5/2012 Larco et al.
2012/0116770 A1 5/2012 Chen et al.
2012/0117499 A1 5/2012 Mori et al.
2012/0124126 A1 5/2012 Alcazar et al.

(56) References Cited

U.S. PATENT DOCUMENTS

2012/0128322 A1 5/2012 Shaffer et al.
2012/0130709 A1 5/2012 Bocchieri et al.
2012/0136572 A1 5/2012 Norton
2012/0136649 A1 5/2012 Freising et al.
2012/0136855 A1 5/2012 Ni et al.
2012/0136985 A1 5/2012 Popescu et al.
2012/0137367 A1 5/2012 Dupont et al.
2012/0149342 A1 6/2012 Cohen et al.
2012/0149394 A1 6/2012 Singh et al.
2012/0150544 A1 6/2012 McLoughlin et al.
2012/0150580 A1 6/2012 Norton
2012/0158293 A1 6/2012 Burnham
2012/0158399 A1 6/2012 Tremblay et al.
2012/0158422 A1 6/2012 Burnham et al.
2012/0159380 A1 6/2012 Kocienda et al.
2012/0163710 A1 6/2012 Skaff et al.
2012/0166196 A1 6/2012 Ju et al.
2012/0173222 A1 7/2012 Wang et al.
2012/0173244 A1 7/2012 Kwak et al.
2012/0173464 A1 7/2012 Tur et al.
2012/0174121 A1 7/2012 Treat et al.
2012/0179457 A1 7/2012 Newman et al.
2012/0179467 A1 7/2012 Williams
2012/0185237 A1 7/2012 Gajic et al.
2012/0185480 A1 7/2012 Ni et al.
2012/0185781 A1 7/2012 Guzman et al.
2012/0191461 A1 7/2012 Lin et al.
2012/0192096 A1 7/2012 Bowman et al.
2012/0197743 A1 8/2012 Grigg et al.
2012/0197995 A1 8/2012 Caruso
2012/0197998 A1 8/2012 Kessel et al.
2012/0201362 A1 8/2012 Crossan et al.
2012/0209853 A1 8/2012 Desai et al.
2012/0209874 A1 8/2012 Wong et al.
2012/0210266 A1 8/2012 Jiang et al.
2012/0214141 A1 8/2012 Raya et al.
2012/0214517 A1 8/2012 Singh et al.
2012/0215762 A1 8/2012 Hall et al.
2012/0221339 A1 8/2012 Wang et al.
2012/0221552 A1 8/2012 Reponen et al.
2012/0223889 A1 9/2012 Medlock et al.
2012/0223936 A1 9/2012 Aughey et al.
2012/0232885 A1 9/2012 Barbosa et al.
2012/0232886 A1 9/2012 Capuozzo et al.
2012/0232906 A1 9/2012 Lindahl et al.
2012/0233207 A1 9/2012 Mohajer
2012/0233266 A1 9/2012 Hassan et al.
2012/0239661 A1 9/2012 Giblin
2012/0239761 A1 9/2012 Linner et al.
2012/0242482 A1 9/2012 Elumalai et al.
2012/0245719 A1 9/2012 Story, Jr. et al.
2012/0245939 A1 9/2012 Braho et al.
2012/0245941 A1 9/2012 Cheyer
2012/0245944 A1 9/2012 Gruber et al.
2012/0246064 A1 9/2012 Balkow
2012/0250858 A1 10/2012 Iqbal et al.
2012/0252367 A1 10/2012 Gaglio et al.
2012/0252540 A1 10/2012 Kirigaya
2012/0253785 A1 10/2012 Hamid et al.
2012/0253791 A1 10/2012 Heck et al.
2012/0254143 A1 10/2012 Varma et al.
2012/0254152 A1 10/2012 Park et al.
2012/0254290 A1 10/2012 Naaman
2012/0259615 A1 10/2012 Morin et al.
2012/0262296 A1 10/2012 Bezar
2012/0265528 A1 10/2012 Gruber et al.
2012/0265535 A1 10/2012 Bryant-Rich et al.
2012/0265806 A1 10/2012 Blanchflower et al.
2012/0271625 A1 10/2012 Bernard
2012/0271634 A1 10/2012 Lenke
2012/0271635 A1 10/2012 Ljolje
2012/0271640 A1 10/2012 Basir
2012/0271676 A1 10/2012 Aravamudan et al.
2012/0275377 A1 11/2012 Lehane et al.
2012/0284015 A1 11/2012 Drewes
2012/0284027 A1 11/2012 Mallett et al.
2012/0290291 A1 11/2012 Shelley et al.
2012/0290300 A1 11/2012 Lee et al.
2012/0295708 A1 11/2012 Hernandez-Abrego et al.
2012/0296638 A1 11/2012 Patwa
2012/0296649 A1 11/2012 Bansal et al.
2012/0296654 A1 11/2012 Hendrickson et al.
2012/0296891 A1 11/2012 Rangan
2012/0297348 A1 11/2012 Santoro
2012/0303369 A1 11/2012 Brush et al.
2012/0303371 A1 11/2012 Labsky et al.
2012/0304124 A1 11/2012 Chen et al.
2012/0309363 A1 12/2012 Gruber et al.
2012/0310642 A1 12/2012 Cao et al.
2012/0310649 A1 12/2012 Cannistraro et al.
2012/0310652 A1 12/2012 O'Sullivan
2012/0310922 A1 12/2012 Johnson et al.
2012/0311478 A1 12/2012 Van Os et al.
2012/0311583 A1 12/2012 Gruber et al.
2012/0311584 A1 12/2012 Gruber et al.
2012/0311585 A1 12/2012 Gruber et al.
2012/0316862 A1 12/2012 Sultan et al.
2012/0316875 A1 12/2012 Nyquist et al.
2012/0316878 A1 12/2012 Singleton et al.
2012/0317194 A1 12/2012 Tian
2012/0317498 A1 12/2012 Logan et al.
2012/0321112 A1 12/2012 Schubert et al.
2012/0324391 A1 12/2012 Tocci et al.
2012/0327009 A1 12/2012 Fleizach
2012/0329529 A1 12/2012 van der Raadt
2012/0330660 A1 12/2012 Jaiswal
2012/0330661 A1 12/2012 Lindahl
2012/0330990 A1 12/2012 Chen et al.
2013/0002716 A1 1/2013 Walker et al.
2013/0005405 A1 1/2013 Prociw
2013/0006633 A1 1/2013 Grokop et al.
2013/0006637 A1 1/2013 Kanevsky et al.
2013/0006638 A1 1/2013 Lindahl
2013/0007648 A1 1/2013 Gamon et al.
2013/0009858 A1 1/2013 Lacey
2013/0010575 A1 1/2013 He et al.
2013/0013313 A1 1/2013 Shechtman et al.
2013/0013319 A1 1/2013 Grant et al.
2013/0018659 A1 1/2013 Chi
2013/0024576 A1 1/2013 Dishneau et al.
2013/0027875 A1 1/2013 Zhu et al.
2013/0030787 A1 1/2013 Cancedda et al.
2013/0030789 A1 1/2013 Dalce
2013/0030804 A1 1/2013 Zavaliagko et al.
2013/0030815 A1 1/2013 Madhvanath et al.
2013/0030913 A1 1/2013 Zhu et al.
2013/0030955 A1 1/2013 David
2013/0031162 A1 1/2013 Willis et al.
2013/0031476 A1 1/2013 Coin et al.
2013/0033643 A1 2/2013 Kim et al.
2013/0035086 A1 2/2013 Chardon et al.
2013/0035942 A1 2/2013 Kim et al.
2013/0035961 A1 2/2013 Yegnanarayanan
2013/0041647 A1 2/2013 Ramerth et al.
2013/0041654 A1 2/2013 Walker et al.
2013/0041661 A1 2/2013 Lee et al.
2013/0041665 A1 2/2013 Jang et al.
2013/0041667 A1 2/2013 Longe et al.
2013/0041968 A1 2/2013 Cohen et al.
2013/0046544 A1 2/2013 Kay et al.
2013/0050089 A1 2/2013 Neels et al.
2013/0054550 A1 2/2013 Bolohan
2013/0054609 A1 2/2013 Rajput et al.
2013/0054613 A1 2/2013 Bishop
2013/0054675 A1 2/2013 Jenkins et al.
2013/0054706 A1 2/2013 Graham et al.
2013/0055099 A1 2/2013 Yao et al.
2013/0055147 A1 2/2013 Vasudev et al.
2013/0063611 A1 3/2013 Papakipos et al.
2013/0066832 A1 3/2013 Sheehan et al.
2013/0067307 A1 3/2013 Tian et al.
2013/0073286 A1 3/2013 Bastea-Forte et al.
2013/0073293 A1 3/2013 Jang et al.
2013/0073346 A1 3/2013 Chun et al.

(56) References Cited

U.S. PATENT DOCUMENTS

| | | | |
|---|---|---|---|
| 2013/0080152 | A1 | 3/2013 | Brun et al. |
| 2013/0080162 | A1 | 3/2013 | Chang et al. |
| 2013/0080167 | A1 | 3/2013 | Mozer |
| 2013/0080177 | A1 | 3/2013 | Chen |
| 2013/0080251 | A1 | 3/2013 | Dempski |
| 2013/0082967 | A1 | 4/2013 | Hillis et al. |
| 2013/0085755 | A1 | 4/2013 | Bringert et al. |
| 2013/0085761 | A1 | 4/2013 | Bringert et al. |
| 2013/0090921 | A1 | 4/2013 | Liu et al. |
| 2013/0091090 | A1 | 4/2013 | Spivack et al. |
| 2013/0095805 | A1 | 4/2013 | Lebeau et al. |
| 2013/0096909 | A1 | 4/2013 | Brun et al. |
| 2013/0096917 | A1 | 4/2013 | Edgar et al. |
| 2013/0097566 | A1 | 4/2013 | Berglund |
| 2013/0097682 | A1 | 4/2013 | Zeljkovic et al. |
| 2013/0100268 | A1 | 4/2013 | Mihailidis et al. |
| 2013/0103391 | A1 | 4/2013 | Millmore et al. |
| 2013/0103405 | A1 | 4/2013 | Namba et al. |
| 2013/0106742 | A1 | 5/2013 | Lee et al. |
| 2013/0110505 | A1 | 5/2013 | Gruber et al. |
| 2013/0110515 | A1 | 5/2013 | Guzzoni et al. |
| 2013/0110518 | A1 | 5/2013 | Gruber et al. |
| 2013/0110519 | A1 | 5/2013 | Cheyer et al. |
| 2013/0110520 | A1 | 5/2013 | Cheyer et al. |
| 2013/0110943 | A1 | 5/2013 | Menon et al. |
| 2013/0111330 | A1 | 5/2013 | Staikos et al. |
| 2013/0111348 | A1 | 5/2013 | Gruber et al. |
| 2013/0111365 | A1 | 5/2013 | Chen et al. |
| 2013/0111487 | A1 | 5/2013 | Cheyer et al. |
| 2013/0111581 | A1 | 5/2013 | Griffin et al. |
| 2013/0115927 | A1 | 5/2013 | Gruber et al. |
| 2013/0117022 | A1 | 5/2013 | Chen et al. |
| 2013/0124189 | A1 | 5/2013 | Baldwin et al. |
| 2013/0132084 | A1 | 5/2013 | Stonehocker et al. |
| 2013/0132089 | A1 | 5/2013 | Fanty et al. |
| 2013/0132871 | A1 | 5/2013 | Zeng et al. |
| 2013/0141551 | A1 | 6/2013 | Kim |
| 2013/0142317 | A1 | 6/2013 | Reynolds |
| 2013/0142345 | A1 | 6/2013 | Waldmann |
| 2013/0144594 | A1 | 6/2013 | Bangalore et al. |
| 2013/0144616 | A1 | 6/2013 | Bangalore et al. |
| 2013/0151339 | A1 | 6/2013 | Kim et al. |
| 2013/0152092 | A1 | 6/2013 | Yadgar et al. |
| 2013/0154811 | A1 | 6/2013 | Ferren et al. |
| 2013/0157629 | A1 | 6/2013 | Lee et al. |
| 2013/0158977 | A1 | 6/2013 | Senior |
| 2013/0159847 | A1 | 6/2013 | Banke et al. |
| 2013/0165232 | A1 | 6/2013 | Nelson et al. |
| 2013/0166303 | A1 | 6/2013 | Chang et al. |
| 2013/0166442 | A1 | 6/2013 | Nakajima et al. |
| 2013/0170738 | A1 | 7/2013 | Capuozzo et al. |
| 2013/0172022 | A1 | 7/2013 | Seymour et al. |
| 2013/0176244 | A1 | 7/2013 | Yamamoto et al. |
| 2013/0176592 | A1 | 7/2013 | Sasaki |
| 2013/0179172 | A1 | 7/2013 | Nakamura et al. |
| 2013/0179440 | A1 | 7/2013 | Gordon |
| 2013/0183944 | A1 | 7/2013 | Mozer et al. |
| 2013/0185059 | A1 | 7/2013 | Riccardi et al. |
| 2013/0185074 | A1 | 7/2013 | Gruber et al. |
| 2013/0185081 | A1 | 7/2013 | Cheyer et al. |
| 2013/0185336 | A1 | 7/2013 | Singh et al. |
| 2013/0187850 | A1 | 7/2013 | Schulz et al. |
| 2013/0191117 | A1 | 7/2013 | Atti et al. |
| 2013/0197911 | A1 | 8/2013 | Wei et al. |
| 2013/0204813 | A1 | 8/2013 | Master et al. |
| 2013/0204897 | A1 | 8/2013 | McDougall |
| 2013/0207898 | A1 | 8/2013 | Sullivan et al. |
| 2013/0218553 | A1 | 8/2013 | Fujii et al. |
| 2013/0218560 | A1 | 8/2013 | Hsiao et al. |
| 2013/0219333 | A1 | 8/2013 | Palwe et al. |
| 2013/0222249 | A1 | 8/2013 | Pasquero et al. |
| 2013/0225128 | A1 | 8/2013 | Gomar |
| 2013/0226935 | A1 | 8/2013 | Bai et al. |
| 2013/0231917 | A1 | 9/2013 | Naik |
| 2013/0234947 | A1 | 9/2013 | Kristensson et al. |
| 2013/0235987 | A1 | 9/2013 | Arroniz-Escobar et al. |
| 2013/0238647 | A1 | 9/2013 | Thompson |
| 2013/0244615 | A1 | 9/2013 | Miller et al. |
| 2013/0246048 | A1 | 9/2013 | Nagase et al. |
| 2013/0246050 | A1 | 9/2013 | Yu et al. |
| 2013/0246329 | A1 | 9/2013 | Pasquero et al. |
| 2013/0253911 | A1 | 9/2013 | Petri et al. |
| 2013/0253912 | A1 | 9/2013 | Medlock et al. |
| 2013/0268263 | A1 | 10/2013 | Park et al. |
| 2013/0275117 | A1 | 10/2013 | Winer |
| 2013/0275138 | A1 | 10/2013 | Gruber et al. |
| 2013/0275164 | A1 | 10/2013 | Gruber et al. |
| 2013/0275199 | A1 | 10/2013 | Proctor, Jr. et al. |
| 2013/0275625 | A1 | 10/2013 | Taivalsaari et al. |
| 2013/0275875 | A1 | 10/2013 | Gruber et al. |
| 2013/0275899 | A1 | 10/2013 | Schubert et al. |
| 2013/0282709 | A1 | 10/2013 | Zhu et al. |
| 2013/0283168 | A1 | 10/2013 | Brown et al. |
| 2013/0289991 | A1 | 10/2013 | Eshwar et al. |
| 2013/0289993 | A1 | 10/2013 | Rao et al. |
| 2013/0289994 | A1 | 10/2013 | Newman et al. |
| 2013/0291015 | A1 | 10/2013 | Pan |
| 2013/0297317 | A1 | 11/2013 | Lee et al. |
| 2013/0297319 | A1 | 11/2013 | Kim |
| 2013/0297348 | A1 | 11/2013 | Cardoza et al. |
| 2013/0300645 | A1 | 11/2013 | Fedorov |
| 2013/0300648 | A1 | 11/2013 | Kim et al. |
| 2013/0303106 | A1 | 11/2013 | Martin |
| 2013/0304479 | A1 | 11/2013 | Teller et al. |
| 2013/0304758 | A1 | 11/2013 | Gruber et al. |
| 2013/0304815 | A1 | 11/2013 | Puente et al. |
| 2013/0305119 | A1 | 11/2013 | Kern et al. |
| 2013/0307855 | A1 | 11/2013 | Lamb et al. |
| 2013/0307997 | A1 | 11/2013 | O'Keefe et al. |
| 2013/0308922 | A1 | 11/2013 | Sano et al. |
| 2013/0311184 | A1 | 11/2013 | Badavne et al. |
| 2013/0311997 | A1 | 11/2013 | Gruber et al. |
| 2013/0316746 | A1 | 11/2013 | Miller et al. |
| 2013/0322634 | A1 | 12/2013 | Bennett et al. |
| 2013/0325436 | A1 | 12/2013 | Wang et al. |
| 2013/0325443 | A1 | 12/2013 | Begeja et al. |
| 2013/0325447 | A1 | 12/2013 | Levien et al. |
| 2013/0325448 | A1 | 12/2013 | Levien et al. |
| 2013/0325481 | A1 | 12/2013 | Van Os et al. |
| 2013/0325484 | A1 | 12/2013 | Chakladar et al. |
| 2013/0325967 | A1 | 12/2013 | Parks et al. |
| 2013/0325970 | A1 | 12/2013 | Roberts et al. |
| 2013/0325979 | A1 | 12/2013 | Mansfield et al. |
| 2013/0329023 | A1 | 12/2013 | Suplee, III et al. |
| 2013/0331127 | A1 | 12/2013 | Sabatelli et al. |
| 2013/0332159 | A1 | 12/2013 | Federighi et al. |
| 2013/0332162 | A1 | 12/2013 | Keen |
| 2013/0332164 | A1 | 12/2013 | Nalk |
| 2013/0332168 | A1 | 12/2013 | Kim et al. |
| 2013/0332172 | A1 | 12/2013 | Prakash et al. |
| 2013/0332400 | A1 | 12/2013 | González |
| 2013/0339256 | A1 | 12/2013 | Shroff |
| 2013/0346068 | A1 | 12/2013 | Solem et al. |
| 2013/0346347 | A1 | 12/2013 | Patterson et al. |
| 2014/0006012 | A1 | 1/2014 | Zhou et al. |
| 2014/0006025 | A1 | 1/2014 | Krishnan et al. |
| 2014/0006027 | A1 | 1/2014 | Kim et al. |
| 2014/0006030 | A1 | 1/2014 | Fleizach et al. |
| 2014/0006153 | A1 | 1/2014 | Thangam et al. |
| 2014/0012574 | A1 | 1/2014 | Pasupalak et al. |
| 2014/0012580 | A1 | 1/2014 | Ganong et al. |
| 2014/0012586 | A1 | 1/2014 | Rubin et al. |
| 2014/0019116 | A1 | 1/2014 | Lundberg et al. |
| 2014/0019133 | A1 | 1/2014 | Bao et al. |
| 2014/0019460 | A1 | 1/2014 | Sambrani et al. |
| 2014/0028735 | A1 | 1/2014 | Williams et al. |
| 2014/0032453 | A1 | 1/2014 | Eustice et al. |
| 2014/0033071 | A1 | 1/2014 | Gruber et al. |
| 2014/0035823 | A1 | 2/2014 | Khoe et al. |
| 2014/0039893 | A1 | 2/2014 | Weiner |
| 2014/0039894 | A1 | 2/2014 | Shostak |
| 2014/0040274 | A1 | 2/2014 | Aravamudan et al. |
| 2014/0040748 | A1 | 2/2014 | Lemay et al. |
| 2014/0040801 | A1 | 2/2014 | Patel et al. |

(56) References Cited

U.S. PATENT DOCUMENTS

| | | | |
|---|---|---|---|
| 2014/0040918 | A1 | 2/2014 | Li et al. |
| 2014/0046934 | A1 | 2/2014 | Zhou et al. |
| 2014/0047001 | A1 | 2/2014 | Phillips et al. |
| 2014/0052680 | A1 | 2/2014 | Nitz et al. |
| 2014/0052791 | A1 | 2/2014 | Chakra et al. |
| 2014/0053082 | A1 | 2/2014 | Park et al. |
| 2014/0053210 | A1 | 2/2014 | Cheong et al. |
| 2014/0057610 | A1 | 2/2014 | Olincy et al. |
| 2014/0059030 | A1 | 2/2014 | Hakkani-Tur et al. |
| 2014/0067361 | A1 | 3/2014 | Nikoulina et al. |
| 2014/0067371 | A1 | 3/2014 | Liensberger |
| 2014/0067402 | A1 | 3/2014 | Kim |
| 2014/0068751 | A1 | 3/2014 | Last et al. |
| 2014/0074454 | A1 | 3/2014 | Brown et al. |
| 2014/0074466 | A1 | 3/2014 | Sharifi et al. |
| 2014/0074470 | A1 | 3/2014 | Jansche et al. |
| 2014/0074472 | A1 | 3/2014 | Lin et al. |
| 2014/0074483 | A1 | 3/2014 | Van Os |
| 2014/0074815 | A1 | 3/2014 | Plimton |
| 2014/0078065 | A1 | 3/2014 | Akkok et al. |
| 2014/0079195 | A1 | 3/2014 | Srivastava et al. |
| 2014/0080428 | A1 | 3/2014 | Rhoads et al. |
| 2014/0081619 | A1 | 3/2014 | Solntseva et al. |
| 2014/0081633 | A1 | 3/2014 | Badaskar et al. |
| 2014/0082501 | A1 | 3/2014 | Bae et al. |
| 2014/0086458 | A1 | 3/2014 | Rogers et al. |
| 2014/0087711 | A1 | 3/2014 | Geyer et al. |
| 2014/0088961 | A1 | 3/2014 | Woodward et al. |
| 2014/0095171 | A1 | 4/2014 | Lynch et al. |
| 2014/0095172 | A1 | 4/2014 | Cabaco et al. |
| 2014/0095173 | A1 | 4/2014 | Lynch et al. |
| 2014/0096209 | A1 | 4/2014 | Saraf et al. |
| 2014/0098247 | A1 | 4/2014 | Rao et al. |
| 2014/0108017 | A1 | 4/2014 | Mason et al. |
| 2014/0114554 | A1 | 4/2014 | Lagassey |
| 2014/0118155 | A1 | 5/2014 | Bowers et al. |
| 2014/0122059 | A1 | 5/2014 | Patel et al. |
| 2014/0122086 | A1 | 5/2014 | Kapur et al. |
| 2014/0122136 | A1 | 5/2014 | Jayanthi |
| 2014/0122153 | A1 | 5/2014 | Truitt |
| 2014/0134983 | A1 | 5/2014 | Jung et al. |
| 2014/0135036 | A1 | 5/2014 | Bonanni et al. |
| 2014/0136187 | A1 | 5/2014 | Wolverton et al. |
| 2014/0136195 | A1 | 5/2014 | Abdossalami et al. |
| 2014/0136212 | A1 | 5/2014 | Kwon et al. |
| 2014/0136946 | A1 | 5/2014 | Matas |
| 2014/0136987 | A1 | 5/2014 | Rodriguez |
| 2014/0142922 | A1 | 5/2014 | Liang et al. |
| 2014/0142923 | A1 | 5/2014 | Jones et al. |
| 2014/0142935 | A1 | 5/2014 | Lindahl et al. |
| 2014/0143550 | A1 | 5/2014 | Ganong, III et al. |
| 2014/0143721 | A1 | 5/2014 | Suzuki et al. |
| 2014/0146200 | A1 | 5/2014 | Scott et al. |
| 2014/0152577 | A1 | 6/2014 | Yuen et al. |
| 2014/0155031 | A1 | 6/2014 | Lee et al. |
| 2014/0156262 | A1 | 6/2014 | Yuen et al. |
| 2014/0156279 | A1 | 6/2014 | Okamoto et al. |
| 2014/0157422 | A1 | 6/2014 | Livshits et al. |
| 2014/0163951 | A1 | 6/2014 | Nikoulina et al. |
| 2014/0163953 | A1 | 6/2014 | Parikh |
| 2014/0163954 | A1 | 6/2014 | Joshi et al. |
| 2014/0163977 | A1 | 6/2014 | Hoffmeister et al. |
| 2014/0163981 | A1 | 6/2014 | Cook et al. |
| 2014/0163995 | A1 | 6/2014 | Burns et al. |
| 2014/0164476 | A1 | 6/2014 | Thomson |
| 2014/0164532 | A1 | 6/2014 | Lynch et al. |
| 2014/0164533 | A1 | 6/2014 | Lynch et al. |
| 2014/0169795 | A1 | 6/2014 | Clough |
| 2014/0172878 | A1 | 6/2014 | Clark et al. |
| 2014/0173460 | A1 | 6/2014 | Kim |
| 2014/0180499 | A1 | 6/2014 | Cooper et al. |
| 2014/0180689 | A1 | 6/2014 | Kim et al. |
| 2014/0180697 | A1 | 6/2014 | Torok et al. |
| 2014/0181865 | A1 | 6/2014 | Koganei |
| 2014/0188477 | A1 | 7/2014 | Zhang |
| 2014/0195226 | A1 | 7/2014 | Yun et al. |
| 2014/0195230 | A1 | 7/2014 | Han et al. |
| 2014/0195233 | A1 | 7/2014 | Bapat |
| 2014/0195244 | A1 | 7/2014 | Cha et al. |
| 2014/0195251 | A1 | 7/2014 | Zeinstra et al. |
| 2014/0195252 | A1 | 7/2014 | Gruber et al. |
| 2014/0198048 | A1 | 7/2014 | Unruh et al. |
| 2014/0203939 | A1 | 7/2014 | Harrington et al. |
| 2014/0205076 | A1 | 7/2014 | Kumar et al. |
| 2014/0207439 | A1 | 7/2014 | Venkatapathy et al. |
| 2014/0207446 | A1 | 7/2014 | Klein et al. |
| 2014/0207468 | A1 | 7/2014 | Bartnik |
| 2014/0207582 | A1 | 7/2014 | Flinn et al. |
| 2014/0214429 | A1 | 7/2014 | Pantel |
| 2014/0214537 | A1 | 7/2014 | Yoo et al. |
| 2014/0218372 | A1 | 8/2014 | Missig et al. |
| 2014/0222436 | A1 | 8/2014 | Binder et al. |
| 2014/0222678 | A1 | 8/2014 | Sheets et al. |
| 2014/0223377 | A1 | 8/2014 | Shaw et al. |
| 2014/0223481 | A1 | 8/2014 | Fundament |
| 2014/0230055 | A1 | 8/2014 | Boehl |
| 2014/0232656 | A1 | 8/2014 | Pasquero et al. |
| 2014/0236595 | A1 | 8/2014 | Gray |
| 2014/0236986 | A1 | 8/2014 | Guzman |
| 2014/0237042 | A1 | 8/2014 | Ahmed et al. |
| 2014/0244248 | A1 | 8/2014 | Arisoy et al. |
| 2014/0244249 | A1 | 8/2014 | Mohamed et al. |
| 2014/0244254 | A1 | 8/2014 | Ju et al. |
| 2014/0244257 | A1 | 8/2014 | Colibro et al. |
| 2014/0244258 | A1 | 8/2014 | Song et al. |
| 2014/0244263 | A1 | 8/2014 | Pontual et al. |
| 2014/0244266 | A1 | 8/2014 | Brown et al. |
| 2014/0244268 | A1 | 8/2014 | Abdelsamie et al. |
| 2014/0244271 | A1 | 8/2014 | Lindahl |
| 2014/0244712 | A1 | 8/2014 | Walters et al. |
| 2014/0245140 | A1 | 8/2014 | Brown et al. |
| 2014/0247383 | A1 | 9/2014 | Dave et al. |
| 2014/0247926 | A1 | 9/2014 | Gainsboro et al. |
| 2014/0249817 | A1 | 9/2014 | Hart et al. |
| 2014/0249821 | A1 | 9/2014 | Kennewick et al. |
| 2014/0250046 | A1 | 9/2014 | Winn et al. |
| 2014/0257809 | A1 | 9/2014 | Goel et al. |
| 2014/0257815 | A1 | 9/2014 | Zhao et al. |
| 2014/0258857 | A1 | 9/2014 | Dykstra-Erickson et al. |
| 2014/0267022 | A1 | 9/2014 | Kim |
| 2014/0267599 | A1 | 9/2014 | Drouin et al. |
| 2014/0272821 | A1 | 9/2014 | Pitschel et al. |
| 2014/0274005 | A1 | 9/2014 | Luna et al. |
| 2014/0274203 | A1 | 9/2014 | Ganong et al. |
| 2014/0274211 | A1 | 9/2014 | Sejnoha et al. |
| 2014/0278343 | A1 | 9/2014 | Tran |
| 2014/0278349 | A1 | 9/2014 | Grieves et al. |
| 2014/0278379 | A1 | 9/2014 | Coccaro et al. |
| 2014/0278390 | A1 | 9/2014 | Kingsbury et al. |
| 2014/0278391 | A1 | 9/2014 | Braho et al. |
| 2014/0278394 | A1 | 9/2014 | Bastyr et al. |
| 2014/0278406 | A1 | 9/2014 | Tsumura et al. |
| 2014/0278413 | A1 | 9/2014 | Pitschel et al. |
| 2014/0278429 | A1 | 9/2014 | Ganong, III |
| 2014/0278435 | A1 | 9/2014 | Ganong et al. |
| 2014/0278436 | A1 | 9/2014 | Khanna et al. |
| 2014/0278443 | A1 | 9/2014 | Gunn et al. |
| 2014/0278513 | A1 | 9/2014 | Prakash et al. |
| 2014/0280138 | A1 | 9/2014 | Li et al. |
| 2014/0280292 | A1 | 9/2014 | Skinder |
| 2014/0280353 | A1 | 9/2014 | Delaney et al. |
| 2014/0280450 | A1 | 9/2014 | Luna |
| 2014/0281983 | A1 | 9/2014 | Xian et al. |
| 2014/0282003 | A1 | 9/2014 | Gruber et al. |
| 2014/0282007 | A1 | 9/2014 | Fleizach |
| 2014/0282045 | A1 | 9/2014 | Ayanam et al. |
| 2014/0282201 | A1 | 9/2014 | Pasquero et al. |
| 2014/0282586 | A1 | 9/2014 | Shear et al. |
| 2014/0282743 | A1 | 9/2014 | Howard et al. |
| 2014/0288990 | A1 | 9/2014 | Moore et al. |
| 2014/0289508 | A1 | 9/2014 | Wang |
| 2014/0297267 | A1 | 10/2014 | Spencer et al. |
| 2014/0297281 | A1 | 10/2014 | Togawa et al. |
| 2014/0297284 | A1 | 10/2014 | Gruber et al. |

(56) References Cited

U.S. PATENT DOCUMENTS

| | | | |
|---|---|---|---|
| 2014/0297288 | A1 | 10/2014 | Yu et al. |
| 2014/0304605 | A1 | 10/2014 | Ohmura et al. |
| 2014/0309996 | A1 | 10/2014 | Zhang |
| 2014/0310001 | A1 | 10/2014 | Kalns et al. |
| 2014/0310002 | A1 | 10/2014 | Nitz et al. |
| 2014/0316585 | A1 | 10/2014 | Boesveld et al. |
| 2014/0317030 | A1 | 10/2014 | Shen et al. |
| 2014/0317502 | A1 | 10/2014 | Brown et al. |
| 2014/0324884 | A1 | 10/2014 | Lindahl et al. |
| 2014/0330569 | A1 | 11/2014 | Kolavennu et al. |
| 2014/0337048 | A1 | 11/2014 | Brown et al. |
| 2014/0337266 | A1 | 11/2014 | Wolverton et al. |
| 2014/0337371 | A1 | 11/2014 | Li |
| 2014/0337438 | A1 | 11/2014 | Govande et al. |
| 2014/0337751 | A1 | 11/2014 | Lim et al. |
| 2014/0337814 | A1 | 11/2014 | Kalns et al. |
| 2014/0342762 | A1 | 11/2014 | Hajdu et al. |
| 2014/0344627 | A1 | 11/2014 | Schaub et al. |
| 2014/0344687 | A1 | 11/2014 | Durham et al. |
| 2014/0350924 | A1 | 11/2014 | Zurek et al. |
| 2014/0350933 | A1 | 11/2014 | Bak et al. |
| 2014/0351741 | A1 | 11/2014 | Medlock et al. |
| 2014/0351760 | A1 | 11/2014 | Skory et al. |
| 2014/0358519 | A1 | 12/2014 | Mirkin et al. |
| 2014/0358523 | A1 | 12/2014 | Sheth et al. |
| 2014/0361973 | A1 | 12/2014 | Raux et al. |
| 2014/0365209 | A1 | 12/2014 | Evermann |
| 2014/0365214 | A1 | 12/2014 | Bayley |
| 2014/0365216 | A1 | 12/2014 | Gruber et al. |
| 2014/0365226 | A1 | 12/2014 | Sinha |
| 2014/0365227 | A1 | 12/2014 | Cash et al. |
| 2014/0365407 | A1 | 12/2014 | Brown et al. |
| 2014/0365880 | A1 | 12/2014 | Bellegarda |
| 2014/0365885 | A1 | 12/2014 | Carson et al. |
| 2014/0365895 | A1 | 12/2014 | Paulson et al. |
| 2014/0365922 | A1 | 12/2014 | Yang |
| 2014/0370817 | A1 | 12/2014 | Luna |
| 2014/0370841 | A1 | 12/2014 | Roberts et al. |
| 2014/0372112 | A1 | 12/2014 | Xue et al. |
| 2014/0372356 | A1 | 12/2014 | Bilal et al. |
| 2014/0372931 | A1 | 12/2014 | Zhai et al. |
| 2014/0379334 | A1 | 12/2014 | Fry |
| 2014/0379341 | A1 | 12/2014 | Seo et al. |
| 2014/0380285 | A1 | 12/2014 | Gabel et al. |
| 2015/0003797 | A1 | 1/2015 | Schmidt |
| 2015/0006148 | A1 | 1/2015 | Goldszmit et al. |
| 2015/0006157 | A1 | 1/2015 | Andrade Silva et al. |
| 2015/0006176 | A1 | 1/2015 | Pogue et al. |
| 2015/0006178 | A1 | 1/2015 | Peng et al. |
| 2015/0006184 | A1 | 1/2015 | Marti et al. |
| 2015/0006199 | A1 | 1/2015 | Snider et al. |
| 2015/0012271 | A1 | 1/2015 | Peng et al. |
| 2015/0019219 | A1 | 1/2015 | Tzirkel-hancock et al. |
| 2015/0019221 | A1 | 1/2015 | Lee et al. |
| 2015/0031416 | A1 | 1/2015 | Wells et al. |
| 2015/0033219 | A1 | 1/2015 | Breiner et al. |
| 2015/0033275 | A1 | 1/2015 | Natani et al. |
| 2015/0039292 | A1 | 2/2015 | Suleman et al. |
| 2015/0039299 | A1 | 2/2015 | Weinstein et al. |
| 2015/0039305 | A1 | 2/2015 | Huang |
| 2015/0040012 | A1 | 2/2015 | Faaborg et al. |
| 2015/0045003 | A1 | 2/2015 | Vora et al. |
| 2015/0045068 | A1 | 2/2015 | Soffer et al. |
| 2015/0046537 | A1 | 2/2015 | Rakib |
| 2015/0050633 | A1 | 2/2015 | Christmas et al. |
| 2015/0058013 | A1 | 2/2015 | Pakhomov et al. |
| 2015/0058018 | A1 | 2/2015 | Georges et al. |
| 2015/0058785 | A1 | 2/2015 | Ookawara |
| 2015/0065200 | A1 | 3/2015 | Namgung et al. |
| 2015/0066494 | A1 | 3/2015 | Salvador et al. |
| 2015/0066496 | A1 | 3/2015 | Deoras et al. |
| 2015/0066506 | A1 | 3/2015 | Romano et al. |
| 2015/0066516 | A1 | 3/2015 | Nishikawa et al. |
| 2015/0067485 | A1 | 3/2015 | Kim et al. |
| 2015/0067822 | A1 | 3/2015 | Randall |
| 2015/0071121 | A1 | 3/2015 | Patil et al. |
| 2015/0073788 | A1 | 3/2015 | Allauzen et al. |
| 2015/0073804 | A1 | 3/2015 | Senior et al. |
| 2015/0074524 | A1 | 3/2015 | Nicholson et al. |
| 2015/0074615 | A1 | 3/2015 | Han et al. |
| 2015/0082229 | A1 | 3/2015 | Ouyang et al. |
| 2015/0088511 | A1 | 3/2015 | Bharadwaj et al. |
| 2015/0088514 | A1 | 3/2015 | Typrin |
| 2015/0088522 | A1 | 3/2015 | Hendrickson et al. |
| 2015/0088523 | A1 | 3/2015 | Schuster |
| 2015/0095031 | A1 | 4/2015 | Conkie et al. |
| 2015/0095278 | A1 | 4/2015 | Flinn et al. |
| 2015/0100316 | A1 | 4/2015 | Williams et al. |
| 2015/0100537 | A1 | 4/2015 | Grieves et al. |
| 2015/0100983 | A1 | 4/2015 | Pan |
| 2015/0106093 | A1 | 4/2015 | Weeks et al. |
| 2015/0113407 | A1 | 4/2015 | Hoffert et al. |
| 2015/0120723 | A1 | 4/2015 | Deshmukh et al. |
| 2015/0121216 | A1 | 4/2015 | Brown et al. |
| 2015/0127348 | A1 | 5/2015 | Follis |
| 2015/0127350 | A1 | 5/2015 | Agiomyrgiannakis |
| 2015/0133109 | A1 | 5/2015 | Freeman et al. |
| 2015/0134334 | A1 | 5/2015 | Sachidanandam et al. |
| 2015/0135085 | A1 | 5/2015 | Shoham et al. |
| 2015/0135123 | A1 | 5/2015 | Carr et al. |
| 2015/0142420 | A1 | 5/2015 | Sarikaya et al. |
| 2015/0142438 | A1 | 5/2015 | Dai et al. |
| 2015/0142447 | A1 | 5/2015 | Kennewick et al. |
| 2015/0142851 | A1 | 5/2015 | Gupta et al. |
| 2015/0148013 | A1 | 5/2015 | Baldwin et al. |
| 2015/0149177 | A1 | 5/2015 | Kalns et al. |
| 2015/0149182 | A1 | 5/2015 | Kalns et al. |
| 2015/0149354 | A1 | 5/2015 | Mccoy |
| 2015/0149469 | A1 | 5/2015 | Xu et al. |
| 2015/0154185 | A1 | 6/2015 | Waibel |
| 2015/0154976 | A1 | 6/2015 | Mutagi |
| 2015/0161370 | A1 | 6/2015 | North et al. |
| 2015/0161521 | A1 | 6/2015 | Shah et al. |
| 2015/0161989 | A1 | 6/2015 | Hsu et al. |
| 2015/0162001 | A1 | 6/2015 | Kar et al. |
| 2015/0163558 | A1 | 6/2015 | Wheatley |
| 2015/0169284 | A1 | 6/2015 | Quast et al. |
| 2015/0169336 | A1 | 6/2015 | Harper et al. |
| 2015/0170664 | A1 | 6/2015 | Doherty et al. |
| 2015/0172463 | A1 | 6/2015 | Quast et al. |
| 2015/0178388 | A1 | 6/2015 | Winnemoeller et al. |
| 2015/0179176 | A1 | 6/2015 | Ryu et al. |
| 2015/0185964 | A1 | 7/2015 | Stout |
| 2015/0186012 | A1 | 7/2015 | Coleman et al. |
| 2015/0186110 | A1 | 7/2015 | Kannan |
| 2015/0186154 | A1 | 7/2015 | Brown et al. |
| 2015/0186155 | A1 | 7/2015 | Brown et al. |
| 2015/0186156 | A1 | 7/2015 | Brown et al. |
| 2015/0186351 | A1 | 7/2015 | Hicks et al. |
| 2015/0187355 | A1 | 7/2015 | Parkinson et al. |
| 2015/0187369 | A1 | 7/2015 | Dadu et al. |
| 2015/0189362 | A1 | 7/2015 | Lee et al. |
| 2015/0193379 | A1 | 7/2015 | Mehta |
| 2015/0193391 | A1 | 7/2015 | Khvostichenko et al. |
| 2015/0193392 | A1 | 7/2015 | Greenblatt et al. |
| 2015/0194152 | A1 | 7/2015 | Katuri et al. |
| 2015/0195379 | A1 | 7/2015 | Zhang et al. |
| 2015/0195606 | A1 | 7/2015 | McDevitt |
| 2015/0199077 | A1 | 7/2015 | Zuger et al. |
| 2015/0199960 | A1 | 7/2015 | Huo et al. |
| 2015/0199965 | A1 | 7/2015 | Leak et al. |
| 2015/0199967 | A1 | 7/2015 | Reddy et al. |
| 2015/0201064 | A1 | 7/2015 | Bells et al. |
| 2015/0205858 | A1 | 7/2015 | Xie et al. |
| 2015/0208226 | A1 | 7/2015 | Kuusilinna et al. |
| 2015/0212791 | A1 | 7/2015 | Kumar et al. |
| 2015/0213796 | A1 | 7/2015 | Waltermann et al. |
| 2015/0220507 | A1 | 8/2015 | Mohajer et al. |
| 2015/0221304 | A1 | 8/2015 | Stewart |
| 2015/0221307 | A1 | 8/2015 | Shah et al. |
| 2015/0227505 | A1 | 8/2015 | Morimoto |
| 2015/0227633 | A1 | 8/2015 | Shapira |
| 2015/0228281 | A1 | 8/2015 | Raniere |
| 2015/0230095 | A1 | 8/2015 | Smith et al. |

(56) References Cited

U.S. PATENT DOCUMENTS

2015/0234636 A1 8/2015 Barnes, Jr.
2015/0234800 A1 8/2015 Patrick et al.
2015/0242091 A1 8/2015 Lu et al.
2015/0243278 A1 8/2015 Kibre et al.
2015/0243283 A1 8/2015 Halash et al.
2015/0245154 A1 8/2015 Dadu et al.
2015/0248651 A1 9/2015 Akutagawa et al.
2015/0248886 A1 9/2015 Sarikaya et al.
2015/0254057 A1 9/2015 Klein et al.
2015/0254058 A1 9/2015 Klein et al.
2015/0254333 A1 9/2015 Fife et al.
2015/0255071 A1 9/2015 Chiba
2015/0256873 A1 9/2015 Klein et al.
2015/0261496 A1 9/2015 Faaborg et al.
2015/0261850 A1 9/2015 Mittal
2015/0269139 A1 9/2015 McAteer et al.
2015/0277574 A1 10/2015 Jain et al.
2015/0278370 A1 10/2015 Stratvert et al.
2015/0279358 A1 10/2015 Kingsbury et al.
2015/0279360 A1 10/2015 Mengibar et al.
2015/0281380 A1 10/2015 Wang et al.
2015/0286627 A1 10/2015 Chang et al.
2015/0287401 A1 10/2015 Lee et al.
2015/0287409 A1 10/2015 Jang
2015/0288629 A1 10/2015 Choi et al.
2015/0294086 A1 10/2015 Kare et al.
2015/0294377 A1 10/2015 Chow
2015/0294516 A1 10/2015 Chiang
2015/0295915 A1 10/2015 Xiu
2015/0302855 A1 10/2015 Kim et al.
2015/0302856 A1 10/2015 Kim et al.
2015/0302857 A1 10/2015 Yamada
2015/0309997 A1 10/2015 Lee et al.
2015/0310858 A1 10/2015 Li et al.
2015/0310862 A1 10/2015 Dauphin et al.
2015/0310879 A1 10/2015 Buchanan et al.
2015/0312182 A1 10/2015 Langholz
2015/0317069 A1 11/2015 Clements et al.
2015/0317310 A1 11/2015 Eiche et al.
2015/0324041 A1 11/2015 Varley et al.
2015/0324334 A1 11/2015 Lee et al.
2015/0331664 A1 11/2015 Osawa et al.
2015/0331711 A1 11/2015 Huang et al.
2015/0332667 A1 11/2015 Mason
2015/0339049 A1 11/2015 Kasemset et al.
2015/0339391 A1 11/2015 Kang et al.
2015/0340033 A1 11/2015 Di Fabbrizio et al.
2015/0340040 A1 11/2015 Mun et al.
2015/0340042 A1 11/2015 Sejnoha et al.
2015/0341717 A1 11/2015 Song et al.
2015/0347086 A1 12/2015 Liedholm et al.
2015/0347381 A1 12/2015 Bellegarda
2015/0347382 A1 12/2015 Dolfing et al.
2015/0347385 A1 12/2015 Flor
2015/0347393 A1 12/2015 Futrell et al.
2015/0347733 A1 12/2015 Tsou et al.
2015/0347985 A1 12/2015 Gross et al.
2015/0348547 A1 12/2015 Paulik et al.
2015/0348548 A1 12/2015 Piernot et al.
2015/0348549 A1 12/2015 Giuli et al.
2015/0348551 A1 12/2015 Gruber et al.
2015/0348554 A1 12/2015 Orr et al.
2015/0350031 A1 12/2015 Burks et al.
2015/0352999 A1 12/2015 Bando et al.
2015/0355879 A1 12/2015 Beckhardt et al.
2015/0363587 A1 12/2015 Ahn et al.
2015/0364140 A1 12/2015 Thorn
2015/0370531 A1 12/2015 Faaborg
2015/0370780 A1 12/2015 Wang et al.
2015/0371639 A1 12/2015 Foerster et al.
2015/0371665 A1 12/2015 Naik et al.
2015/0373183 A1 12/2015 Woolsey et al.
2015/0382047 A1 12/2015 Napolitano et al.
2015/0382079 A1 12/2015 Lister et al.
2016/0004690 A1 1/2016 Bangalore et al.
2016/0005320 A1 1/2016 deCharms et al.
2016/0012038 A1 1/2016 Edwards et al.
2016/0014476 A1 1/2016 Caliendo, Jr. et al.
2016/0018900 A1 1/2016 Tu et al.
2016/0019886 A1 1/2016 Hong
2016/0026258 A1 1/2016 Ou et al.
2016/0027431 A1 1/2016 Kurzweil et al.
2016/0028666 A1 1/2016 Li
2016/0029316 A1 1/2016 Mohan et al.
2016/0034042 A1 2/2016 Joo
2016/0034811 A1 2/2016 Paulik et al.
2016/0042735 A1 2/2016 Vibbert et al.
2016/0042748 A1 2/2016 Jain et al.
2016/0048666 A1 2/2016 Dey et al.
2016/0055422 A1 2/2016 Li
2016/0062605 A1 3/2016 Agarwal et al.
2016/0063998 A1 3/2016 Krishnamoorthy et al.
2016/0070581 A1 3/2016 Soon-Shiong
2016/0071516 A1 3/2016 Lee et al.
2016/0071521 A1 3/2016 Haughay
2016/0072940 A1 3/2016 Cronin
2016/0077794 A1 3/2016 Kim et al.
2016/0078860 A1 3/2016 Paulik et al.
2016/0080165 A1 3/2016 Ehsani et al.
2016/0086116 A1 3/2016 Rao et al.
2016/0091967 A1 3/2016 Prokofieva et al.
2016/0092447 A1 3/2016 Venkataraman et al.
2016/0092766 A1 3/2016 Sainath et al.
2016/0093291 A1 3/2016 Kim
2016/0093298 A1 3/2016 Naik et al.
2016/0093301 A1 3/2016 Bellegarda et al.
2016/0093304 A1 3/2016 Kim et al.
2016/0094700 A1 3/2016 Lee et al.
2016/0094979 A1 3/2016 Naik et al.
2016/0098991 A1 4/2016 Luo et al.
2016/0104486 A1 4/2016 Penilla et al.
2016/0111091 A1 4/2016 Bakish
2016/0117386 A1 4/2016 Ajmera et al.
2016/0118048 A1 4/2016 Heide
2016/0119338 A1 4/2016 Cheyer
2016/0125048 A1 5/2016 Hamada
2016/0125071 A1 5/2016 Gabbai
2016/0132484 A1 5/2016 Nauze et al.
2016/0132488 A1 5/2016 Clark et al.
2016/0133254 A1 5/2016 Vogel et al.
2016/0139662 A1 5/2016 Dabhade
2016/0140951 A1 5/2016 Agiomyrgiannakis et al.
2016/0147725 A1 5/2016 Patten et al.
2016/0148610 A1 5/2016 Kennewick, Jr. et al.
2016/0155442 A1 6/2016 Kannan et al.
2016/0155443 A1 6/2016 Khan et al.
2016/0162456 A1 6/2016 Munro et al.
2016/0163311 A1 6/2016 Crook et al.
2016/0163312 A1 6/2016 Naik et al.
2016/0170966 A1 6/2016 Kolo
2016/0173578 A1 6/2016 Sharma et al.
2016/0173960 A1 6/2016 Snibbe et al.
2016/0179462 A1 6/2016 Bjorkengren
2016/0180844 A1 6/2016 Vanblon et al.
2016/0182410 A1 6/2016 Janakiraman et al.
2016/0182709 A1 6/2016 Kim et al.
2016/0188181 A1 6/2016 Smith
2016/0188738 A1 6/2016 Gruber et al.
2016/0189717 A1 6/2016 Kannan et al.
2016/0198319 A1 7/2016 Huang et al.
2016/0210981 A1 7/2016 Lee
2016/0212488 A1 7/2016 Os et al.
2016/0217784 A1 7/2016 Gelfenbeyn et al.
2016/0224540 A1 8/2016 Stewart et al.
2016/0224774 A1 8/2016 Pender
2016/0225372 A1 8/2016 Cheung et al.
2016/0240187 A1 8/2016 Fleizach et al.
2016/0247061 A1 8/2016 Trask et al.
2016/0253312 A1 9/2016 Rhodes
2016/0253528 A1 9/2016 Gao et al.
2016/0259623 A1 9/2016 Sumner et al.
2016/0259656 A1 9/2016 Sumner et al.
2016/0259779 A1 9/2016 Labsk et al.
2016/0260431 A1 9/2016 Newendorp et al.

(56) References Cited

U.S. PATENT DOCUMENTS

| | | | |
|---|---|---|---|
| 2016/0260433 | A1 | 9/2016 | Sumner et al. |
| 2016/0260434 | A1 | 9/2016 | Gelfenbeyn et al. |
| 2016/0260436 | A1 | 9/2016 | Lemay et al. |
| 2016/0266871 | A1 | 9/2016 | Schmid et al. |
| 2016/0267904 | A1 | 9/2016 | Biadsy et al. |
| 2016/0275941 | A1 | 9/2016 | Bellegarda et al. |
| 2016/0275947 | A1 | 9/2016 | Li et al. |
| 2016/0282956 | A1 | 9/2016 | Ouyang et al. |
| 2016/0284005 | A1 | 9/2016 | Daniel et al. |
| 2016/0284199 | A1 | 9/2016 | Dotan-Cohen et al. |
| 2016/0286045 | A1 | 9/2016 | Sheltiel et al. |
| 2016/0299685 | A1 | 10/2016 | Zhai et al. |
| 2016/0299882 | A1 | 10/2016 | Hegerty et al. |
| 2016/0299883 | A1 | 10/2016 | Zhu et al. |
| 2016/0307566 | A1 | 10/2016 | Bellegarda |
| 2016/0313906 | A1 | 10/2016 | Kilchenko et al. |
| 2016/0314788 | A1 | 10/2016 | Jitkoff et al. |
| 2016/0314792 | A1 | 10/2016 | Alvarez et al. |
| 2016/0321261 | A1 | 11/2016 | Spasojevic et al. |
| 2016/0322045 | A1 | 11/2016 | Hatfeild et al. |
| 2016/0322050 | A1 | 11/2016 | Wang et al. |
| 2016/0328205 | A1 | 11/2016 | Agrawal et al. |
| 2016/0328893 | A1 | 11/2016 | Cordova et al. |
| 2016/0336007 | A1 | 11/2016 | Hanazawa |
| 2016/0336010 | A1 | 11/2016 | Lindahl |
| 2016/0336024 | A1 | 11/2016 | Choi et al. |
| 2016/0337299 | A1 | 11/2016 | Lane et al. |
| 2016/0337301 | A1 | 11/2016 | Rollins et al. |
| 2016/0342685 | A1 | 11/2016 | Basu et al. |
| 2016/0342781 | A1 | 11/2016 | Jeon |
| 2016/0351190 | A1 | 12/2016 | Binder et al. |
| 2016/0352567 | A1 | 12/2016 | Robbins et al. |
| 2016/0357304 | A1 | 12/2016 | Hatori et al. |
| 2016/0357728 | A1 | 12/2016 | Bellegarda et al. |
| 2016/0357861 | A1 | 12/2016 | Carlhian et al. |
| 2016/0357870 | A1 | 12/2016 | Hentschel et al. |
| 2016/0358598 | A1 | 12/2016 | Williams et al. |
| 2016/0358600 | A1 | 12/2016 | Nallasamy et al. |
| 2016/0358619 | A1 | 12/2016 | Ramprashad et al. |
| 2016/0359771 | A1 | 12/2016 | Sridhar |
| 2016/0360039 | A1 | 12/2016 | Sanghavi et al. |
| 2016/0360336 | A1 | 12/2016 | Gross et al. |
| 2016/0360382 | A1 | 12/2016 | Gross et al. |
| 2016/0364378 | A1 | 12/2016 | Futrell et al. |
| 2016/0365101 | A1 | 12/2016 | Foy et al. |
| 2016/0371250 | A1 | 12/2016 | Rhodes |
| 2016/0372112 | A1 | 12/2016 | Miller et al. |
| 2016/0378747 | A1 | 12/2016 | Orr et al. |
| 2016/0379091 | A1 | 12/2016 | Lin et al. |
| 2016/0379626 | A1 | 12/2016 | Deisher et al. |
| 2016/0379633 | A1 | 12/2016 | Lehman et al. |
| 2016/0379641 | A1 | 12/2016 | Liu et al. |
| 2017/0004824 | A1 | 1/2017 | Yoo et al. |
| 2017/0011303 | A1 | 1/2017 | Annapureddy et al. |
| 2017/0011742 | A1 | 1/2017 | Jing et al. |
| 2017/0018271 | A1 | 1/2017 | Khan et al. |
| 2017/0019987 | A1 | 1/2017 | Dragone et al. |
| 2017/0025124 | A1 | 1/2017 | Mixter et al. |
| 2017/0031576 | A1 | 2/2017 | Saoji et al. |
| 2017/0032783 | A1 | 2/2017 | Lord et al. |
| 2017/0032791 | A1 | 2/2017 | Elson et al. |
| 2017/0040002 | A1 | 2/2017 | Basson et al. |
| 2017/0055895 | A1 | 3/2017 | Des Jardins et al. |
| 2017/0060853 | A1 | 3/2017 | Lee et al. |
| 2017/0068423 | A1 | 3/2017 | Napolitano et al. |
| 2017/0068513 | A1 | 3/2017 | Stasior et al. |
| 2017/0068550 | A1 | 3/2017 | Zeitlin |
| 2017/0068670 | A1 | 3/2017 | Orr et al. |
| 2017/0076720 | A1 | 3/2017 | Gopalan et al. |
| 2017/0076721 | A1 | 3/2017 | Bargetzi et al. |
| 2017/0083179 | A1 | 3/2017 | Gruber et al. |
| 2017/0083285 | A1 | 3/2017 | Meyers et al. |
| 2017/0090569 | A1 | 3/2017 | Levesque |
| 2017/0091168 | A1 | 3/2017 | Bellegarda et al. |
| 2017/0092270 | A1 | 3/2017 | Newendorp et al. |
| 2017/0092278 | A1 | 3/2017 | Evermann et al. |
| 2017/0102915 | A1 | 4/2017 | Kuscher et al. |
| 2017/0103749 | A1 | 4/2017 | Zhao et al. |
| 2017/0105190 | A1 | 4/2017 | Logan et al. |
| 2017/0116989 | A1 | 4/2017 | Yadgar et al. |
| 2017/0124190 | A1 | 5/2017 | Wang et al. |
| 2017/0125016 | A1 | 5/2017 | Wang |
| 2017/0127124 | A9 | 5/2017 | Wilson et al. |
| 2017/0131778 | A1 | 5/2017 | Iyer |
| 2017/0132199 | A1 | 5/2017 | Vescovi et al. |
| 2017/0140644 | A1 | 5/2017 | Hwang et al. |
| 2017/0154033 | A1 | 6/2017 | Lee |
| 2017/0154055 | A1 | 6/2017 | Dimson et al. |
| 2017/0161018 | A1 | 6/2017 | Lemay et al. |
| 2017/0161268 | A1 | 6/2017 | Badaskar |
| 2017/0169818 | A1 | 6/2017 | VanBlon et al. |
| 2017/0169819 | A1 | 6/2017 | Mese et al. |
| 2017/0178619 | A1 | 6/2017 | Naik et al. |
| 2017/0178626 | A1 | 6/2017 | Gruber et al. |
| 2017/0180499 | A1 | 6/2017 | Gelfenbeyn et al. |
| 2017/0185375 | A1 | 6/2017 | Martel et al. |
| 2017/0185581 | A1 | 6/2017 | Bojja et al. |
| 2017/0186429 | A1 | 6/2017 | Giuli et al. |
| 2017/0193083 | A1 | 7/2017 | Bhatt et al. |
| 2017/0199874 | A1 | 7/2017 | Patel et al. |
| 2017/0200066 | A1 | 7/2017 | Wang et al. |
| 2017/0221486 | A1 | 8/2017 | Kurata et al. |
| 2017/0227935 | A1 | 8/2017 | Su et al. |
| 2017/0228382 | A1 | 8/2017 | Haviv et al. |
| 2017/0230709 | A1 | 8/2017 | Van Os et al. |
| 2017/0242653 | A1 | 8/2017 | Lang et al. |
| 2017/0243468 | A1 | 8/2017 | Dotan-Cohen et al. |
| 2017/0256256 | A1 | 9/2017 | Wang et al. |
| 2017/0263247 | A1 | 9/2017 | Kang et al. |
| 2017/0263248 | A1 | 9/2017 | Gruber et al. |
| 2017/0263249 | A1 | 9/2017 | Akbacak et al. |
| 2017/0264451 | A1 | 9/2017 | Yu et al. |
| 2017/0278514 | A1 | 9/2017 | Mathias et al. |
| 2017/0285915 | A1 | 10/2017 | Napolitano et al. |
| 2017/0286397 | A1 | 10/2017 | Gonzalez |
| 2017/0295446 | A1 | 10/2017 | Thagadur Shivappa |
| 2017/0316775 | A1 | 11/2017 | Le et al. |
| 2017/0316782 | A1 | 11/2017 | Haughay et al. |
| 2017/0323637 | A1 | 11/2017 | Naik |
| 2017/0345411 | A1 | 11/2017 | Raitio et al. |
| 2017/0346949 | A1 | 11/2017 | Sanghavi et al. |
| 2017/0352346 | A1 | 12/2017 | Paulik et al. |
| 2017/0352350 | A1 | 12/2017 | Booker et al. |
| 2017/0357478 | A1 | 12/2017 | Piersol et al. |
| 2017/0357632 | A1 | 12/2017 | Pagallo et al. |
| 2017/0357633 | A1 | 12/2017 | Wang et al. |
| 2017/0357637 | A1 | 12/2017 | Nell et al. |
| 2017/0357640 | A1 | 12/2017 | Bellegarda et al. |
| 2017/0357716 | A1 | 12/2017 | Bellegarda et al. |
| 2017/0358300 | A1 | 12/2017 | Laurens et al. |
| 2017/0358301 | A1 | 12/2017 | Raitio et al. |
| 2017/0358302 | A1 | 12/2017 | Orr et al. |
| 2017/0358303 | A1 | 12/2017 | Walker, II et al. |
| 2017/0358304 | A1 | 12/2017 | Castillo et al. |
| 2017/0358305 | A1 | 12/2017 | Kudurshian et al. |
| 2017/0371885 | A1 | 12/2017 | Aggarwal et al. |
| 2018/0007060 | A1 | 1/2018 | Leblang et al. |
| 2018/0007538 | A1 | 1/2018 | Naik et al. |
| 2018/0012596 | A1 | 1/2018 | Piernot et al. |
| 2018/0033431 | A1 | 2/2018 | Newendorp et al. |
| 2018/0054505 | A1 | 2/2018 | Hart et al. |
| 2018/0060312 | A1 | 3/2018 | Won |
| 2018/0063624 | A1 | 3/2018 | Boesen |
| 2018/0067914 | A1 | 3/2018 | Chen et al. |
| 2018/0090143 | A1 | 3/2018 | Saddler et al. |
| 2018/0107945 | A1 | 4/2018 | Gao et al. |
| 2018/0108346 | A1 | 4/2018 | Paulik et al. |
| 2018/0130470 | A1 | 5/2018 | Lemay et al. |
| 2018/0137856 | A1 | 5/2018 | Gilbert |
| 2018/0137857 | A1 | 5/2018 | Zhou et al. |
| 2018/0144748 | A1 | 5/2018 | Leong |
| 2018/0190273 | A1 | 7/2018 | Karimli et al. |
| 2018/0213448 | A1 | 7/2018 | Segal et al. |
| 2018/0308485 | A1 | 10/2018 | Kudurshian et al. |

(56) References Cited

U.S. PATENT DOCUMENTS

| | | | |
|---|---|---|---|
| 2018/0308486 A1 | 10/2018 | Saddler et al. |
| 2018/0322112 A1 | 11/2018 | Bellegarda et al. |
| 2018/0329957 A1 | 11/2018 | Frazzingaro et al. |
| 2018/0329982 A1 | 11/2018 | Patel et al. |
| 2018/0330714 A1 | 11/2018 | Paulik et al. |
| 2018/0330737 A1 | 11/2018 | Paulik et al. |
| 2018/0332118 A1 | 11/2018 | Phipps et al. |
| 2018/0336275 A1 | 11/2018 | Graham et al. |
| 2018/0336894 A1 | 11/2018 | Graham et al. |
| 2019/0074016 A1 | 3/2019 | Orr et al. |

FOREIGN PATENT DOCUMENTS

| | | | |
|---|---|---|---|
| CA | 2792412 | A1 | 7/2011 |
| CA | 2666438 | C | 6/2013 |
| CN | 101162153 | A | 4/2008 |
| CN | 101174366 | A | 5/2008 |
| CN | 101179754 | A | 5/2008 |
| CN | 101183525 | A | 5/2008 |
| CN | 101188644 | A | 5/2008 |
| CN | 101228503 | A | 7/2008 |
| CN | 101233741 | A | 7/2008 |
| CN | 101246020 | A | 8/2008 |
| CN | 101247301 | A | 8/2008 |
| CN | 101271689 | A | 9/2008 |
| CN | 101277501 | A | 10/2008 |
| CN | 101281745 | A | 10/2008 |
| CN | 101292282 | A | 10/2008 |
| CN | 101297541 | A | 10/2008 |
| CN | 101325756 | A | 12/2008 |
| CN | 101416471 | A | 4/2009 |
| CN | 101427244 | A | 5/2009 |
| CN | 101448340 | A | 6/2009 |
| CN | 101453498 | A | 6/2009 |
| CN | 101499156 | A | 8/2009 |
| CN | 101500041 | A | 8/2009 |
| CN | 101515952 | A | 8/2009 |
| CN | 101535983 | A | 9/2009 |
| CN | 101547396 | A | 9/2009 |
| CN | 101557432 | A | 10/2009 |
| CN | 101601088 | A | 12/2009 |
| CN | 101604521 | A | 12/2009 |
| CN | 101632316 | A | 1/2010 |
| CN | 101636736 | A | 1/2010 |
| CN | 101673544 | A | 3/2010 |
| CN | 101751387 | A | 6/2010 |
| CN | 101833286 | A | 9/2010 |
| CN | 101847405 | A | 9/2010 |
| CN | 101894547 | A | 11/2010 |
| CN | 101939740 | A | 1/2011 |
| CN | 101951553 | A | 1/2011 |
| CN | 102137193 | A | 7/2011 |
| CN | 102160043 | A | 8/2011 |
| CN | 102246136 | A | 11/2011 |
| CN | 202035047 | U | 11/2011 |
| CN | 102282609 | A | 12/2011 |
| CN | 202092650 | U | 12/2011 |
| CN | 102368256 | A | 3/2012 |
| CN | 102405463 | A | 4/2012 |
| CN | 102498457 | A | 6/2012 |
| CN | 102629246 | A | 8/2012 |
| CN | 102682769 | A | 9/2012 |
| CN | 102682771 | A | 9/2012 |
| CN | 102685295 | A | 9/2012 |
| CN | 102693725 | A | 9/2012 |
| CN | 102792320 | A | 11/2012 |
| CN | 102801853 | A | 11/2012 |
| CN | 102870065 | A | 1/2013 |
| CN | 102882752 | A | 1/2013 |
| CN | 102917004 | A | 2/2013 |
| CN | 102918493 | A | 2/2013 |
| CN | 103035240 | A | 4/2013 |
| CN | 103038728 | A | 4/2013 |
| CN | 103093334 | A | 5/2013 |
| CN | 103135916 | A | 6/2013 |
| CN | 103365279 | A | 10/2013 |
| CN | 103744761 | A | 4/2014 |
| CN | 103795850 | A | 5/2014 |
| CN | 103930945 | A | 7/2014 |
| CN | 104038621 | A | 9/2014 |
| CN | 104090652 | A | 10/2014 |
| CN | 104144377 | A | 11/2014 |
| CN | 104284257 | A | 1/2015 |
| CN | 104423625 | A | 3/2015 |
| CN | 104463552 | A | 3/2015 |
| CN | 104516522 | A | 4/2015 |
| CN | 104854583 | A | 8/2015 |
| CN | 104951077 | A | 9/2015 |
| CN | 105247511 | A | 1/2016 |
| CN | 105264524 | A | 1/2016 |
| CN | 105471705 | A | 4/2016 |
| CN | 107919123 | A | 4/2018 |
| DE | 102008024258 | A1 | 11/2009 |
| DE | 202016008226 | U1 | 5/2017 |
| EP | 1892700 | A1 | 2/2008 |
| EP | 1912205 | A2 | 4/2008 |
| EP | 1939860 | A1 | 7/2008 |
| EP | 1944997 | A2 | 7/2008 |
| EP | 651543 | B1 | 9/2008 |
| EP | 1909263 | B1 | 1/2009 |
| EP | 1335620 | B1 | 3/2009 |
| EP | 2069895 | A1 | 6/2009 |
| EP | 2081185 | A1 | 7/2009 |
| EP | 2094032 | A1 | 8/2009 |
| EP | 2096840 | A1 | 9/2009 |
| EP | 2107553 | A1 | 10/2009 |
| EP | 2109295 | A1 | 10/2009 |
| EP | 1720375 | B1 | 7/2010 |
| EP | 2205010 | A1 | 7/2010 |
| EP | 2309491 | A1 | 4/2011 |
| EP | 2329348 | | 6/2011 |
| EP | 2339576 | A2 | 6/2011 |
| EP | 2400373 | A1 | 12/2011 |
| EP | 2431842 | A2 | 3/2012 |
| EP | 2523188 | A1 | 11/2012 |
| EP | 2551784 | A1 | 1/2013 |
| EP | 2555536 | A1 | 2/2013 |
| EP | 2575128 | A2 | 4/2013 |
| EP | 2632129 | A1 | 8/2013 |
| EP | 2683175 | A1 | 1/2014 |
| EP | 2733598 | A2 | 5/2014 |
| EP | 2760015 | A1 | 7/2014 |
| EP | 2801890 | A1 | 11/2014 |
| EP | 2801972 | A1 | 11/2014 |
| EP | 2849177 | A1 | 3/2015 |
| EP | 2930715 | A1 | 10/2015 |
| EP | 2938022 | A1 | 10/2015 |
| EP | 2940556 | A1 | 11/2015 |
| EP | 2950307 | A1 | 12/2015 |
| EP | 3035329 | A1 | 6/2016 |
| EP | 3224708 | A1 | 10/2017 |
| EP | 3246916 | A1 | 11/2017 |
| EP | 3300074 | A1 | 3/2018 |
| EP | 2983065 | B1 | 8/2018 |
| FR | 2911201 | A1 | 7/2008 |
| GB | 2445436 | A | 7/2008 |
| GB | 2445667 | A | 7/2008 |
| JP | 63-280559 | A | 11/1988 |
| JP | 2002-281170 | A | 9/2002 |
| JP | 2004-86150 | A | 3/2004 |
| JP | 2004-258809 | A | 9/2004 |
| JP | 2006-118221 | A | 5/2006 |
| JP | 2007-235602 | A | 9/2007 |
| JP | 2008-009120 | A | 1/2008 |
| JP | 2008-21002 | A | 1/2008 |
| JP | 2008-26381 | A | 2/2008 |
| JP | 2008-39928 | A | 2/2008 |
| JP | 2008-58813 | A | 3/2008 |
| JP | 2008-064687 | A | 3/2008 |
| JP | 2008-90545 | A | 4/2008 |
| JP | 2008-97003 | A | 4/2008 |
| JP | 2008-134949 | A | 6/2008 |
| JP | 2008-158510 | A | 7/2008 |
| JP | 2008-526101 | A | 7/2008 |

(56) References Cited

FOREIGN PATENT DOCUMENTS

| | | | |
|---|---|---|---|
| JP | 2008-185693 | A | 8/2008 |
| JP | 2008-198022 | A | 8/2008 |
| JP | 2008-217468 | A | 9/2008 |
| JP | 2008-228129 | A | 9/2008 |
| JP | 2008-233678 | A | 10/2008 |
| JP | 2008-236448 | A | 10/2008 |
| JP | 2008-252161 | A | 10/2008 |
| JP | 2008-268684 | A | 11/2008 |
| JP | 2008-269480 | A | 11/2008 |
| JP | 2008-271481 | A | 11/2008 |
| JP | 2008-275731 | A | 11/2008 |
| JP | 2008-299221 | A | 12/2008 |
| JP | 2009-2850 | A | 1/2009 |
| JP | 2009-503623 | A | 1/2009 |
| JP | 2009-36999 | A | 2/2009 |
| JP | 2009-505142 | A | 2/2009 |
| JP | 2009-47920 | A | 3/2009 |
| JP | 2009-069062 | A | 4/2009 |
| JP | 2009-98490 | A | 5/2009 |
| JP | 2009-110300 | A | 5/2009 |
| JP | 2009-134409 | A | 6/2009 |
| JP | 2009-140444 | A | 6/2009 |
| JP | 2009-186989 | A | 8/2009 |
| JP | 2009-193448 | A | 8/2009 |
| JP | 2009-193457 | A | 8/2009 |
| JP | 2009-193532 | A | 8/2009 |
| JP | 2009-205367 | A | 9/2009 |
| JP | 2009-223840 | A | 10/2009 |
| JP | 2009-294913 | A | 12/2009 |
| JP | 2009-294946 | A | 12/2009 |
| JP | 2009-543166 | A | 12/2009 |
| JP | 2010-66519 | A | 3/2010 |
| JP | 2010-78979 | A | 4/2010 |
| JP | 2010-108378 | A | 5/2010 |
| JP | 2010-518475 | A | 5/2010 |
| JP | 2010-518526 | A | 5/2010 |
| JP | 2010-146347 | A | 7/2010 |
| JP | 2010-157207 | A | 7/2010 |
| JP | 2010-166478 | A | 7/2010 |
| JP | 2010-205111 | A | 9/2010 |
| JP | 2010-224236 | A | 10/2010 |
| JP | 4563106 | B2 | 10/2010 |
| JP | 2010-535377 | A | 11/2010 |
| JP | 2010-287063 | A | 12/2010 |
| JP | 2011-33874 | A | 2/2011 |
| JP | 2011-41026 | A | 2/2011 |
| JP | 2011-45005 | A | 3/2011 |
| JP | 2011-59659 | A | 3/2011 |
| JP | 2011-81541 | A | 4/2011 |
| JP | 2011-525045 | A | 9/2011 |
| JP | 2011-238022 | A | 11/2011 |
| JP | 2011-250027 | A | 12/2011 |
| JP | 2012-014394 | A | 1/2012 |
| JP | 2012-33997 | A | 2/2012 |
| JP | 2012-508530 | A | 4/2012 |
| JP | 2012-089020 | A | 5/2012 |
| JP | 2012-116442 | A | 6/2012 |
| JP | 2012-142744 | A | 7/2012 |
| JP | 2012-147063 | A | 8/2012 |
| JP | 2012-518847 | A | 8/2012 |
| JP | 2013-37688 | A | 2/2013 |
| JP | 2013-511214 | A | 3/2013 |
| JP | 2013-65284 | A | 4/2013 |
| JP | 2013-73240 | A | 4/2013 |
| JP | 2013-513315 | A | 4/2013 |
| JP | 2013-080476 | A | 5/2013 |
| JP | 2013-517566 | A | 5/2013 |
| JP | 2013-134430 | A | 7/2013 |
| JP | 2013/140520 | A | 7/2013 |
| JP | 2013-527947 | A | 7/2013 |
| JP | 2013-528012 | A | 7/2013 |
| JP | 2013-156349 | A | 8/2013 |
| JP | 2013-200423 | A | 10/2013 |
| JP | 2013-205999 | A | 10/2013 |
| JP | 2013-238936 | A | 11/2013 |
| JP | 2014-10688 | A | 1/2014 |
| JP | 2014-026629 | A | 2/2014 |
| JP | 2014-60600 | A | 4/2014 |
| JP | 2014-72586 | A | 4/2014 |
| JP | 2014-077969 | A | 5/2014 |
| JP | 2014/109889 | A | 6/2014 |
| JP | 2014-124332 | A | 7/2014 |
| JP | 2014-145842 | A | 8/2014 |
| JP | 2014-150323 | A | 8/2014 |
| JP | 2014-222514 | A | 11/2014 |
| JP | 2015-8001 | A | 1/2015 |
| JP | 2015-501022 | A | 1/2015 |
| JP | 2015-41845 | A | 3/2015 |
| JP | 2015-94848 | A | 5/2015 |
| JP | 2015-519675 | A | 7/2015 |
| JP | 2015-524974 | A | 8/2015 |
| JP | 2015-526776 | A | 9/2015 |
| JP | 2015-528140 | A | 9/2015 |
| JP | 2015-528918 | A | 10/2015 |
| JP | 2016-119615 | A | 6/2016 |
| KR | 10-0801227 | B1 | 2/2008 |
| KR | 10-0810500 | B1 | 3/2008 |
| KR | 10-2008-0033070 | A | 4/2008 |
| KR | 10-0819928 | B1 | 4/2008 |
| KR | 10-2008-0049647 | A | 6/2008 |
| KR | 10-2008-0059332 | A | 6/2008 |
| KR | 10-2008-0109322 | A | 12/2008 |
| KR | 10-2009-0001716 | A | 1/2009 |
| KR | 10-2009-0028464 | A | 3/2009 |
| KR | 10-2009-0030117 | A | 3/2009 |
| KR | 10-2009-0086805 | A | 8/2009 |
| KR | 10-0920267 | B1 | 10/2009 |
| KR | 10-2009-0122944 | A | 12/2009 |
| KR | 10-2009-0127961 | A | 12/2009 |
| KR | 10-2009-0129192 | A | 12/2009 |
| KR | 10-2010-0015958 | A | 2/2010 |
| KR | 10-2010-0048571 | A | 5/2010 |
| KR | 10-2010-0053149 | A | 5/2010 |
| KR | 10-2010-0119519 | A | 11/2010 |
| KR | 10-2011-0043644 | A | 4/2011 |
| KR | 10-1032792 | B1 | 5/2011 |
| KR | 10-2011-0068490 | A | 6/2011 |
| KR | 10-2011-0072847 | A | 6/2011 |
| KR | 10-2011-0086492 | A | 7/2011 |
| KR | 10-2011-0100620 | A | 9/2011 |
| KR | 10-2011-0113414 | A | 10/2011 |
| KR | 10-2011-0115134 | A | 10/2011 |
| KR | 10-2012-0020164 | A | 3/2012 |
| KR | 10-2012-0031722 | A | 4/2012 |
| KR | 10-1178310 | B1 | 8/2012 |
| KR | 10-2012-0120316 | A | 11/2012 |
| KR | 10-2012-0137435 | A | 12/2012 |
| KR | 10-2012-0137440 | A | 12/2012 |
| KR | 10-2012-0138826 | A | 12/2012 |
| KR | 10-2012-0139827 | A | 12/2012 |
| KR | 10-1193668 | B1 | 12/2012 |
| KR | 10-2013-0035983 | A | 4/2013 |
| KR | 10-2013-0108563 | A | 10/2013 |
| KR | 10-1334342 | B1 | 11/2013 |
| KR | 10-2013-0131252 | A | 12/2013 |
| KR | 10-2013-0133629 | A | 12/2013 |
| KR | 10-2014-0031283 | A | 3/2014 |
| KR | 10-2014-0033574 | A | 3/2014 |
| KR | 10-2014-0147557 | A | 12/2014 |
| KR | 10-2015-0043512 | A | 4/2015 |
| KR | 10-2016-0010523 | A | 1/2016 |
| RU | 2349970 | C2 | 3/2009 |
| RU | 2353068 | C2 | 4/2009 |
| RU | 2364917 | C2 | 8/2009 |
| TW | 200801988 | A | 1/2008 |
| TW | I301373 | B | 9/2008 |
| TW | M348993 | U | 1/2009 |
| TW | 200943903 | A | 10/2009 |
| TW | 201018258 | A | 5/2010 |
| TW | 201027515 | A1 | 7/2010 |
| TW | 201028996 | A1 | 8/2010 |
| TW | 201110108 | A1 | 3/2011 |
| TW | 2011-42823 | A1 | 12/2011 |
| TW | 201227715 | A1 | 7/2012 |

(56) References Cited

FOREIGN PATENT DOCUMENTS

| | | | |
|---|---|---|---|
| TW | 201245989 | A1 | 11/2012 |
| TW | 201312548 | A1 | 3/2013 |
| WO | 2008/030970 | A2 | 3/2008 |
| WO | 2008/071231 | A1 | 6/2008 |
| WO | 2008/085742 | A2 | 7/2008 |
| WO | 2008/098900 | A2 | 8/2008 |
| WO | 2008/109835 | A2 | 8/2008 |
| WO | 2008/120036 | A1 | 10/2008 |
| WO | 2008/130095 | A1 | 10/2008 |
| WO | 2008/140236 | A1 | 11/2008 |
| WO | 2008/142472 | A1 | 11/2008 |
| WO | 2008/153639 | A1 | 12/2008 |
| WO | 2009/009240 | A2 | 1/2009 |
| WO | 2009/016631 | A2 | 2/2009 |
| WO | 2009/017280 | A1 | 2/2009 |
| WO | 2009/034686 | A1 | 3/2009 |
| WO | 2009/075912 | A1 | 6/2009 |
| WO | 2009/104126 | A1 | 8/2009 |
| WO | 2009/156438 | A1 | 12/2009 |
| WO | 2009/156978 | A1 | 12/2009 |
| WO | 2010/054373 | A2 | 5/2010 |
| WO | 2010/075623 | A1 | 7/2010 |
| WO | 2010/100937 | A1 | 9/2010 |
| WO | 2010/141802 | A1 | 12/2010 |
| WO | 2011/057346 | A1 | 5/2011 |
| WO | 2011/060106 | A1 | 5/2011 |
| WO | 2011/088053 | A2 | 7/2011 |
| WO | 2011/093025 | A1 | 8/2011 |
| WO | 2011/116309 | A1 | 9/2011 |
| WO | 2011/133543 | A1 | 10/2011 |
| WO | 2011/150730 | A1 | 12/2011 |
| WO | 2011/163350 | A1 | 12/2011 |
| WO | 2011/088053 | A3 | 1/2012 |
| WO | 2012/019637 | A1 | 2/2012 |
| WO | 2012/129231 | A1 | 9/2012 |
| WO | 2012/135157 | A2 | 10/2012 |
| WO | 2012/154317 | A1 | 11/2012 |
| WO | 2012/155079 | A2 | 11/2012 |
| WO | 2012/167168 | A2 | 12/2012 |
| WO | 2013/009578 | A2 | 1/2013 |
| WO | 2013/022135 | A1 | 2/2013 |
| WO | 2013/022223 | A2 | 2/2013 |
| WO | 2013/048880 | A1 | 4/2013 |
| WO | 2013/049358 | A1 | 4/2013 |
| WO | 2013/163113 | A1 | 10/2013 |
| WO | 2013/169842 | A2 | 11/2013 |
| WO | 2013/173504 | A1 | 11/2013 |
| WO | 2013/173511 | A2 | 11/2013 |
| WO | 2013/176847 | A1 | 11/2013 |
| WO | 2013/184953 | A1 | 12/2013 |
| WO | 2013/184990 | A1 | 12/2013 |
| WO | 2014/003138 | A1 | 1/2014 |
| WO | 2014/021967 | A1 | 2/2014 |
| WO | 2014/022148 | A1 | 2/2014 |
| WO | 2014/028797 | A1 | 2/2014 |
| WO | 2014/031505 | A1 | 2/2014 |
| WO | 2014/047047 | A1 | 3/2014 |
| WO | 2014/066352 | A1 | 5/2014 |
| WO | 2014/070872 | A2 | 5/2014 |
| WO | 2014/078965 | A1 | 5/2014 |
| WO | 2014/096506 | A1 | 6/2014 |
| WO | 2014/124332 | A2 | 8/2014 |
| WO | 2014/137074 | A1 | 9/2014 |
| WO | 2014/138604 | A1 | 9/2014 |
| WO | 2014/143959 | A2 | 9/2014 |
| WO | 2014/144579 | A1 | 9/2014 |
| WO | 2014/159581 | A1 | 10/2014 |
| WO | 2014/197336 | A1 | 12/2014 |
| WO | 2014/200728 | A1 | 12/2014 |
| WO | 2014/204659 | A2 | 12/2014 |
| WO | 2015/018440 | A1 | 2/2015 |
| WO | 2015/030796 | A1 | 3/2015 |
| WO | 2015/041892 | A1 | 3/2015 |
| WO | 2015/084659 | A1 | 6/2015 |
| WO | 2015/092943 | A1 | 6/2015 |
| WO | 2015/094169 | A1 | 6/2015 |
| WO | 2015/094369 | A1 | 6/2015 |
| WO | 2015/099939 | A1 | 7/2015 |
| WO | 2015/116151 | A1 | 8/2015 |
| WO | 2015/151133 | A1 | 10/2015 |
| WO | 2015/157013 | A1 | 10/2015 |
| WO | 2015/183401 | A1 | 12/2015 |
| WO | 2015/183699 | A1 | 12/2015 |
| WO | 2015/184186 | A1 | 12/2015 |
| WO | 2015/200207 | A1 | 12/2015 |
| WO | 2016/027933 | A1 | 2/2016 |
| WO | 2016/028946 | A1 | 2/2016 |
| WO | 2016/033257 | A1 | 3/2016 |
| WO | 2016/054230 | A1 | 4/2016 |
| WO | 2016/057268 | A1 | 4/2016 |
| WO | 2016/075081 | A1 | 5/2016 |
| WO | 2016/085775 | A2 | 6/2016 |
| WO | 2016/100139 | A1 | 6/2016 |
| WO | 2016/111881 | A1 | 7/2016 |
| WO | 2016/144840 | A1 | 9/2016 |
| WO | 2016/144982 | A1 | 9/2016 |
| WO | 2016/175354 | A1 | 11/2016 |
| WO | 2016/209444 | A1 | 12/2016 |
| WO | 2017/044260 | A1 | 3/2017 |
| WO | 2017/044629 | A1 | 3/2017 |
| WO | 2017/053311 | A1 | 3/2017 |

OTHER PUBLICATIONS

Adium, "AboutAdium—Adium X—Trac", available at <http://web.archive.org/web/20070819113247/http://trac.adiumx.com/wiki/AboutAdium>, retrieved on Nov. 25, 2011, 2 pages.

Alfred App, "Alfred", available at <http://www.alfredapp.com/>, retrieved on Feb. 8, 2012, 5 pages.

Apple Computer, "Knowledge Navigator", published by Apple Computer no later than 2008, as depicted in Exemplary Screenshots from video entitled 'Knowledge Navigator', 2008, 7 pages.

Apple, "VoiceOver", available at <http://www.apple.com/accessibility/voiceover/>, May 19, 2014, 3 pages.

Berry et al., "PTIME: Personalized Assistance for Calendaring", ACM Transactions on Intelligent Systems and Technology, vol. 2, No. 4, Article 40, Jul. 2011, pp. 1-22.

Bocchieri et al., "Use of Geographical Meta-Data in ASR Language and Acoustic Models", IEEE International Conference on Acoustics Speech and Signal Processing, 2010, pp. 5118-5121.

Butcher, Mike, "EVI Arrives in Town to go Toe-to-Toe with Siri", TechCrunch, Jan. 23, 2012, 2 pages.

Chen, Yi, "Multimedia Siri Finds and Plays Whatever You Ask For", PSFK Report, Feb. 9, 2012, 9 pages.

Cheyer, Adam, "About Adam Cheyer", available at <http://www.adam.cheyer.com/about.html>, retrieved on Sep. 17, 2012, 2 pages.

Choi et al., "Acoustic and Visual Signal based Context Awareness System for Mobile Application", IEEE Transactions on Consumer Electronics, vol. 57, No. 2, May 2011, pp. 738-746.

Corrected Notice of Allowance received for U.S. Appl. No. 14/503,105, dated Aug. 28, 2018, 2 pages.

Corrected Notice of Allowance received for U.S. Appl. No. 14/503,105, dated Sep. 6, 2018, 2 pages.

Elliott et al., "Annotation Suggestion and Search for Personal Multimedia Objects on the Web", CIVR, Jul. 7-9, 2008, pp. 75-84.

Evi, "Meet Evi: The One Mobile Application that Provides Solutions for your Everyday Problems", Feb. 2012, 3 pages.

Exhibit 1, "Natural Language Interface Using Constrained Intermediate Dictionary of Results", List of Publications Manually Reviewed for the Search of U.S. Pat. No. 7,177,798, Mar. 22, 2013, 1 page.

Final Office Action received for U.S. Appl. No. 14/503,105, dated May 20, 2016, 45 pages.

Findlater et al., "Beyond QWERTY: Augmenting Touch-Screen Keyboards with Multi-Touch Gestures for Non-Alphanumeric Input", CHI '12, Austin, Texas, USA, May 5-10, 2012, 4 pages.

Gannes, Liz, "Alfred App Gives Personalized Restaurant Recommendations", AllThingsD, Jul. 18, 2011, pp. 1-3.

(56) References Cited

OTHER PUBLICATIONS

Gruber, Tom, "Big Think Small Screen: How Semantic Computing in the Cloud will Revolutionize the Consumer Experience on the Phone", Keynote Presentation at Web 3.0 Conference, Jan. 2010, 41 pages.
Gruber, Tom, "Despite Our Best Efforts, Ontologies are not the Problem", AAAI Spring Symposium, Available online at <http://tomgruber.org/writing/aaai-ss08.htm>, Mar. 2008, pp. 1-40.
Gruber, Tom, "Intelligence at the Interface: Semantic Technology and the Consumer Internet Experience", Presentation at Semantic Technologies Conference, Available online at <http://tomgruber.org/writing/semtech08.htm>, May 20, 2008, pp. 1-40.
Gruber, Tom, "Siri, A Virtual Personal Assistant—Bringing Intelligence to the Interface", Semantic Technologies Conference, Jun. 16, 2009, 21 pages.
Guay, Matthew, "Location-Driven Productivity with Task Ave", available at <http://iphone.appstorm.net/reviews/productivity/location-driven-productivity-with-task-ave/>, Feb. 19, 2011, 7 pages.
Guim, Mark, "How to Set a Person-Based Reminder with Cortana", available at <http://www.wpcentral.com/how-to-person-based-reminder-cortana>, Apr. 26, 2014, 15 pages.
Hardwar, Devindra, "Driving App Waze Builds its own Siri for Hands-Free Voice Control", Available online at <http://venturebeat.com/2012/02/09/driving-app-waze-builds-its-own-siri-for-hands-free-voice-control/>, retrieved on Feb. 9, 2012, 4 pages.
Interactive Voice, available at <http://www.helloivee.com/company/>, retrieved on Feb. 10, 2014, 2 pages.
International Preliminary Report on Patentability received for PCT Patent Application No. PCT/US2015/023593, dated Dec. 15, 2016, 12 pages.
International Search Report and Written Opinion received for PCT Patent Application No. PCT/US2015/023593, dated Aug. 14, 2015, 16 pages.
Iowegian International, "FIR Filter Properties, DSPGuru, Digital Signal Processing Central", available at <http://www.dspguru.com/dsp/faq/fir/properties> retrieved on Jul. 28, 2010, 6 pages.
Jiang et al., "A Syllable-based Name Transliteration System", Proc. of the 2009 Named Entities Workshop, Aug. 7, 2009, pp. 96-99.
Kickstarter, "Ivee Sleek: Wi-Fi Voice-Activated Assistant", available at <https://www.kickstarter.com/projects/ivee/ivee-sleek-wi-fi-voice-activated-assistant>, retrieved on Feb. 10, 2014, 13 pages.
Knownav, "Knowledge Navigator", YouTube Video available at <http://www.youtube.com/watch?v=QRH8eimU_20>, Apr. 29, 2008, 1 page.
Mactech, "KeyStrokes 3.5 for Mac OS X Boosts Word Prediction", available at <http://www.mactech.com/news/?p=1007129>, retrieved on Jan. 7, 2008, 3 pages.
Meet Ivee, Your Wi-Fi Voice Activated Assistant, available at <http://www.helloivee.com/>, retrieved on Feb. 10, 2014, 8 pages.
Mel Scale, Wikipedia the Free Encyclopedia, Last modified on Oct. 13, 2009 and retrieved on Jul. 28, 2010, available at <http://en.wikipedia.org/wiki/Mel_scale>, 2 pages.
Microsoft, "Turn on and Use Magnifier", available at <http://www.microsoft.com/windowsxp/using/accessibility/magnifierturnon.mspx>, retrieved on Jun. 6, 2009.
Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.
Minimum Phase, Wikipedia the free Encyclopedia, Last modified on Jan. 12, 2010 and retrieved on Jul. 28, 2010, available at <http://en.wikipedia.org/wiki/Minimum_phase>, 8 pages.
Mobile Speech Solutions, Mobile Accessibility, SVOX AG Product Information Sheet, available at <http://www.svox.com/site/bra840604/con782768/mob965831936.aSQ?osLang=1>, Sep. 27, 2012, 1 page.
My Cool Aids, "What's New", available at <http://www.mycoolaids.com/>, 2012, 1 page.
Myers, Brad A., "Shortcutter for Palm", available at <http://www.cs.cmu.edu/~pebbles/v5/shortcutter/palm/index.html>, retrieved on Jun. 18, 2014, 10 pages.
Naone, Erica, "TR10: Intelligent Software Assistant", Technology Review, Mar.-Apr. 2009, 2 pages.
Navigli, Roberto, "Word Sense Disambiguation: A Survey", ACM Computing Surveys, vol. 41, No. 2, Feb. 2009, 69 pages.
Non-Final Office Action received for U.S. Appl. No. 14/503,105, dated Dec. 8, 2015, 31 pages.
Notice of Acceptance received for Australian Patent Application No. 2015267612, dated Jan. 3, 2018, 3 pages.
Notice of Allowance received for Korean Patent Application No. 10-2016-7032258, dated Jul. 30, 2018, 3 pages.
Notice of Allowance received for U.S. Appl. No. 14/503,105, dated Aug. 14, 2018, 8 pages.
Office Action received for Australian Patent Application No. 2015267612, dated Jun. 13, 2017, 4 pages.
Office Action received for Japanese Patent Application No. 2016-564974, dated Jan. 4, 2018, 9 pages.
Office Action received for Korean Patent Application No. 10-2016-7032258, dated Mar. 29, 2018, 6 pages.
Office Action received for Korean Patent Application No. 10-2016-7032258, dated Sep. 13, 2017, 15 pages.
Office Action received for Taiwanese Patent Application No. 104112907, dated Nov. 26, 2015, 5 pages.
Phoenix Solutions, Inc., "Declaration of Christopher Schmandt Regarding the MIT Galaxy System", West Interactive Corp., A Delaware Corporation, Document 40, Jul. 2, 2010, 162 pages.
Sarawagi, Sunita, "CRF Package Page", available at <http://crf.sourceforge.net/>, retrieved on Apr. 6, 2011, 2 pages.
Simonite, Tom, "One Easy Way to Make Siri Smarter", Technology Review, Oct. 18, 2011, 2 pages.
Speaker Recognition, Wikipedia, The Free Enclyclopedia, Nov. 2, 2010, 4 pages.
SRI, "SRI Speech: Products: Software Development Kits: EduSpeak", available at <http://web.archive.org/web/20090828084033/http://www.speechatsri.com/products /eduspeak>shtml, retrieved on Jun. 20, 2013, 2 pages.
Stent et al., "Geo-Centric Language Models for Local Business Voice Search", AT&T Labs—Research, 2009, pp. 389-396.
Sullivan, Danny, "How Google Instant's Autocomplete Suggestions Work", available at <http://searchengineland.com/how-google-instant-autocomplete-suggestions-work-62592>, Apr. 6, 2011, 12 pages.
Textndrive, "Text'nDrive App Demo—Listen and Reply to your Messages by Voice while Driving!", YouTube Video available at <http://www.youtube.com/watch?v=WaGfzoHsAMw>, Apr. 27, 2010, 1 page.
Tofel, Kevin C., "SpeakToIt: A Personal Assistant for Older iPhones, iPads", Apple News, Tips and Reviews, Feb. 9, 2012, 7 pages.
Tucker, Joshua, "Too Lazy to Grab Your TV Remote? Use Siri Instead", Engadget, Nov. 30, 2011, 8 pages.
Tur et al., "The CALO Meeting Assistant System", IEEE Transactions on Audio, Speech and Language Processing, vol. 18, No. 6, Aug. 2010, pp. 1601-1611.
Tur et al., "The CALO Meeting Speech Recognition and Understanding System", Proc. IEEE Spoken Language Technology Workshop, 2008, 4 pages.
Vlingo InCar, "Distracted Driving Solution with Vlingo InCar", YouTube Video, Available online at <http://www.youtube.com/watch?v=Vqs8XfXxgz4>, Oct. 2010, 2 pages.
Vlingo, "Vlingo Launches Voice Enablement Application on Apple App Store", Press Release, Dec. 3, 2008, 2 pages.
Voiceassist, "Send Text, Listen to and Send E-Mail by Voice", YouTube Video, Available online at <http://www.youtube.com/watch?v=0tEU61nHHA4>, Jul. 30, 2009, 1 page.
Voiceonthego, "Voice on the Go (BlackBerry)", YouTube Video, available online at <http://www.youtube.com/watch?v=pJqpWgQS98w>, Jul. 27, 2009, 1 page.
Wikipedia, "Acoustic Model", available at <http://en.wikipedia.org/wiki/AcousticModel>, retrieved on Sep. 14, 2011, 2 pages.
Wikipedia, "Language Model", available at <http://en.wikipedia.org/wiki/Language_model>, retrieved on Sep. 14, 2011, 4 pages.
Wikipedia, "Speech Recognition", available at <http://en.wikipedia.org/wiki/Speech_recognition>, retrieved on Sep. 14, 2011, 12 pages.
Wilson, Mark, "New iPod Shuffle Moves Buttons to Headphones, Adds Text to Speech", available at <http://gizmodo.com/5167946/

(56) References Cited

OTHER PUBLICATIONS new-ipod-shuffle-moves-buttons-to-headphones-adds-text-to-speech>, Mar. 11, 2009, 12 pages.
Xu et al., "Speech-Based Interactive Games for Language Learning: Reading, Translation, and Question-Answering", Computational Linguistics and Chinese Language Processing, vol. 14, No. 2, Jun. 2009, pp. 133-160.
Zainab, "Google Input Tools Shows Onscreen Keyboard in Multiple Languages [Chrome]", available at <http://www.addictivetips.com/internet-tips/google-input-tools-shows-multiple-language-onscreen-keyboards-chrome/>, Jan. 3, 2012, 3 pages.
Zhang et al., "Research of Text Classification Model Based on Latent Semantic Analysis and Improved HS-SVM", Intelligent Systems and Applications (ISA), 2010 2nd International Workshop, May 22-23, 2010, 5 pages.
Office Action received for Korean Patent Application No. 10-2018-7031452, dated Feb. 14, 2019, 11 pages (5 pages of English Translation and 6 pages of Official Copy).
Office Action received for Korean Patent Application No. 10-2018-7031455, dated Feb. 3, 2019, 16 pages (8 pages of English Translation and 8 pages of Official Copy).
Office Action received for Australian Patent Application No. 2018201834, dated Mar. 22, 2019, 6 pages.
Office Action received for Chinese Patent Application No. 201580028666.0, dated Jun. 20, 2019, 18 pages (5 pages of English Translation and 13 pages of Official Copy).
"Alexa, Turn Up the Heat!", Smartthings Samsung [online], Available online at https://web.archive.org/web/20160329142041/https://blog.smartthings.com/news/smartthingsupdates/alexa-turn-up-the-heat/, Mar. 3, 2016, 3 pages.
"Galaxy S7: How to Adjust Screen Timeout & Lock Screen Timeout", Available online at:—"https://www.youtube.com/watch?v=n6e1WKUS2ww", Jun. 9, 2016, 1 page.
"Hey Google: How to Create a Shopping List with Your Google Assistant", Available online at:—https://www.youtube.com/watch?v=w9NCsElax1Y, May 25, 2018, 1 page.
"How to Enable Google Assistant on Galaxy 57 and other Android Phones (No Root)", Available online at:—"https://www.youtube.com/watch?v=HekIQbWyksE", Mar. 20, 2017, 1 page.
"How to Use Ok Google Assistant Even Phone is Locked", Available online at:—"https://www.youtube.com/watch?v=9B_gP4j_SP8", Mar. 12, 2018, 1 page.
"SmartThings +Amazon Echo", Smartthings Samsung [online], Available online at <https://web.archive.org/web/20160509231428/https://blog.smartthings.com/featured/alexa-turn-on-my-smartthings/>, Aug. 21, 2015, 3 pages.
"Ask Alexa—Things That Are Smart Wiki", Available online at <URL:http://thingsthataresmart.wiki/index.php?title=Ask_Alexa&oldid=4283>, [retrieved from internet on Aug. 2, 2017], Jun. 8, 2016, pp. 1-31.
"DIRECTV™ Voice", Now Part of the DIRECTTV Mobile App for Phones, Sep. 18, 2013, 5 pages.
"The world of Virtual Assistants—more SemTech . . . ", End of Business as Usual—Glenn's External blog, Online Available at <https://web.archive.org/web/20091101840940/http://glennas.wordpress.com/2009/10/17/the-world-of-virtual-assistants-more-semtech/>, Oct. 17, 2009, 5 pages.
Anania, Peter, "Amazon Echo with Home Automation (Smartthings)", Available online at https://www.youtube.com/watch?v=LMW6aXmsWNE, Dec. 20, 2015, 1 page.
API.AI, "Android App Review—Speaktoit Assistant", Available at <https://www.youtube.com/watch?v=myE498nyfGw>, Mar. 30, 2011, 3 pages.
Asakura et al., "What LG thinks; How the TV should be in the Living Room", HiVi, vol. 31, No. 7 (Jul. 2013), Stereo Sound Publishing, Inc., Jun. 17, 2013, pp. 68-71 (Official Copy Only). (See Communication under 37 CFR § 1.98(a) (3)).
Ashbrook, Daniel L.., "Enabling Mobile Microinteractions", Retrieved from the Internet: URL: "http://danielashbrook.com/wp-content/uploads/2012/06/2009-Ashbrook-Thesis.pdf", May 2010, 186 pages.
Ashingtondctech & Gaming, "SwipeStatusBar—Reveal the Status Bar in a Fullscreen App", Online Available at: <https://www.youtube.com/watch?v=wA_tT9IAreQ>, Jul. 1, 2013, 3 pages.
Bertulucci, Jeff, "Google Adds Voice Search to Chrome Browser", PC World, Jun. 14, 2011, 5 pages.
Cambria et al., "Jumping NLP Curves: A Review of Natural Language Processing Research", IEEE Computational Intelligence Magazine, 2014, vol. 9, May 2014, pp. 48-57.
Caraballo et al., "Language Identification Based on a Discriminative Text Categorization Technique", Iberspeech 2012—Vii Jornadas En Tecnologia Del Habla and Iii Iberiansl Tech Workshop, Nov. 21, 2012, pp. 1-10.
Castleos, "Whole House Voice Control Demonstration", available online at : https://www.youtube.com/watch?v=9SRCoxrZ_W4, Jun. 2, 2012, 26 pages.
Chamberlain, Kim, "Quick Start Guide Natural Reader", available online at <http://atrc.colostate.edu/files/quickstarts/Natural_Reader_Quick_Start_Guide.>, Apr. 2008, 5 pages.
Colt, Sam, "Here's One Way Apple's Smartwatch Could Be Better Than Anything Else", Business Insider, Aug. 21, 2014, pp. 1-4.
Deedeevuu, "Amazon Echo Alarm Feature", Available online at https://www.youtube.com/watch?v=fdjU8eRLk7c, Feb. 16, 2015, 1 page.
EARTHLING1984, "Samsung Galaxy Smart Stay Feature Explained", Available online at:—"https://www.youtube.com/watch?v=RpjBNtSjupl", May 29, 2013, 1 page.
Erol et al., "Multimedia Clip Generation From Documents for Browsing on Mobile Devices", IEEE Transactions on Multimedia, vol. 10, No. 5, Aug. 2008, 13 pages.
Filipowicz, Luke, "How to use the Quick Type Keyboard in iOS 8", available online at <https://www.imore.com/comment/568232>, Oct. 11, 2014, pp. 1-17.
Finkel et al., "Joint Parsing and Named Entity Recognition", Human Language Technologies: The 2009 Annual Conference of the North American Chapter of the ACL, Jun. 2009, pp. 326-334.
Gomez et al., "Mouth Gesture and Voice Command Based Robot Command Interface", IEEE International Conference on Robotics and Automation, May 12-17, 2009, pp. 333-338.
Google Developers, "Voice Search in Your App", Available online at:—https://www.youtube.com/watch?v=PS1FbB5qWEI, Nov. 12, 2014, 1 page.
Gruber, Thomas R., et al., U.S. Appl. No. 61/186,414, filed Jun. 12, 2009 titled "System and Method for Semantic Auto-Completion" 13 pages.
Hashimoto, Yoshiyuki, "Simple Guide for iPhone Siri, Which Can Be Operated with Your Voice", Shuwa System Co., Ltd., vol. 1, Jul. 5, 2012, pp. 8, 130, 131.
Headset Button Controller v7.3 APK Full App Download for Android, Blackberry, iPhone, Jan. 27, 2014, 11 pages.
Hear voice from Google translate, Available on URL:https://www.youtube.com/watch?v=18AvMhFqD28, Jan. 28, 2011, 1 page.
id3.org, "id3v2.4.0-Frames", available at <http://id3.org/id3v2.4.0-frames?action=print>, retrieved on Jan. 22, 2015, 41 pages.
iNEWS and Tech, "How to Use the QuickType Keyboard in iOS 8", Available online at:—"http://www.inewsandtech.com/how-to-use-the-quicktype-keyboard-in-ios-8/", Sep. 17, 2014, 6 pages.
iOS 8 Release, "Quick Type Keyboard on iOS 8 Makes Typing Easier", Retrieved from the Internet: URL:https://www.youtube.com/watch?v=0CidLR4fhVU, [Retrieved on Nov. 23, 2018], XP054978896, Jun. 3, 2014, 1 page.
Jawaid et al., "Machine Translation with Significant Word Reordering and Rich Target-Side Morphology", WDS'11 Proceedings of Contributed Papers, Part I, 2011, pp. 161-166.
Jonsson et al, "Proximity-based Reminders Using Bluetooth", 2014 IEEE International Conference on Pervasive Computing and Communications Demonstrations, 2014, pp. 151-153.
Jouvet et al., "Evaluating Grapheme-to-phoneme Converters in Automatic Speech Recognition Context", IEEE, 2012, pp. 4821-4824.
Kane et al., "Slide Rule: Making Mobile Touch Screens Accessible to Blind People Using Multi-Touch Interaction Techniques", Assets, Oct. 13-15, 2008, pp. 73-80.

(56) References Cited

OTHER PUBLICATIONS

Karn, Ujjwal, “An Intuitive Explanation of Convolutional Neural Networks”, The Data Science Blog, Aug. 11, 2016, 23 pages.
Kazmucha, Allyson, “How to Send Map Locations Using iMessage”, iMore.com, Available at <http://www.imore.com/how-use-imessage-share-your-location-your-iphone>, Aug. 2, 2012, 6 pages.
Lewis, Cameron, “Task Ave for iPhone Review”, Mac Life, Available at <http://www.maclife.com/article/reviews/task_ave_iphone_review>, Mar. 3, 2011, 5 pages.
Liou et al., “Autoencoder for Words”, Neurocomputing, vol. 139, Sep. 2014, pp. 84-96.
Majerus, Wesley, “Cell Phone Accessibility for your Blind Child”, Retrieved from the Internet <URL:https://web.archive.org/web/20100210001100/https://nfb.org/images/nfb/publications/fr/fr28/3/fr280314.htm>, 2010, pp. 1-5.
Manning et al., “Introduction to Information Retrieval”, New York, Cambridge University Press, 2008, 504 pages.
Marketing Land, “Amazon Echo: Play Music”, Online Available at: <https://www.youtube.com/watch?v=A7V5NPbsXi4>, Apr. 27, 2015, 3 pages.
Martins et al., “Extracting and Exploring the Geo-Temporal Semantics of Textual Resources”, Semantic Computing, IEEE International Conference, 2008, pp. 1-9.
Mhatre et al., “Donna Interactive Chat-bot acting as a Personal Assistant”, International Journal of Computer Applications (0975-8887), vol. 140, No. 10, Apr. 2016, 6 pages.
Mikolov et al., “Linguistic Regularities in Continuous Space Word Representations”, Proceedings of NAACL-HLT, Jun. 9-14, 2013, pp. 746-751.
Morrison, Jonathan, “iPhone 5 Siri Demo”, Online Available at <https://www.youtube.com/watch?v=_wHWwG5lhWc>, Sep. 21, 2012, 3 pages.
Morton, Philip, “Checking If an Element Is Hidden”, StackOverflow, Available at <http://stackoverflow.com/questions/178325/checking-if-an-element-is-hidden>, Oct. 7, 2008, 12 pages.
Nakamura, Satoshi, “Overcoming the Language Barrier with Speech Translation Technology, Science & Technology Trends”, Quarterly Review No. 31, Apr. 2009, pp. 36-49.
Nakazawa et al., “Detection and Labeling of Significant Scenes from TV program based on Twitter Analysis”, Proceedings of the 3rd Forum on Data Engineering and Information Management (DEIM 2011 proceedings), IEICE Data Engineering Technical Group. Available online at: http://db-event.jpn.org/deim2011/proceedings/pdf/f5-6.pdf, Feb. 28, 2011, 10 pages (Official Copy Only). (See Communication under 37 CFR § 1.98(a) (3)).
NDTV, “Sony SmartWatch 2 Launched in India for Rs. 14,990”, available at <http://gadgets.ndtv.com/others/news/sony-smartwatch-2-launched-in-india-for-rs-14990-420319>, Sep. 18, 2013, 4 pages.
Ng, Simon, “Google’s Task List Now Comes to Iphone”, SimonBlog, Available at <http://www.simonblog.com/2009/02/04/googles-task-list-now-comes-to-iphone/>, Feb. 4, 2009, 3 pages.
Nozawa, Naoki et al., “iPhone 4S Perfect Manual”, vol. 1, First Edition, Nov. 11, 2011, 5 pages (Official Copy Only) (See Communication under 37 CFR § 1.98(a) (3)).
Office Action received for Chinese Patent Application No. 201580028666.0, dated Nov. 5, 2018, 19 pages (5 pages of English translation and 14 pages).
Office Action received for European Patent Application No. 157182940, dated Nov. 6, 2018, 7 pages.
Okuno et al., “System for Japanese Input Method based on the Internet”, Technical Report of Information Processing Society of Japan, Natural Language Processing, Japan, Information Processing Society of Japan, vol. 2009, No. 36, Mar. 18, 2009, 8 pages (Official Copy Only) (See Communication under 37 CFR § 1.98(a) (3)).
Osxdaily, “Get a List of Siri Commands Directly from Siri”, Available at <http://osxdaily.com/2013/02/05/list-siri-commands/>, Feb. 5, 2013, 15 pages.
Pan et al., “Natural Language Aided Visual Query Building for Complex Data Access”, In proceeding of: Proceedings of the Twenty-Second Conference on Innovative Applications of Artificial Intelligence, XP055114607, Jul. 11, 2010, pp. 1821-1826.
Pathak et al., “Privacy-preserving Speech Processing: Cryptographic and String-matching Frameworks Show Promise”, In: IEEE signal processing magazine, retrieved from <http://www.merl.com/publications/docs/TR2013-063.pdf>, Feb. 13, 2013, 16 pages.
Patra et al., “A Kernel-Based Approach for Biomedical Named Entity Recognition”, Scientific World Journal, vol. 2013, 2013, pp. 1-7.
Pennington et al., “GloVe: Global Vectors for Word Representation”, Proceedings of the Conference on Empirical Methods Natural Language Processing (EMNLP), Oct. 25-29, 2014, pp. 1532-1543.
Perlow, Jason, “Alexa Loop Mode With Playlist for Sleep Noise”, Online Available at: <https://www.youtube.com/watch?v=nSkSuXziJSg>, Apr. 11, 2016, 3 pages.
Powell, Josh, “Now You See Me . . . Show/Hide Performance”, available at http://www.learningjquery.com/2010/05/now-you-see-me-showhide-performance, May 4, 2010, 3 pages.
Rios, Mafe, “New bar search for Facebook”, Youtube, available at “https://www.youtube.com/watch?v=vwgN1WbvCas”, Jul. 19, 2013, 2 pages.
Routines, “SmartThings Support”, Available online at <https://web.archive.org/web/20151207165701/https://support.smartthings.com/hc/en-us/articles/205380034-Routines>, 2015, 2 pages.
Samsung, “SGH-a885 Series—Portable Quad-Band Mobile Phone-User Manual”, Retrieved from the Internet: URL: “http://web.archive.org/web/20100106113758/http://www.comparecellular.com/images/phones/userguide1896.pdf”, Jan. 1, 2009, 144 pages.
Seehafer, Brent, “Activate google assistant on Galaxy S7 with screen off”, Available online at:—“https://productforums.google.com/forum/#!topic/websearch/lp3gIGBHLVI”, Mar. 8, 2017, 4 pages.
Selfrifge et al., “Interact: Tightly-coupling Multimodal Dialog with an Interactive Virtual Assistant”, International Conference on Multimodal Interaction, ACM, Nov. 9, 2015, pp. 381-382.
Spivack, Nova, “Sneak Preview of Siri—Part Two—Technical Foundations—Interview with Tom Gruber, CTO of Siri”, Online Available at <https://web.archive.org/web/20100114234454/http://www.twine.com/item/12vhy39k4-22m/interview-with-tom-gruber-of-siri>, Jan. 14, 2010, 5 pages.
Sundaram et al., “Latent Perceptual Mapping with Data-Driven Variable-Length Acoustic Units for Template-Based Speech Recognition”, ICASSP 2012, Mar. 2012, pp. 4125-4128.
Sundermeyer et al., “From Feedforward to Recurrent LSTM Neural Networks for Language Modeling”, IEEE Transactions to Audio, Speech, and Language Processing, 2015, vol. 23, Mar. 2015, pp. 517-529.
Sundermeyer et al., “LSTM Neural Networks for Language Modeling”, Interspeech 2012, ISCA’s 13' Annual Conference, Sep. 9-13, 2012, pp. 194-197.
Tanaka, Tatsuo, “Next Generation IT Channel Strategy Through “Experience Technology””, Intellectual Resource Creation, Japan, Nomura Research Institute Ltd. vol. 19, No. 1, Dec. 20, 2010, 17 pages. (Official Copy only) (See Communication under 37 CFR § 1.98(a) (3)).
Vodafone Deutschland, “Samsung Galaxy S3 Tastatur Spracheingabe”, Available online at—“https://www.youtube.com/watch?v=6kOd6Gr8uFE”, Aug. 22, 2012, 1 page.
X.AI, “How it Works”, May 2016, 6 pages.
Xiang et al., “Correcting Phoneme Recognition Errors in Learning Word Pronunciation through Speech Interaction”, Speech Communication, vol. 55, No. 1, Jan. 1, 2013, pp. 190-203.
Xu, Yuhong, “Policy optimization of dialogue management in spoken dialogue system for out-of-domain utterances”, 2016 International Conference on Asian Language Processing (IALP), IEEE, Nov. 21, 2016, pp. 10-13.
Yan et al., “A Scalable Approach to Using DNN-Derived Features in GMM-HMM Based Acoustic Modeling for LVCSR”, InInterspeech, 2013, pp. 104-108.
Yates, Michael C., “How can I exit Google Assistant after i’m finished with it”, Available online at:—“https://productforums.google.com/forum/#!msg/phone-by-google/faECnR2RJwA/gKNtOkQgAQAJ”, Jan. 11, 2016, 2 pages.

(56) References Cited

OTHER PUBLICATIONS

Young et al., "The Hidden Information State model: A practical framework for POMDP-based spoken dialogue management", Computer Speech & Language, vol. 24, Issue 2, 2010, pp. 150-174.
Zangerle et al., "Recommending #-Tag in Twitter", Proceedings of the Workshop on Semantic Adaptive Socail Web, 2011, pp. 1-12.
Zhong et al., "JustSpeak: Enabling Universal Voice Control on Android", W4A'14, Proceedings of the 11th Web for All Conference, No. 36, Apr. 7-9, 2014, 8 pages.
Notice of Acceptance received for Australian Patent Application No. 2018201834, dated Sep. 30, 2019, 3 pages.
Notice of Allowance received for Japanese Patent Application No. 2016-564974, dated Dec. 21, 2018, 4 pages (1 page of English Translation and 3 pages of Official copy).
Non-Final Office Action received for U.S. Appl. No. 16/175,208, dated Nov. 27, 2019. 13 pages.
Office Action received for European Patent Application No. 15718294.0, dated Nov. 13, 2019, 8 pages.
Office Action received for Korean Patent Application No. 10-2018-7031455, dated Oct. 29, 2019, 9 pages (4 pages of English Translation and 5 pages of Official Copy).
Notice of Allowance received for Korean Patent Application No. 10-2018-7031452, dated Dec. 27, 2019, 4 pages (2 pages of English Translation and 2 pages of Official Copy).
Office Action received for Chinese Patent Application No. 201580028666.0, dated Feb. 3, 2020, 6 pages (3 pages of English Translation and 3 pages of Official Copy).

* cited by examiner

INTELLIGENT ASSISTANT FOR HOME AUTOMATION

CROSS-REFERENCE TO RELATED APPLICATION

This application is a Continuation Application of U.S. patent application Ser. No. 14/503,105, entitled INTELLIGENT ASSISTANT FOR HOME AUTOMATION, filed on Sep. 30, 2014, which claims priority to U.S. Patent Application Ser. No. 62/005,893, filed on May 30, 2014, entitled INTELLIGENT ASSISTANT FOR HOME AUTOMATION. Both applications are hereby incorporated by reference in their entirety for all purposes.

FIELD

This relates generally to natural language processing and, more specifically, to the use of a virtual assistant with natural language processing to control electronic devices.

BACKGROUND

Home electronic devices that can be controlled remotely using software applications running on a computing device, such as a mobile phone, tablet computer, laptop computer, desktop computer, or the like, have become increasingly popular. For example, numerous manufacturers create light bulbs that can be controlled by a software application running on a mobile phone to adjust the brightness and/or color of the bulb. Other devices, such as door locks, thermostats, and the like, having similar controls are also available.

While these devices can provide users with a greater level of control and convenience, it can become exceedingly difficult to manage these devices as the number of remotely controlled devices and the number of types of remotely controlled devices in the home increase. For example, a typical home can include 40-50 light bulbs placed throughout the various rooms of the home. Using conventional software applications, each light bulb is given a unique identifier, and a user attempting to control one of these devices must select the appropriate identifier from a list of available devices within a graphical user interface. Remembering the correct identifier for a particular light bulb and finding that identifier from a list of 40-50 identifiers can be a difficult and time-consuming process. To add to the difficulty of managing and controlling a large number of remotely controlled devices, different manufactures typically provide different software applications that must be used to control their respective devices. As a result, a user must locate and open one software application to turn on/off their light bulbs, and must then locate and open another software application to set the temperature of their thermostat.

SUMMARY

Systems and processes for using a virtual assistant to control electronic devices are provided. In one example process, a user can speak an input in natural language form to a user device to control one or more electronic devices. The user device can transmit the user speech to a server to be converted into a textual representation. The server can identify the one or more electronic devices and appropriate commands to be performed by the one or more electronic devices based on the textual representation. The identified one or more devices and commands to be performed can be transmitted back to the user device, which can forward the commands to the appropriate one or more electronic devices for execution. In response to receiving the commands, the one or more electronic devices can perform the commands and transmit their current states to the user device.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

Intelligent automated assistants (or virtual assistants) provide an intuitive interface between users and electronic devices. These assistants can allow users to interact with devices or systems using natural language in spoken and/or text forms. For example, a user can access the services of an electronic device by providing a spoken user input in natural language form to a virtual assistant associated with the electronic device. The virtual assistant can perform natural language processing on the spoken user input to infer the user's intent and operationalize the user's intent into tasks. The tasks can then be performed by executing one or more functions of the electronic device and a relevant output can be returned to the user in natural language form.

This relates to systems and processes for using a virtual assistant to control electronic devices. In one example process, a user can speak an input in natural language form to a user device to control one or more electronic devices. The user device can transmit the user speech to a server to be converted into a textual representation. The server can identify the one or more electronic devices and appropriate commands to be performed by the one or more electronic devices based on the textual representation. The identified one or more devices and commands to be performed can be transmitted back to the user device, which can forward the commands to the appropriate one or more electronic devices for execution. In response to receiving the commands, the one or more electronic devices can perform the commands and transmit their current states to the user device.

System Overview

Figure 1:
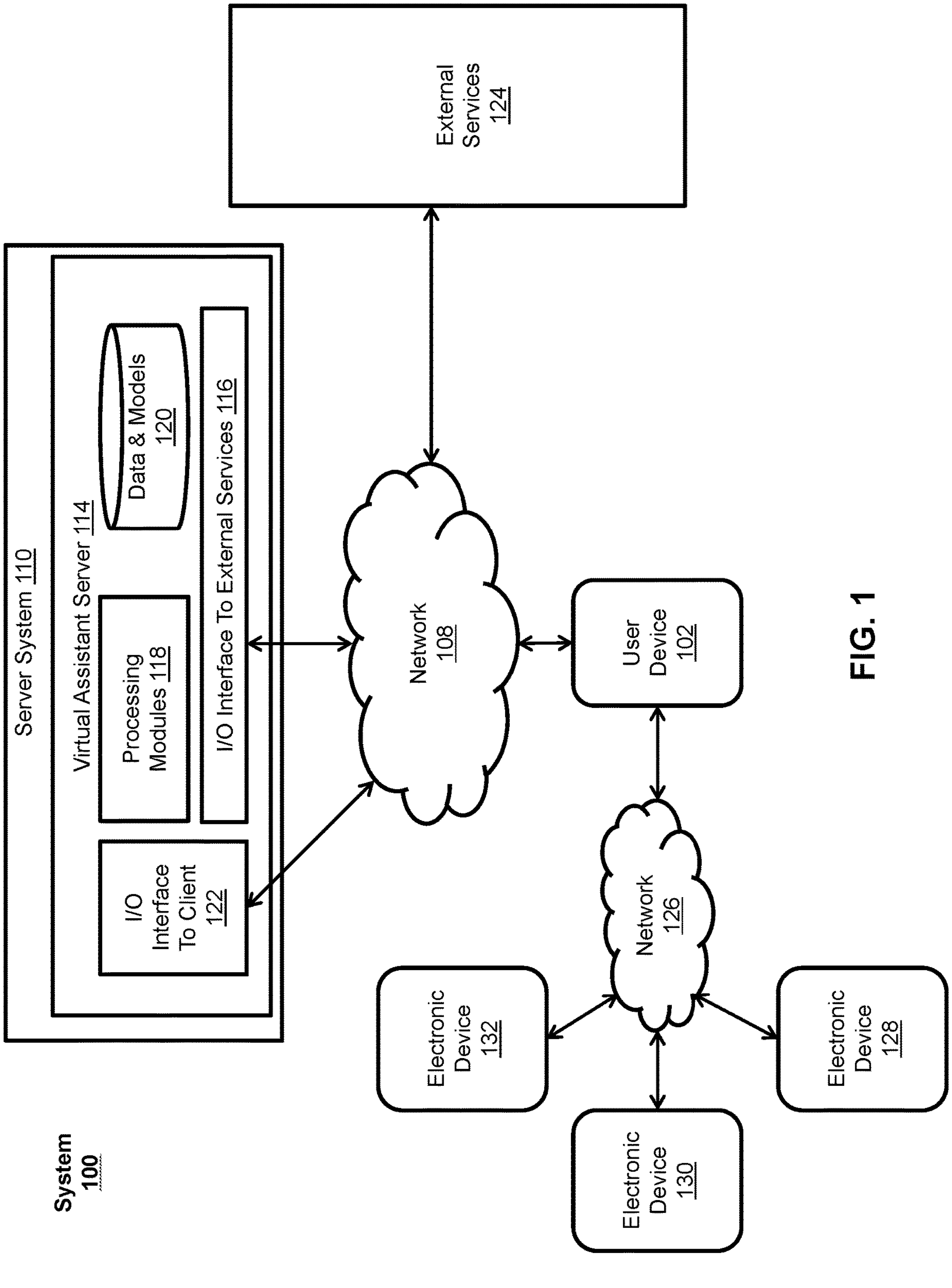
FIG. 1 illustrates an exemplary environment in which a virtual assistant can be used to control electronic devices according to various examples.

FIG. 1 illustrates exemplary system 100 for implementing a virtual assistant to control electronic devices according to various examples. The terms "virtual assistant," "digital assistant," "intelligent automated assistant," or "automatic digital assistant" can refer to any information processing system that interprets natural language input in spoken and/or textual form to infer user intent, and performs actions based on the inferred user intent. For example, to act on an inferred user intent, the system can perform one or more of the following: identifying a task flow with steps and parameters designed to accomplish the inferred user intent; inputting specific requirements from the inferred user intent into the task flow; executing the task flow by invoking programs, methods, services, APIs, or the like; and generating output responses to the user in an audible (e.g., speech) and/or visual form.

A virtual assistant can be capable of accepting a user request at least partially in the form of a natural language command, request, statement, narrative, and/or inquiry. Typically, the user request seeks either an informational answer or performance of a task by the virtual assistant. A satisfactory response to the user request can include provision of the requested informational answer, performance of the requested task, or a combination of the two. For example, a user can ask the virtual assistant a question, such as "Where am I right now?" Based on the user's current location, the virtual assistant can answer, "You are in Central Park." The user can also request the performance of a task, for example, "Please remind me to call Mom at 4 p.m. today." In response, the virtual assistant can acknowledge the request and then create an appropriate reminder item in the user's electronic schedule. During the performance of a requested task, the virtual assistant can sometimes interact with the user in a continuous dialogue involving multiple exchanges of information over an extended period of time. There are numerous other ways of interacting with a virtual assistant to request information or performance of various tasks. In addition to providing verbal responses and taking programmed actions, the virtual assistant can also provide responses in other visual or audio forms (e.g., as text, alerts, music, videos, animations, etc.).

An example of a virtual assistant is described in Applicants' U.S. Utility application Ser. No. 12/987,982 for "Intelligent Automated Assistant," filed Jan. 10, 2011, the entire disclosure of which is incorporated herein by reference.

As shown in FIG. 1, in some examples, a virtual assistant can be implemented according to a client-server model. The virtual assistant can include a client-side portion executed on a user device 102, and a server-side portion executed on a server system 110. User device 102 can include any electronic device, such as a mobile phone, tablet computer, portable media player, desktop computer, laptop computer, PDA, television, television set-top box, wearable electronic device, or the like, and can communicate with server system 110 through one or more networks 108, which can include the Internet, an intranet, or any other wired or wireless public or private network. The client-side portion executed on user device 102 can provide client-side functionalities, such as user-facing input and output processing and communications with server system 110. Server system 110 can provide server-side functionalities for any number of clients residing on a respective user device 102.

Server system 110 can include one or more virtual assistant servers 114 that can include a client-facing I/O interface 122, one or more processing modules 118, data and model storage 120, and an I/O interface to external services 116. The client-facing I/O interface 122 can facilitate the client-facing input and output processing for virtual assistant server 114. The one or more processing modules 118 can utilize data and model storage 120 to determine the user's intent based on natural language input, and perform task execution based on inferred user intent. Additionally, data and model storage 120 can store a unique identifier, a state, a type, a location, and any other relevant information associated with one or more of electronic devices (e.g., electronic devices 128, 130, and 132) capable of being controlled by user device 102 and/or server system 110. In some examples, virtual assistant server 114 can communicate with external services 124, such as telephony services, calendar services, information services, messaging services, navigation services, and the like, through network(s) 108 for task completion or information acquisition. The I/O interface to external services 116 can facilitate such communications.

Server system 110 can be implemented on one or more standalone data processing devices or a distributed network of computers. In some examples, server system 110 can employ various virtual devices and/or services of third party service providers (e.g., third-party cloud service providers) to provide the underlying computing resources and/or infrastructure resources of server system 110.

User device 102 can be further coupled to electronic devices 128, 130, and 132 via one or more networks 126. Electronic devices 128, 130, and 132 can include any type of remotely controlled electronic device, such as a light bulb (e.g., having a binary ON/OFF state, numerical dimmable state, color state, etc.), garage door (e.g., having a binary OPEN/CLOSED state), door lock (e.g., having binary LOCKED/UNLOCKED state), thermostat (e.g., having one or more numerical temperature states, such as a high temperature, low temperature, time-based temperatures, etc.), electrical outlet (e.g., having a binary ON/OFF state), switch (e.g., having a binary ON/OFF state), or the like. Network(s) 126 can include a WiFi network or any other wired or wireless public or private local network. Additionally or alternatively, user device 102 can be coupled to communicate directly with electronic devices 128, 130, or 132 using, for example, Bluetooth, BTLE, line of sight, peer-to-peer, or another radio-based or other wireless communication. Thus, in the illustrated example, user device 102 can be located near electronic devices 128, 130, and 132, such that it can communicate with them directly or over the same local network. For example, user device 102 and electronic devices 128, 130, and 132 can be located within the same home or building, and network(s) 126 can include the home or building's WiFi network. As discussed in greater detail below with respect to FIGS. 5, 8, and 9, user device 102 can issue commands to control any of electronic devices 128, 130, and 132 in response to a natural language spoken input provided by a user to user device 102.

While only three electronic devices 128, 130, and 132 are shown, it should be appreciated that system 100 can include any number of electronic devices. Additionally, although the functionality of the virtual assistant is shown in FIG. 1 as including both a client-side portion and a server-side portion, in some examples, the functions of the assistant can be implemented as a standalone application installed on a user device. Moreover, the division of functionalities between the client and server portions of the virtual assistant can vary in different examples. For instance, in some examples, the client executed on user device 102 can be a thin-client that provides only user-facing input and output processing functions, and delegates all other functionalities of the virtual assistant to a backend server.

Figure 2:
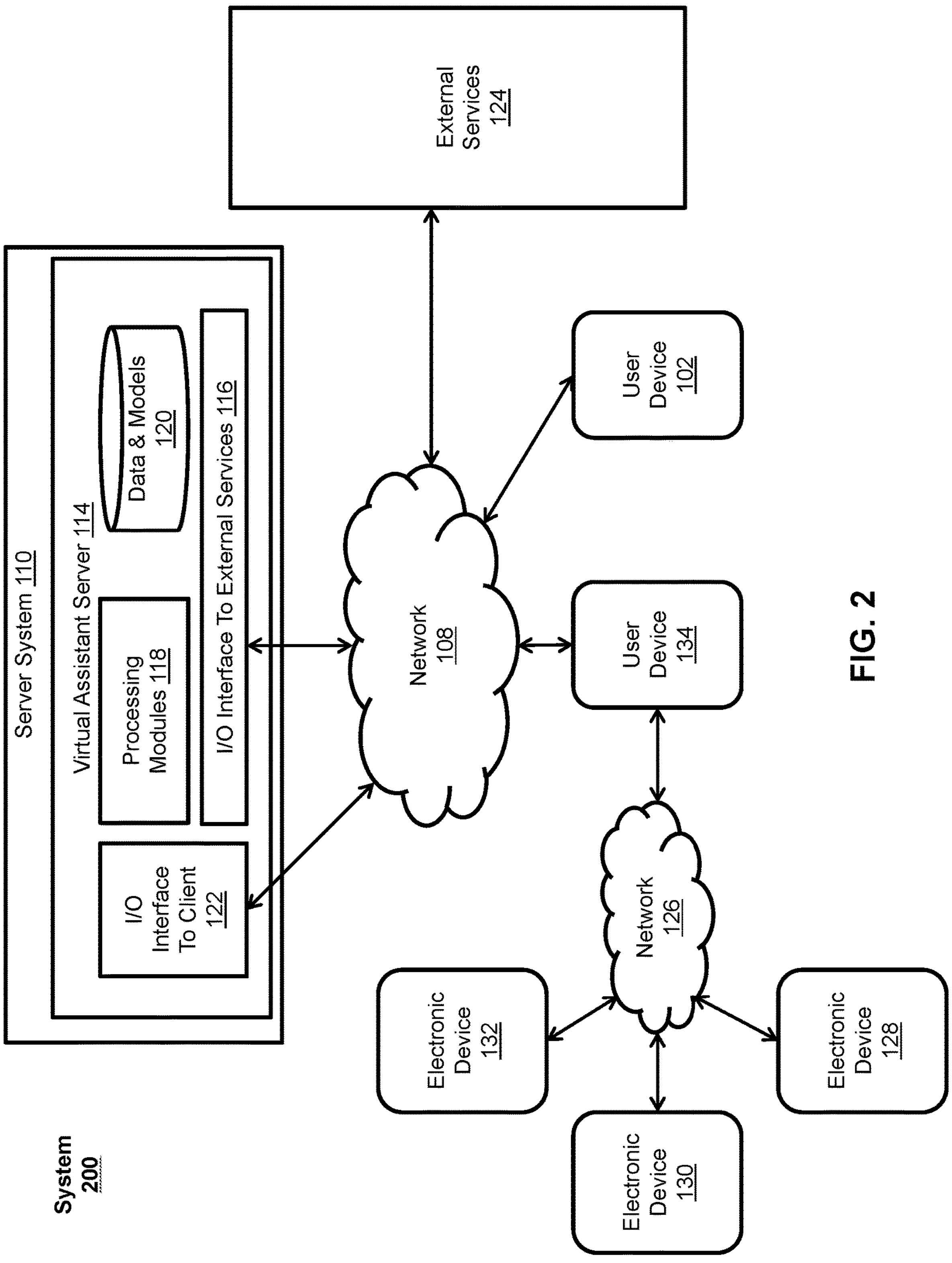
FIG. 2 illustrates an exemplary environment in which a virtual assistant can be used to remotely control electronic devices according to various examples.

FIG. 2 illustrates another exemplary system 200 for implementing a virtual assistant to remotely control electronic devices according to various examples. Similar to system 100, system 200 can include user device 102, server system 110, and external services 124 communicatively coupled together by network(s) 108. However, in contrast to system 100, user device 102 may not be coupled to electronic devices 128, 130, and 132. Instead, system 200 can include a second user device 134 coupled to communicate with user device 102 and/or server system 110 via network(s) 108 and coupled to communicate with electronic devices 128, 130, and 132 via network(s) 126. This configuration can represent a situation in which the user and user device 102 are located remotely from electronic devices 128, 130, and 132 (e.g., the user and user device 102 are at the user's office, while electronic devices 128, 130, and 132 are at the user's home).

Second user device 134 can include any type of electronic device, such as a mobile phone, tablet computer, portable media player, desktop computer, laptop computer, PDA, television, television set-top box, wearable electronic device, or the like, and can be configured to receive commands from user device 102 and/or server system 110 and to issue commands to electronic devices 128, 130, and 132. As discussed in greater detail below with respect to FIG. 6, second user device 134 can issue commands to control any of electronic devices 128, 130, and 132 in response to a natural language spoken input provided by a user to user device 102.

User Device

Figure 3:
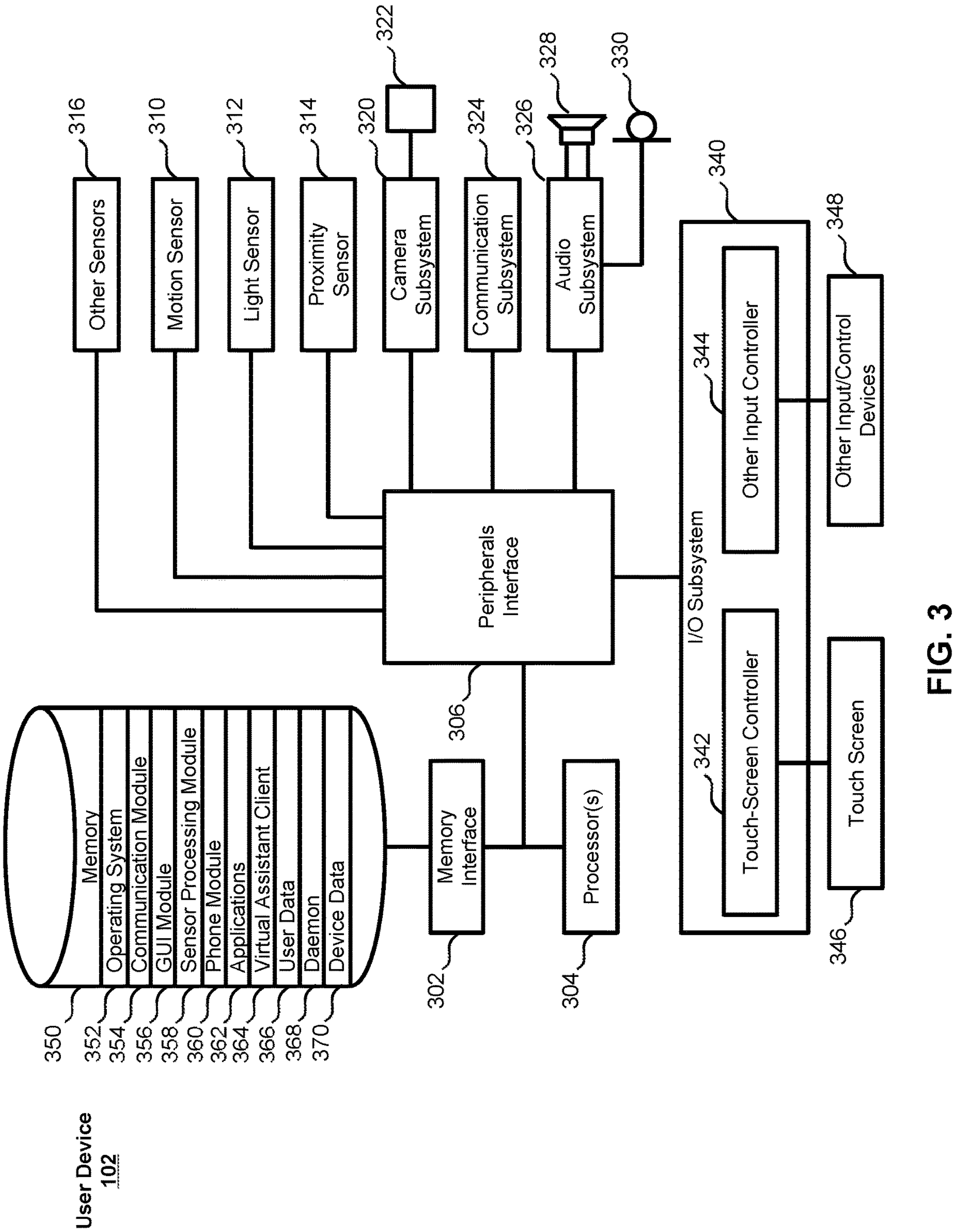
FIG. 3 illustrates an exemplary user device according to various examples.

FIG. 3 is a block diagram of a user-device 102 (or second user device 134) according to various examples. As shown, user device 102 can include a memory interface 302, one or more processors 304, and a peripherals interface 306. The various components in user device 102 can be coupled together by one or more communication buses or signal lines. User device 102 can further include various sensors, subsystems, and peripheral devices that are coupled to the peripherals interface 306. The sensors, subsystems, and peripheral devices gather information and/or facilitate various functionalities of user device 102.

For example, user device 102 can include a motion sensor 310, a light sensor 312, and a proximity sensor 314 coupled to peripherals interface 306 to facilitate orientation, light, and proximity sensing functions. One or more other sensors 316, such as a positioning system (e.g., a GPS receiver), a temperature sensor, a biometric sensor, a gyroscope, a compass, an accelerometer, and the like, are also connected to peripherals interface 306, to facilitate related functionalities.

In some examples, a camera subsystem 320 and an optical sensor 322 can be utilized to facilitate camera functions, such as taking photographs and recording video clips. Communication functions can be facilitated through one or more wired and/or wireless communication subsystems 324, which can include various communication ports, radio frequency receivers and transmitters, and/or optical (e.g., infrared) receivers and transmitters. An audio subsystem 326 can be coupled to speakers 328 and a microphone 330 to facilitate voice-enabled functions, such as voice recognition, voice replication, digital recording, and telephony functions.

In some examples, user device 102 can further include an I/O subsystem 340 coupled to peripherals interface 306. I/O subsystem 340 can include a touch screen controller 342 and/or other input controller(s) 344. Touch-screen controller 342 can be coupled to a touch screen 346. Touch screen 346 and the touch screen controller 342 can, for example, detect contact and movement or break thereof using any of a plurality of touch sensitivity technologies, such as capacitive, resistive, infrared, and surface acoustic wave technologies, proximity sensor arrays, and the like. Other input controller(s) 344 can be coupled to other input/control devices 348, such as one or more buttons, rocker switches, a thumb-wheel, an infrared port, a USB port, and/or a pointer device such as a stylus.

In some examples, user device 102 can further include a memory interface 302 coupled to memory 350. Memory 350 can include any electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as CD, CD-R, CD-RW, DVD, DVD-R, or DVD-RW, or flash memory such as compact flash cards, secured digital cards, USB memory devices, memory sticks, and the like. In some examples, a non-transitory computer-readable storage medium of memory 350 can be used to store instructions (e.g., for performing some or all of processes 500, 600, 700, 800, or 900, described below) for use by or in connection with an instruction execution system, apparatus, or device, such as a computer-based system, processor-containing system, or other system that can fetch the instructions from the instruction execution system, apparatus, or device, and execute the instructions. In other examples, the instructions (e.g., for performing processes 500, 600, 700, 800, or 900, described below) can be stored on a non-transitory computer-readable storage medium of server system 110, or can be divided between the non-transitory computer-readable storage medium of memory 350 and the non-transitory computer-readable storage medium of server system 110. In the context of this document, a "non-transitory computer readable storage medium" can be any medium that can contain or store the program for use by or in connection with the instruction execution system, apparatus, or device.

In some examples, the memory 350 can store an operating system 352, a communication module 354, a graphical user interface module 356, a sensor processing module 358, a phone module 360, and applications 362. Operating system 352 can include instructions for handling basic system services and for performing hardware dependent tasks. Communication module 354 can facilitate communicating with one or more additional devices, one or more computers, and/or one or more servers. Graphical user interface module 356 can facilitate graphic user interface processing. Sensor processing module 358 can facilitate sensor related processing and functions. Phone module 360 can facilitate phone-related processes and functions. Application module 362 can facilitate various functionalities of user applications, such as electronic-messaging, web browsing, media processing, navigation, imaging, and/or other processes and functions.

Memory 350 can also store client-side virtual assistant instructions (e.g., in a virtual assistant client module 364) and various user data 366 (e.g., user-specific vocabulary data, preference data, and/or other data, such as the user's electronic address book, to-do lists, shopping lists, etc.) to provide the client-side functionalities of the virtual assistant.

In various examples, virtual assistant client module 364 can be capable of accepting voice input (e.g., speech input), text input, touch input, and/or gestural input through various user interfaces (e.g., I/O subsystem 340, audio subsystem 326, or the like) of user device 102. Virtual assistant client module 364 can also be capable of providing output in audio (e.g., speech output), visual, and/or tactile forms. For example, output can be provided as voice, sound, alerts, text messages, menus, graphics, videos, animations, vibrations, and/or combinations of two or more of the above. During operation, virtual assistant client module 364 can communicate with the virtual assistant server using communication subsystem 324.

In some examples, virtual assistant client module 364 can utilize the various sensors, subsystems, and peripheral devices to gather additional information from the surrounding environment of user device 102 to establish a context associated with a user, the current user interaction, and/or the current user input. In some examples, virtual assistant client module 364 can provide the contextual information or a subset thereof with the user input to the virtual assistant server to help infer the user's intent. The virtual assistant can also use the contextual information to determine how to prepare and deliver outputs to the user.

In some examples, the contextual information that accompanies the user input can include sensor information, such as lighting, ambient noise, ambient temperature, images or videos of the surrounding environment, distance to another object, and the like. The contextual information can further include information associated with the physical state of user device 102 (e.g., device orientation, device location, device temperature, power level, speed, acceleration, motion patterns, cellular signal strength, etc.) or the software state of user device 102 (e.g., running processes, installed programs, past and present network activities, background services, error logs, resources usage, etc.). Any of these types of contextual information can be provided to the virtual assistant server 114 as contextual information associated with a user input.

In some examples, virtual assistant client module 364 can selectively provide information (e.g., user data 366) stored on user device 102 in response to requests from the virtual assistant server 114. Virtual assistant client module 364 can also elicit additional input from the user via a natural language dialogue or other user interfaces upon request by virtual assistant server 114. Virtual assistant client module 364 can pass the additional input to virtual assistant server 114 to help virtual assistant server 114 in intent inference and/or fulfillment of the user's intent expressed in the user request.

Figure 4:
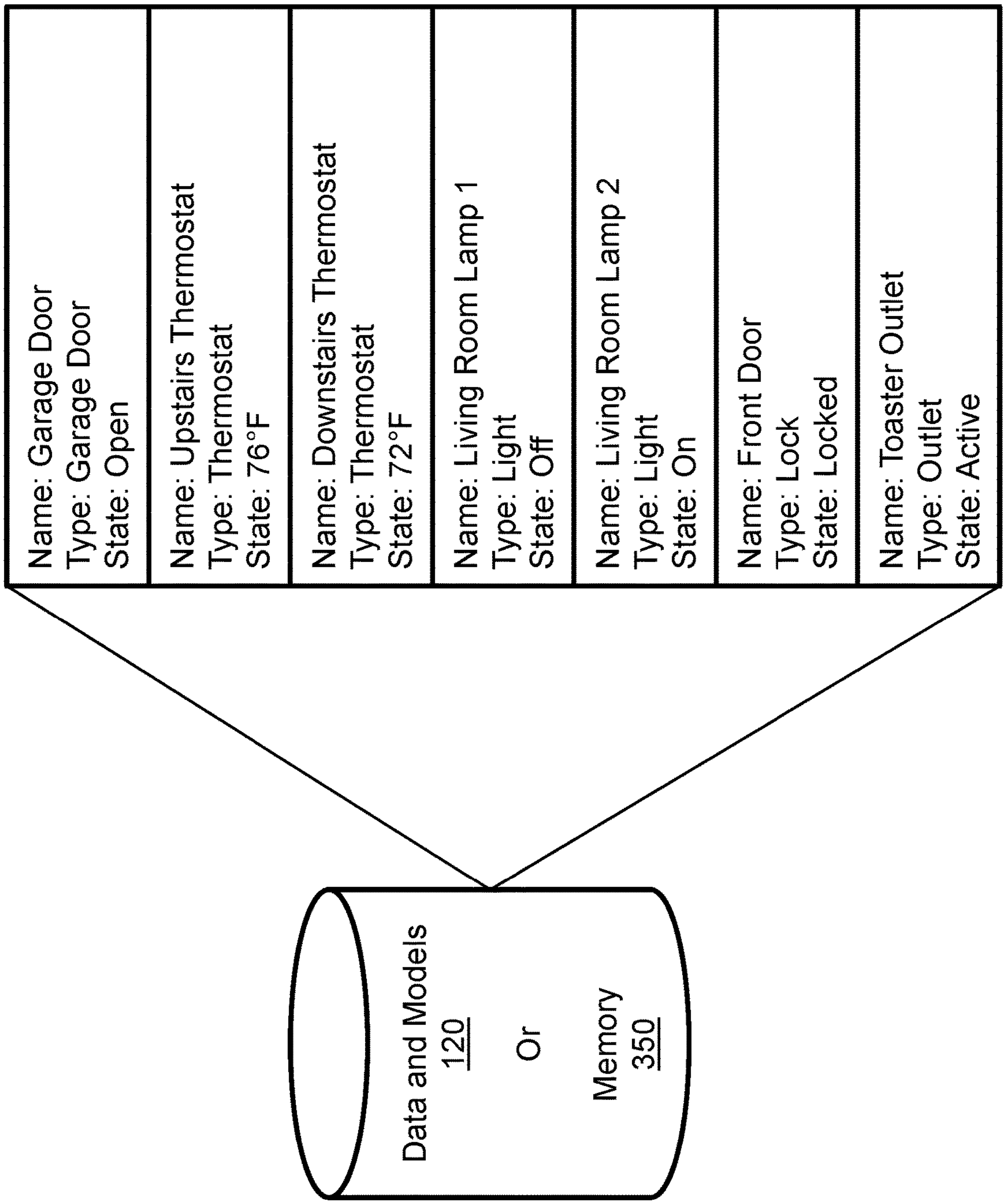
FIG. 4 shows a visual representation of multiple entries used to store information associated with electronic devices according to various examples.

Memory 350 can further store electronic device data 370 that can include a unique identifier, a state, a type, a location, and any other relevant information associated with one or more of the electronic devices capable of being controlled by user device 102 and/or server system 110 (e.g., electronic devices 128, 130, and 132). FIG. 4 shows a visual representation of entries that can be stored in electronic device data 370 for seven different electronic devices. As shown, each entry includes a unique name, type, and state of the electronic device. Data and model storage 120 of virtual assistant server 114 can include similar or identical entries for the electronic devices that can be maintained separately from that of electronic device data 370 of memory 350.

Referring back to FIG. 3, memory 350 can further include instructions (e.g., in daemon module 368) for creating and updating entries for electronic devices in electronic device data 370, communicating with the electronic devices of system 100, and for communicating with server system 110. For example, to add an electronic device to system 100, a software application associated with the electronic device can communicate with processor(s) 304 executing daemon module 368 to provide user device 102 with a unique name, type, state, location, and the like, of the electronic device. The software application can allow the user to enter the unique name in any desired manner. For example, a drop-down box with common names and/or a freeform text field can be provided in the application to allow a user to name a particular device. The type, state, and/or location of the electronic device can be predetermined or determined by the software application through communication with the electronic device. Processor(s) 304 executing daemon module 368 can store this information as an entry in electronic device data 370 and can also transmit this information to server system 110 to be stored in data and models storage 120. Additionally, when executed by processor(s) 304, daemon module 368 can receive commands that are to be provided to electronic devices 128, 130, and 132 from server system 110 via network(s), and can transmit those commands to the appropriate electronic devices. Processor(s) 304 executing daemon module 368 can further receive state updates from electronic devices 128, 130, and 132, update the corresponding entries in electronic device data 370 to reflect the updated states of the devices, and transmit the state updates to server system 110 to allow server system 110 to update the corresponding entries in data and models storage 120 to reflect the updated states of the devices.

Additionally, daemon module 368 can include instructions to manage access to electronic device data 370 by other devices and software applications. For example, when executed by processor(s) 304, daemon module 368 can grant access to all of electronic device data 370 by server system 110, but can restrict access to only a portion of electronic device data 370 by other devices or software applications. This can be useful when user device 102 is used to control electronic devices made by different manufacturers. In these situations, devices or software applications from each manufacturer can communicate with daemon module 368 using an API, and daemon module 368 can limit their access to only the portions of electronic device data 370 that correspond to their respective electronic devices. For example, company X can manufacture a light bulb capable of being controlled by user device 102, and company Y can manufacture a thermostat capable of being controlled by user device 102. Daemon module 368 can facilitate communication between user device 102 and each of the light bulb and the thermostat to allow user device 102 to issue commands to the electronic devices and to receive state information associated with the electronic devices for updating electronic device data 370. However, daemon module 368 can limit the access that the light bulb (and an associated software application running on user device 102) has to information in electronic device data 370 to only the information associated with the light bulb (and possibly any other electronic devices manufactured by company X). Similarly, daemon module 368 can limit the access that the thermostat (and an associated software application running on user device 102) has to information in electronic device data 370 to only the information associated with the thermostat (and possibly any other electronic devices manufactured by company Y). However, daemon module 368 can grant access to all of the information in electronic device data 370 to server system 110.

In various examples, memory 350 can include additional instructions or fewer instructions. Furthermore, various functions of user device 102 can be implemented in hardware and/or in firmware, including in one or more signal processing and/or application specific integrated circuits.

Local Control of Electronic Devices

Figure 5:
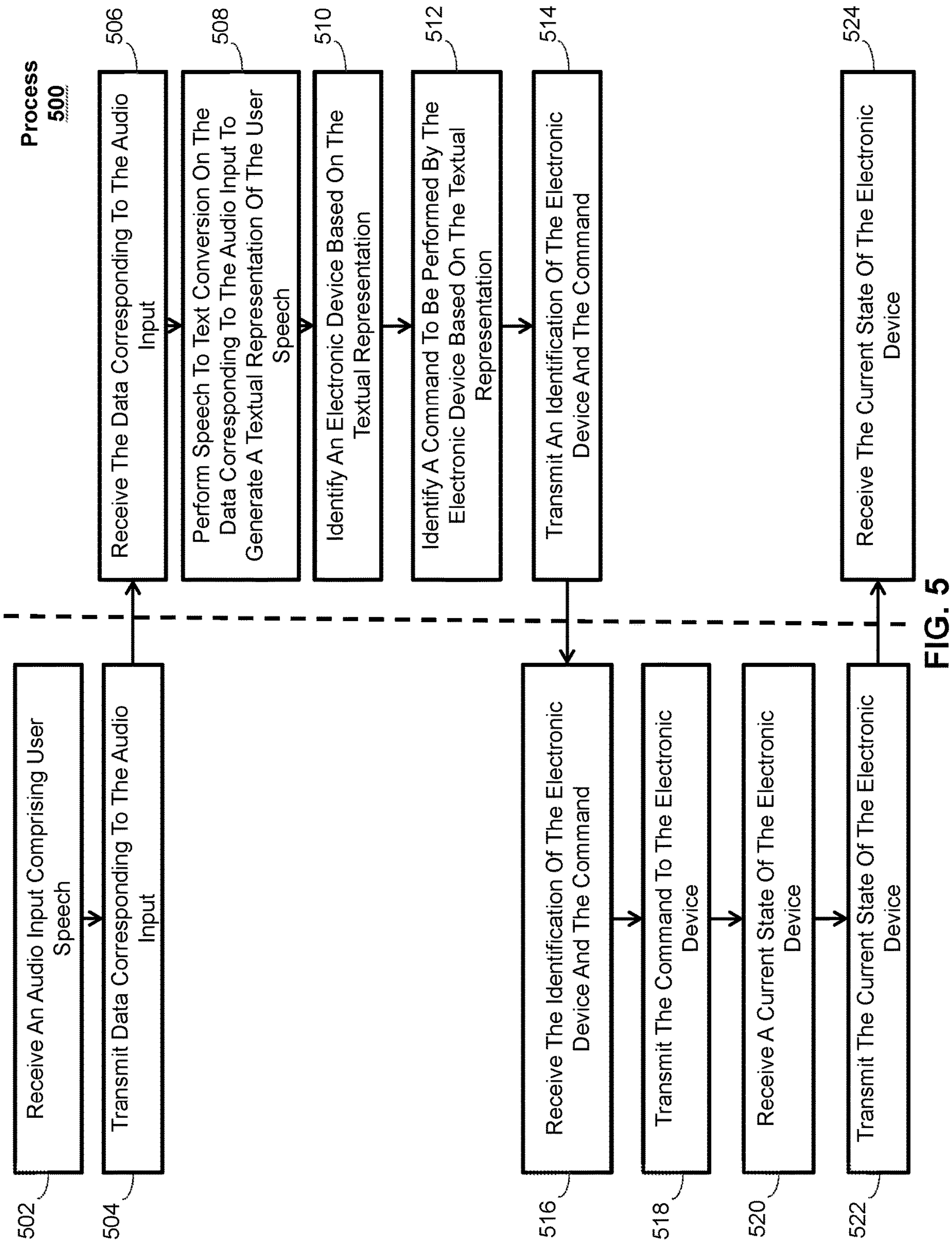
FIG. 5 illustrates an exemplary process for controlling electronic devices using a virtual assistant implemented using a client-server model according to various examples.

FIG. 5 illustrates an exemplary process 500 for controlling electronic devices using a virtual assistant. In some examples, process 500 can be performed using a system similar or identical to system 100, shown in FIG. 1. In these examples, the blocks of process 500 can be performed by both user device 102 and server system 110. Specifically, the blocks on the left side of FIG. 5 can be performed by user device 102, while the blocks on the right side of FIG. 5 can be performed by server system 110.

At block 502, an audio input including user speech can be received at a user device. In some examples, a user device (e.g., user device 102) can receive audio input that includes a user's speech via a microphone (e.g., microphone 330). The microphone can convert the audio input into an analog or digital representation, and provide the audio data to one or more processors (e.g., processor(s) 304).

At block 504, data corresponding to the audio input received at block 502 can be transmitted to one or more servers for processing. For example, user device 102 can transmit data corresponding to the audio input to virtual assistant server 114 of server system 110 via network(s) 108.

At block 506, data corresponding to the audio input transmitted by the user device at block 504 can be received by one or more servers. For example, virtual assistant server 114 of server system 110 can receive the data corresponding to the audio input transmitted by user device 102 via network(s) 108.

At block 508, speech-to-text conversion can be performed on the data corresponding to the audio input to convert the user speech into a textual representation of the user speech. The user speech can be converted using any known speech-to-text conversion process.

At block 510, one or more electronic devices can be identified based at least in part on the textual representation generated at block 508. In some examples, block 510 can include processing the textual representation of the user input to determine a user intent to issue a command to one or more electronic devices. As discussed above, server system 110 can include one or more data and model storages 120 that can store a unique identifier, a state, a type, a location, and any other relevant information associated with the electronic devices that can be controlled using system 100. Thus, block 510 can include identifying one or more of the electronic devices having associated information stored in data models and storages 120.

The one or more electronic devices can be identified in any number of ways. In some examples, the one or more electronic devices can be identified by parsing the textual representation to identify any of a set of nouns that correspond to the electronic devices supported by system 100. For example, the set of nouns can include the unique names of the electronic devices stored in electronic device data 370 and data and models storage 120, the possible types of electronic devices and their synonyms (e.g., garage door, thermostat, light, dimmable light, switch, color changeable light, bulb, lamp, lock, outlet, socket, etc.), categories of possible device states (e.g., volume, temperature, brightness, color, etc.), and the like.

To illustrate, using the example electronic device entries of FIG. 4, the set of nouns can include the unique names of the seven electronic devices (e.g., "Garage Door," "Upstairs Thermostat," "Downstairs Thermostat," "Living Room Lamp 1," "Living Room Lamp 2," "Front Door," and "Toaster Outlet"), the possible types of electronic devices and their synonyms (e.g., "Garage Door," "Thermostat," "Light," "Bulb," "Lamp," "Lock," "Outlet," "Socket," etc.), and categories of possible device states (e.g., temperature). Thus, if the textual representation of user speech generated at block 508 includes "Lock the front door," the textual representation can be processed using processing modules 118 and data and models storage 120 to search for any of the set of nouns. As a result of the search, it can be determined that the textual representation includes the unique name "Front Door," and the electronic device identified at block 510 can include this device. It should be appreciated that more than one electronic device can be identified at block 510 depending on the textual representation of user speech. For example, if the textual representation of user speech generated at block 508 instead includes "Turn off all the bulbs," the textual representation can be processed using processing modules 118 and data and models storage 120 to search for any of the set of nouns. As a result of the search, it can be determined that the textual representation includes the synonym "bulb" of the possible device type "light," and that the instruction from the user was to turn off all of those types of devices. As a result, the electronic devices identified at block 510 can include both "Living Room Lamp 1" and "Living Room Lamp 2."

In some examples, it can be difficult to identify the appropriate electronic device using only the set of nouns described above. For example, a textual representation that includes "Turn on the light" can produce a type match with both "Living Room Lamp 1" and "Living Room Lamp 2." In these examples, block 510 can further include the use of contextual information received from user device 102 (e.g., received as part of the data corresponding to the audio input at block 506) to disambiguate between potential matching electronic devices. Any type of contextual information can be used, such as sensor information (e.g., lighting, ambient noise, ambient temperature, images or videos of the surrounding environment, distance to another object, and the like), information associated with the physical state of user device 102 (e.g., device orientation, device location, device temperature, power level, speed, acceleration, motion patterns, cellular signal strength, etc.), the software state of user device 102 (e.g., running processes, installed programs, past and present network activities, background services, error logs, resources usage, etc.), or the like. For example, continuing with the "Turn on the light" example provided above, the location and orientation of user device 102 when user device 102 received the audio input at block 502 can be provided to server system 110 at blocks 504 and 506. This contextual information can be used to determine a location of user device 102 and/or a direction at which user device 102 was pointed when receiving the user speech. When compared with the known locations of "Living Room Lamp 1" and "Living Room Lamp 2" stored in data and models storage 120, the closest light or the light at which user device 102 was pointing can be selected as the electronic device at block 510. Other types of contextual information can be used in similar ways to disambiguate between potential matching electronic devices at block 510 by identifying contextual information that makes one or more of the potential matching electronic devices more or less likely to have been referenced by the textual representation of user speech.

In yet other examples, words associated with a state in the textual representation of user input can additionally or alternatively be used to disambiguate between potential matching electronic devices or to identify the appropriate electronic device. For example, a textual representation that includes "Turn it to 68" may not produce any matches using the set of nouns described above. Thus, in these examples, block 510 can further include parsing the textual representation to identify any of a set of words associated with a state that corresponds to the electronic devices supported by system 100. For example, the set of words associated with a state can include the possible states of the electronic devices and their synonyms (e.g., open, closed, close, shut, on, off, active, inactive, lock, locked, a color, etc.), the types of values of the states (e.g., binary, float, etc.), a query for the state of the device, adjectives associated with a specific type of state (e.g., warmer, cooler, brighter, dimmer, a color, etc.), or the like. When used to parse "Turn it to 68," it can be determined that the textual representation includes the float value "68." When compared to the entries shown in FIG. 4, it can be determined that only "Upstairs Thermostat" and "Downstairs Thermostat" accept state float values. To disambiguate between the two thermostats, contextual information, such as a location of user device 102 can be used to select the thermostat that is closer to user device 102 as the electronic device identified at block 510. Similarly, if the textual representation instead included "Make it brighter," the set of words associated with a state can be used to determine that the textual representation includes the word "brighter," which is an adjective that describes the state of devices having the type "light." To disambiguate between the two lights, contextual information, such as a location of user device 102 can be used to select the light that is closer to user device 102 as the electronic device identified at block 510.

At block 512, a command to be performed by each of the one or more electronic devices identified at block 510 can be identified. The command(s) to be performed can be identified in any number of ways. In some examples, the command(s) to be performed can be identified by parsing the textual representation of user speech to identify any of the set of words associated with a state (e.g., the possible states of the electronic devices and their synonyms, the types of values of the states, a query for the state of the device, adjectives associated with a specific type of state). The identified state or operation can then be used to identify a command to be performed by each of the one or more electronic devices identified at block 510. For example, if the textual representation of user speech includes "Lock the front door," it can be determined that the textual representation includes the state "lock" from the set of states. Thus, a command to transition to the "lock" state can be generated and identified at block 512 as being the command to be performed by the electronic device "Front Door" that was identified at block 510. While a single command for a single electronic device is identified in the example above, it should be appreciated that multiple commands can be identified if multiple electronic devices were identified at block 510. For example, the textual representation "Turn on all of the lights" can result in the identification a command to transition to the "on" state for each of "Living Room Lamp 1" and "Living Room Lamp 2" at block 512.

In some examples, when the textual representation of user speech includes one of the adjectives associated with a specific type of state (e.g., warmer, cooler, brighter, dimmer, etc.), block 512 can include identifying a command to set a state of the electronic device identified at block 510 to a value relative to its current value. For example, if the textual representation includes "make it warmer," the command identified at block 514 can be a command to increase the temperature of the thermostat identified at block 510 by a predetermined amount. The command can be a command to change the state value by an amount relative to the electronic device's current value rather than a command to transition the state value to a specific value (e.g., determined using the state of the thermostat stored in data and models storage 120) since the actual state of the electronic device may differ from the state stored in data and models storage 120.

In some examples, when the textual representation of user speech includes a query for the state of the device, block 512 can include identifying an instruction to cause user device 102 to query the identified electronic device(s). For example, if the textual representation includes "Is the garage door closed?", the command identified at block 514 can be a command to query the state of electronic device "Garage Door."

At block 514, an identification of each of the one or more electronic devices identified at block 510 and the command(s) to be performed by the one or more electronic devices identified at block 512 can be transmitted to the user device. For example, server system 110 can transmit the unique identifier associated with each of the electronic devices identified at block 510 and the command(s) to be performed by the one or more electronic devices to user device 102 via network(s) 108.

In some examples, the textual representation of the user speech generated at block 508 can also be transmitted to the user device at block 514. In these examples, blocks 510 and 514 can also be performed on the user device. The transmitted textual representation can be used by the user device to identify one or more electronic devices and/or identify a command or commands to be performed by the one or more electronic devices in electronic device data 370. This can be desirable, for example, when the electronic device data 370 in the user device is more up-to-date than the data on the one or more servers. In such instances, the user device can identify an electronic devices and/or a command that is not included in the data of the one or more servers.

In other examples, the textual representation can be parsed at blocks 510 and/or 512 at the one or more servers to determine key words or terms that can be suitable for identifying one or more of electronic devices and/or identifying a command or commands to be performed by the one or more electronic devices. In these examples, the parsed key words or terms can also be transmitted to the user device at block 514. The transmitted key words or terms can be used by the user device to identify one or more electronic devices and/or identify a command or commands to be performed by the one or more electronic devices in electronic device data 370. This can be desirable, for example, when the electronic device data 370 in the user device is more up-to-date than the data on the one or more servers. In such instances, the user device can identify an electronic devices and/or a command that is not included in the data of the one or more servers.

At block 516, the identification of each of the one or more the electronic devices and command(s) transmitted by the one or more servers can be received by the user device. For example, user device 102 can receive the unique identifier(s) and the command(s) transmitted by server system 110 at block 514 via network(s) 108.

At block 518, the user device can transmit the command(s) received at block 516 to the electronic device(s) associated with the identifier(s) received at block 516. For example, if user device 102 received an identifier associated with electronic device 128 (e.g., "Front Door") and a command to transition the electronic device to a "locked" state at block 516, user device 102 can transmit the command to electronic device 128 to transition to the "locked" state via network(s) 126. If user device 102 received additional identifiers and commands at block 516, user device 102 can further transmit those commands to the identified electronic devices at block 518.

In some examples, the actual state of an electronic device may not be the same as the state of the electronic device as stored in user device 102 (e.g., in memory 350) and/or server system 110 (e.g., in data and models storage 120). For example, a door lock could have been manually opened or closed without using the virtual assistant of system 100. Thus, in some examples, block 518 can be performed regardless of the state of the electronic device as stored in user device 102 and/or server system 110. For example, a command to set a door lock's state to "locked" can be transmitted to the door lock even if the corresponding entry in user device 102 and/or server system 110 indicates that they door is already locked. Moreover, block 518 can be performed without first querying the electronic device (e.g., between blocks 516 and 518) to determine its actual state in order to reduce the amount of time required to issue a command to the electronic device. For example, the command to set the door lock's state to "locked" can be transmitted to the door lock without first querying its state, thereby reducing the time required to transmit the command to the door lock by an amount corresponding to the time required to send a query to the door lock and to receive the state from the door lock.

At block 520, the user device can receive a current state of each electronic device (that was sent a command at block 518) after each electronic device executes their respective command. For example, user device 102 can receive an updated status of electronic device 128 after it performed the command to set its state to "locked." In this example, the current state returned to user device 102 can be the state "locked." If commands were sent to more than one electronic device at block 518, block 520 can further include receiving current states from those electronic devices. In some examples, block 520 can further include updating the state of the electronic device in electronic device data 370 based on the received current state. For example, user device 102 can update the state of electronic device 128 in electronic device data 370 to "locked." In some examples, block 520 can further include outputting an audio or visual indication of a result of the command(s) transmitted to the electronic device(s) at block 518 based on the transmitted command(s) and the received current state(s) of the electronic device(s). For example, if the command transmitted to electronic device 128 was a command to transition the device's state to "locked" and the current state of electronic device 128 received at block 520 was "locked," an indication of the result can be that electronic device 128 was successfully transitioned to the "locked" state. Alternatively, if the received current state of the electronic device (e.g., "unlocked") differs from the desired state indicated in the command (e.g., "locked"), an indication of a failure to transition to the "locked" state can be presented to the user. The current state can further include an error state, such as an undetermined or unavailable state of the device.

At block 522, the user device can transmit the current state(s) of the electronic device(s) received at block 520 to the one or more servers. For example, user device 102 can transmit the current state of the electronic device received at block 520 to server system 110. If the current state of more than one electronic device was received at block 520, block 522 can further include transmitting those current states to server system 110.

At block 524, the one or more servers can receive the current state(s) of the electronic device(s) transmitted by the user device at block 522. For example, server system 110 can receive the current state of the electronic device transmitted by user device 102 at block 522. If user device 102 transmitted more than one current state, block 524 can further include receiving those current states as well. In some examples, block 524 can further include updating the state(s) of the electronic device(s) in data and models storage 120 based on the received current state(s). For example, server system 110 can update the state of electronic device 128 in data and models storage 120 to "locked."

In some examples, process 500 can further include generating a notification associated with the current state of one or more of the electronic devices in response to determining that a predetermined condition has been satisfied. For example, in response to the location of user device 102 exiting a predetermined area (e.g., an area corresponding to the user's home) while one or more of the electronic devices are in a predetermined state (e.g., the "Front Door" is unlocked), a notification can be presented to the user via user device 102 indicating that the user forgot to lock their door. Other similar notifications can be generated in response to other predetermined conditions.

Using process 500, a virtual assistant implemented by a user device can receive natural language commands to set the state or query any number of electronic devices. The natural language commands can refer to the electronic devices in any desired manner and need not include unique identifiers of the electronic devices or a type of the electronic device.

Remote Control of Electronic Devices

Figure 6:
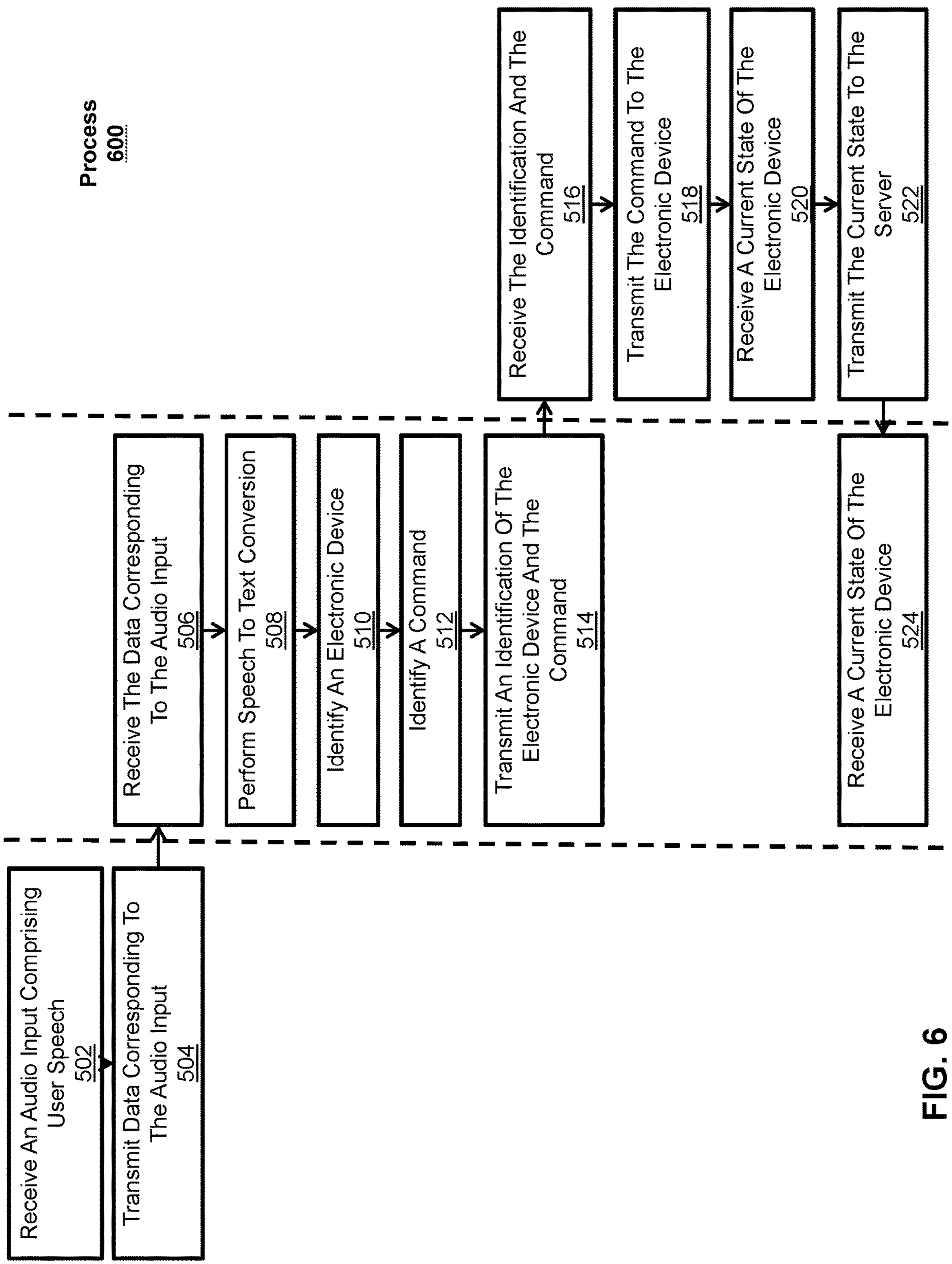
FIG. 6 illustrates an exemplary process for remotely controlling electronic devices using a virtual assistant implemented using a client-server model according to various examples.

FIG. 6 illustrates an exemplary process 600 for remotely controlling electronic devices using a virtual assistant. In some examples, process 600 can be similar to process 500, except that process 600 can be performed using a system similar or identical to system 200, shown in FIG. 2. For example, process 600 can be performed by a user device (e.g., user device 102) that is located remotely from the electronic devices being controlled (e.g., electronic devices 128, 130, and 132), and a second user device (e.g., second user device 134) can instead be used to control the electronic devices. Thus, portions of process 600 can be performed by each of user device 102, server system 110, and second user device 134. Specifically, the blocks on the left side of FIG.

6 can be performed by user device 102, the blocks in the middle of FIG. 6 can be performed by server system 110, and the blocks on the right side of FIG. 6 can be performed by second user device 134.

The blocks of process 600 can be similar or identical to the identically numbered blocks of process 500, except that blocks 516, 518, 520, and 522 of process 600 can instead be performed by a second user device (e.g., second user device 134). Additionally, as a result, the identification of each of the one or more electronic devices and command(s) to be performed by the electronic device(s) can instead be transmitted to the second user device at block 514, and the current state(s) of the electronic device(s) can instead be received from the second user device at block 524.

In some examples, process 600 can further include transmitting, by the one or more servers, the current state(s) of the electronic device(s) received at block 524 to the user device that received the audio input at block 502. Additionally or alternatively, the process can include transmitting an indication of success of the command transmitted to the electronic device at block 518. For example, a visual or audio output can be generated that notifies the user of the success, partial success, or failure to execute the command by the electronic device. The success determination can depend on the command transmitted to the electronic device and the current state of the device received at block 524.

Standalone Control of Electronic Devices

Figure 7:
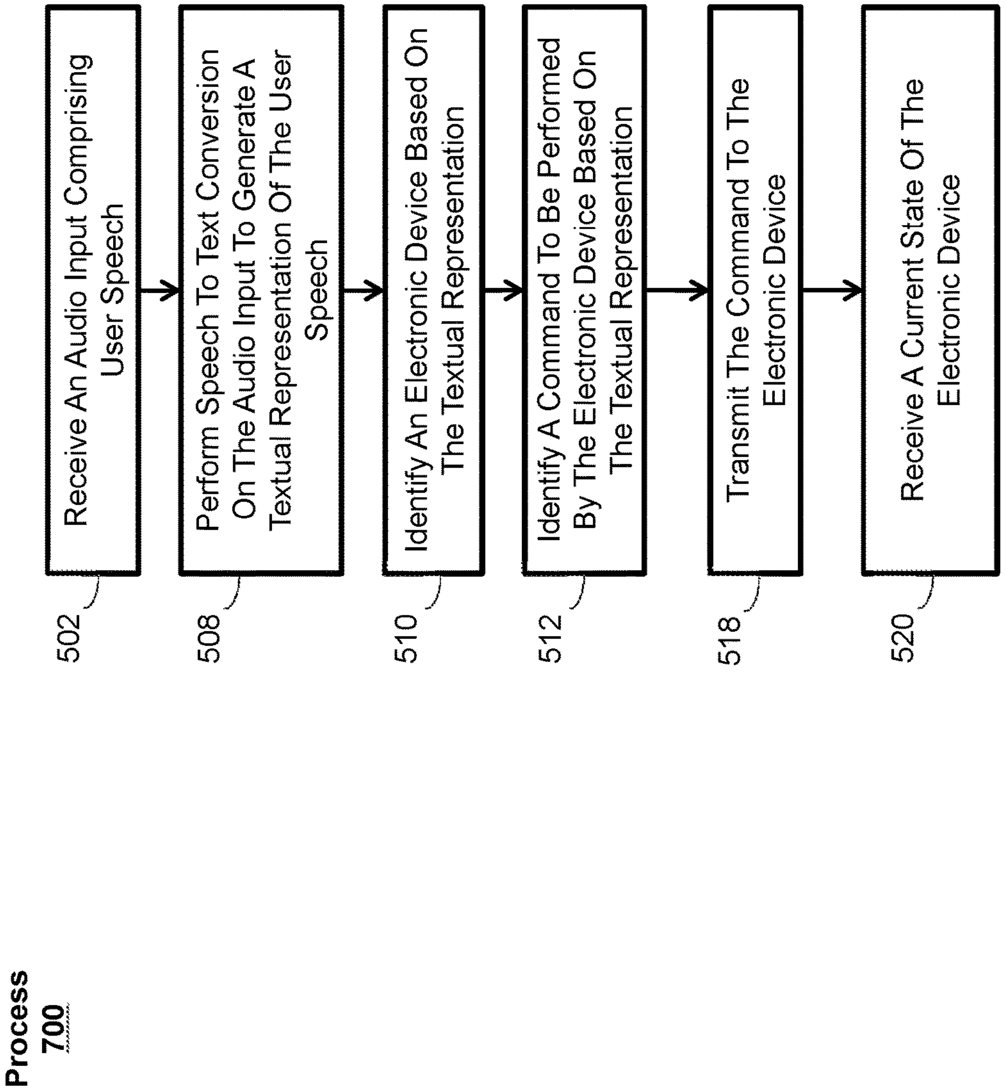
FIG. 7 illustrates an exemplary process for controlling electronic devices using a virtual assistant on a standalone user device according to various examples.

FIG. 7 illustrates an exemplary process 700 for controlling electronic devices using a virtual assistant. In some examples, process 700 can be similar to process 500, except that process 700 can be performed using a standalone user device that can perform the functions of both user device 102 and server system 110. As a result, all blocks of process 700 can be performed by the user device (e.g., user device 102).

The blocks of process 700 can be similar or identical to the identically numbered blocks of process 500, except that blocks 508, 510, and 512 can instead be performed by the user device (e.g., user device 102). Additionally, as a result, the blocks corresponding to functions for communicating between user device 102 and server system 110 (e.g., blocks 504, 506, 514, 516, 522, and 524) need not be performed.

Storing A Configuration of Electronic Devices

Figure 8:
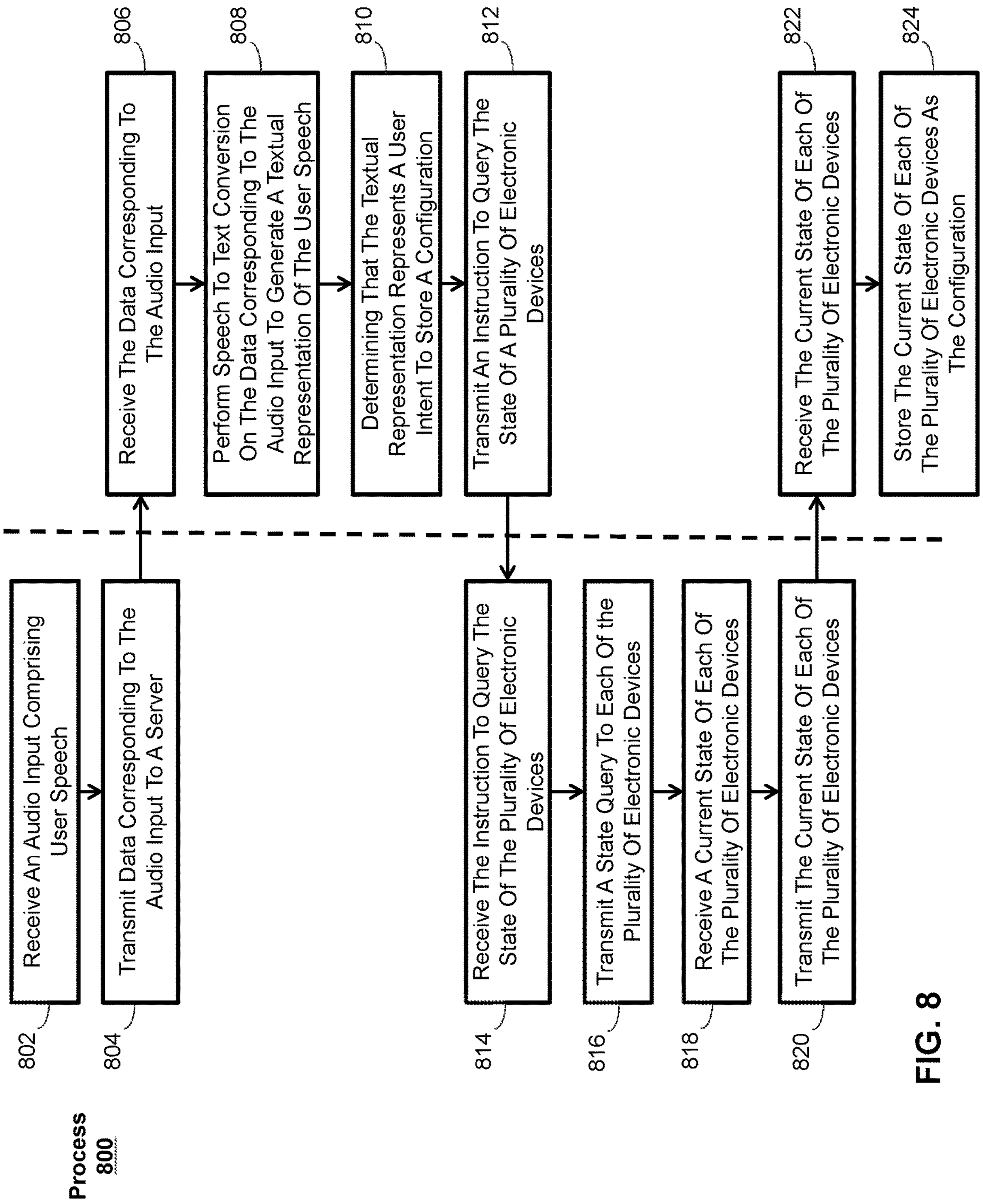
FIG. 8 illustrates an exemplary process for storing the states of electronic devices as a configuration according to various examples.

FIG. 8 illustrates an exemplary process 800 for storing the states of multiple electronic devices as a configuration using a virtual assistant. The configuration can represent a stored set of states of the multiple electronic devices that can be referenced in a spoken user input to cause the multiple electronic devices to transition to the states defined in the configuration. For example, a user may create a "sleep" configuration in which the states of all lights are set to off, the states of the thermostats are set to 72° F., the state of all doors are set to locked, and the state of the garage door is set to closed. Thus, when the user is about to go to sleep, the user can provide user device 102 with a command that references the stored configuration, such as "I'm going to sleep," and system 100 can set the states of the electronic devices based on the stored states in the sleep configuration. In some examples, process 800 can be performed using a system similar or identical to system 100, shown in FIG. 1. In these examples, the blocks of process 800 can be performed by both user device 102 and server system 110. Specifically, the blocks on the left side of FIG. 8 can be performed by user device 102, while the blocks on the right can be performed by server system 110.

At block 802, an audio input including user speech can be received at a user device in a manner similar or identical to block 502 of process 500. At block 804, data corresponding to the audio input received at block 802 can be transmitted to one or more servers for processing in a manner similar or identical to block 504 of process 500.

At block 806, the data corresponding to the audio input transmitted by the user device at block 804 can be received by one or more servers in a manner similar or identical to block 506 of process 500. At block 808, speech to text conversion can be performed on the data corresponding to the audio input to convert the user speech into a textual representation of the user speech in a manner similar or identical to block 508 of process 500.

At block 810, it can be determined that the textual representation of the user speech represents a user intent to store the states of the electronic devices of system 100 as a configuration. For example, one or more processing modules 118 of server system 110 can utilize data and model storage 120 to determine the user's intent based on natural language input. In some examples, this can include parsing the textual representation for words likely to be related to storing a configuration, such as "save," "store," "name," "keep," "configuration," "scene," their synonyms, and the like. For example, if the textual representation includes "Store this configuration as sleep," it can be determined at block 810 that the user intends to store the state of the electronic devices as a configuration named "sleep." Other textual representations, such as "Save this scene as work," can similarly result in a determination at block 810 that the user intends to store the state of the electronic devices as a configuration named "work."

At block 812, in response to determining that the textual representation of the user speech represents a user intent to store the state of the electronic devices of system 100 as a configuration, the one or more servers can transmit an instruction to the user device to query the state of the electronic devices. For example, server system 110 can transmit an instruction to user device 102 to query the state of electronic devices 128, 130, and 132 via network(s) 108.

At block 814, the instruction to query the state of the electronic devices transmitted by the one or more servers can be received by the user device. For example, user device 102 can receive the instruction to query the state of electronic devices 128, 130, and 132 from server system 110 via network(s) 108.

At block 816, the user device can transmit a query to each of the electronic devices for their current state. For example, user device 102 can transmit a command to each of electronic devices 128, 130, and 132 instructing them to return their current state via network(s) 126.

At block 818, the user device can receive a current state of each of the electronic device(s) in response to the query transmitted at block 516 (or a current state of all electronic devices capable of transmitting their current state). For example, user device 102 can receive a current state of electronic devices 128, 130, and 132 via network(s) 126 in response to the query sent to each of the devices at block 816. In some examples, block 818 can further include updating the state of the electronic device in electronic device data 370 based on the received current state. The current state can further include an error state, such as an undetermined or unavailable state of the device.

At block 820, the user device can transmit the current states of the electronic devices received at block 818 to the one or more servers. For example, user device 102 can transmit the current states of the electronic devices received at block 818 to server system 110.

At block 822, the one or more servers can receive the current states of the electronic devices transmitted by the user device at block 820. For example, server system 110 can receive the current state of electronic devices 128, 130, and 132 from user device 102 via network(s) 126.

At block 824, the one or more servers can store the current states of the electronic devices received at block 822 as a configuration. In some examples, the configuration can be assigned a unique identifier, such as "sleep," "morning," "work," or the like, based on the name provided in the textual representation and identified at block 810. For example, server system 110 can store the current states of electronic devices 128, 130, and 132 as a "sleep" configuration in model and data storage 120 in response to a user speech received at block 802 that included "name this configuration sleep."

Controlling Electronic Devices Using a Stored Configuration

Figure 9:
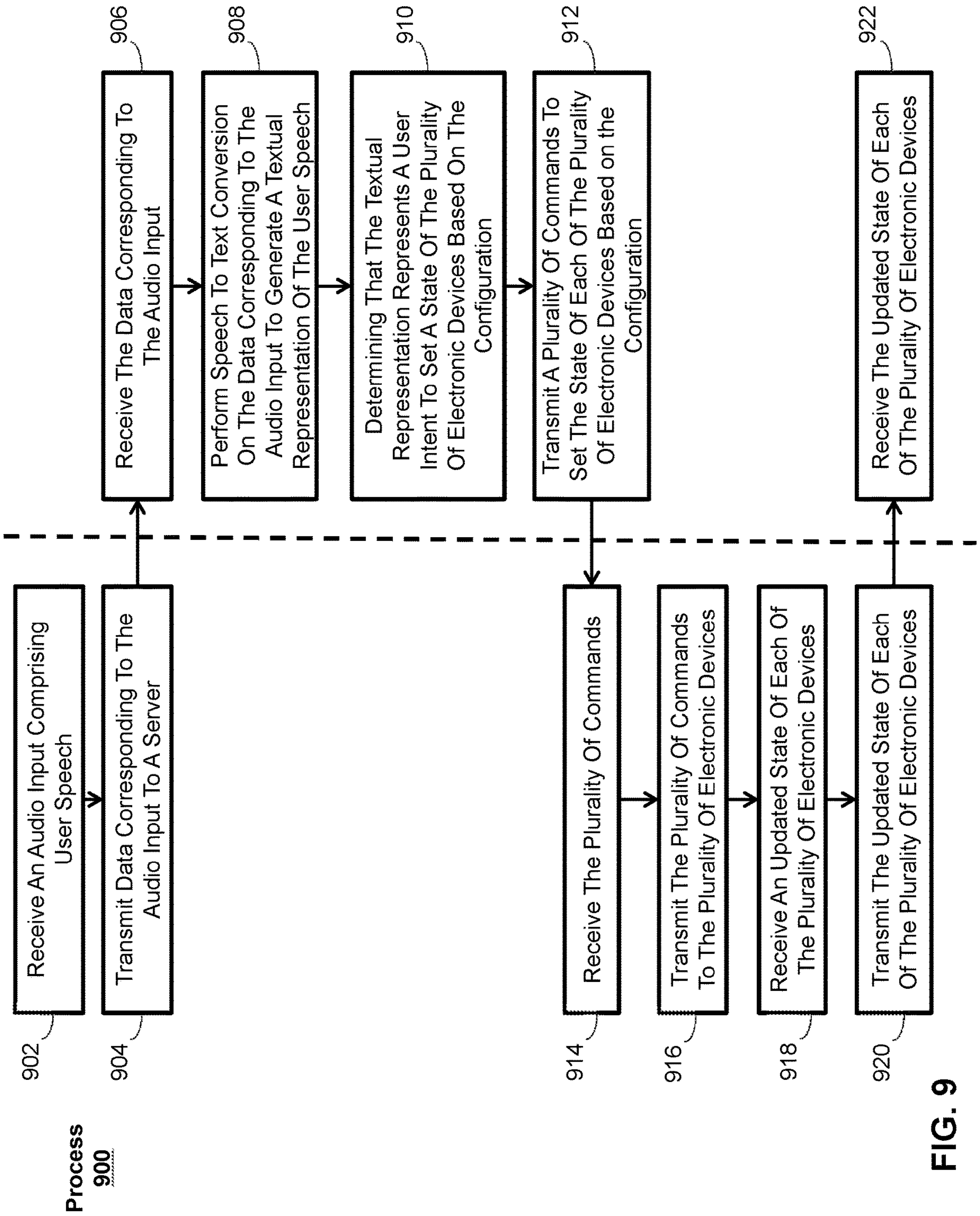
FIG. 9 illustrates an exemplary process for setting the states of electronic devices using a previously stored configuration according to various examples.

FIG. 9 illustrates an exemplary process 900 for setting the states of multiple electronic devices using a previously stored configuration (e.g., created using process 800) using a virtual assistant. In some examples, process 900 can be performed using a system similar or identical to system 100, shown in FIG. 1. In these examples, the blocks of process 900 can be performed by both user device 102 and server system 110. Specifically, the blocks on the left side of FIG. 9 can be performed by user device 102, while the blocks on the right can be performed by server system 110.

At block 902, an audio input including user speech can be received at a user device in a manner similar or identical to block 502 of process 500. At block 904, data corresponding to the audio input received at block 902 can be transmitted to one or more servers for processing in a manner similar or identical to block 504 of process 500.

At block 906, data corresponding to the audio input transmitted by the user device at block 904 can be received by one or more servers in a manner similar or identical to block 506 of process 500. At block 908, speech to text conversion can be performed on the user speech of the audio input to convert the user speech into a textual representation of the user speech in a manner similar or identical to block 508 of process 500.

At block 910, it can be determined that the textual representation of the user speech represents a user intent to set the states of the electronic devices of system 100 based on a stored configuration. For example, one or more processing modules 118 of server system 110 can utilize data and model storage 120 to determine the user's intent based on natural language input. In some examples, this can include parsing the textual representation for words likely to be related to using a stored configuration, such as the unique identifiers associated with the stored configurations, "set," "configuration," "scene," their synonyms, or the like. For example, if the textual representation includes "I'm going to sleep," it can be determined at block 910 that the user intends to set the state of the electronic devices based on the "sleep" configuration. Other textual representations, such as "night mode," "set to sleep," or the like, can similarly result in a determination at block 910 that the user intends set the state of the electronic devices based on the "sleep" configuration.

At block 912, commands to set the states of the electronic devices of system 100 based on the configuration identified at block 910 can be transmitted by the one or more servers to the user device. Identifications associated with the commands can also be transmitted to identify which devices are to perform each command. For example, server system 110 can transmit the unique identifiers associated with the electronic devices and the commands that are to be performed by those electronic devices to cause the electronic devices to be in the states specified by the stored configuration.

At block 914, commands to set the states of the electronic devices of system 100 transmitted by the server(s) can be received by the user device. For example, user device 102 can receive the commands transmitted by server system 110 at block 912 via network(s) 108.

At block 916, the user device can transmit the commands received at block 914 to the electronic devices associated with the commands. For example, user device 102 can transmit commands to electronic devices 128, 130, and 132 via network(s) 126 to cause the electronic devices to be in the states specified by the stored configuration.

In some examples, the actual state of an electronic device may not be the same as the state of the electronic device as stored in user device 102 (e.g., in memory 350) and/or server system 110 (e.g., in data and models storage 120). Thus, in some examples and similar to process 500, block 916 can be performed regardless of the state of the electronic device as stored in user device 102 and/or server system 110, and without first querying the electronic devices (e.g., between blocks 914 and 916) to determine their actual states in order to reduce the amount of time required to issue a command to the electronic devices.

At block 918, the user device can receive an updated state of the electronic devices after the electronic devices perform the commands transmitted by the user device at block 916. For example, user device 102 can receive updated statuses of electronic devices 128, 130, and 132 after they performed the commands to set their states to the states specified by the stored configuration. In some examples, block 920 can further include updating the state of the electronic device in electronic device data 370 based on the received current state. For example, user device 102 can update the state of electronic device 128 in electronic device data 370 to "locked." In some examples, similar to block 520, block 918 can further include outputting an audio or visual indication of a result of the command(s) transmitted to the electronic device(s) at block 916 based on the transmitted command(s) and the received current state(s) of the electronic device(s). The updated state can further include an error state, such as an undetermined or unavailable state of the device.

At block 920, the user device can transmit the updated states of the electronic device received at block 918 to the one or more servers. For example, user device 102 can transmit the updated states of the electronic devices received at block 918 to server system 110.

At block 922, the one or more servers can receive the updated states of the electronic devices transmitted by the user device at block 920. For example, server system 110 can receive the updated states of the electronic devices transmitted by user device 102 at block 920. In some examples, block 922 can further include updating the states of the electronic devices in data and models storage 120 based on the received updated states.

In some examples, additionally or alternatively, the states of the electronic devices can be configured using a stored configuration in response to determining that a predetermined condition has been satisfied. For example, in response to the location of user device 102 entering a predetermined area (e.g., an area corresponding to the user's home), commands can be sent to the electronic devices to transition to states specified by a stored configuration (e.g., a "home" configuration). Similarly, commands can be sent to the electronic devices to transition to states specified by another stored configuration (e.g., a "work" configuration) in response to the location of user device 102 exiting a predetermined area (e.g., an area corresponding to the user's home) during a predetermined window of time (e.g., between 8-9 a.m. on a weekday). Other similar predetermined conditions can be created to cause system 100 to configure the electronic devices based on stored configurations.

Electronic Device

Figure 10:
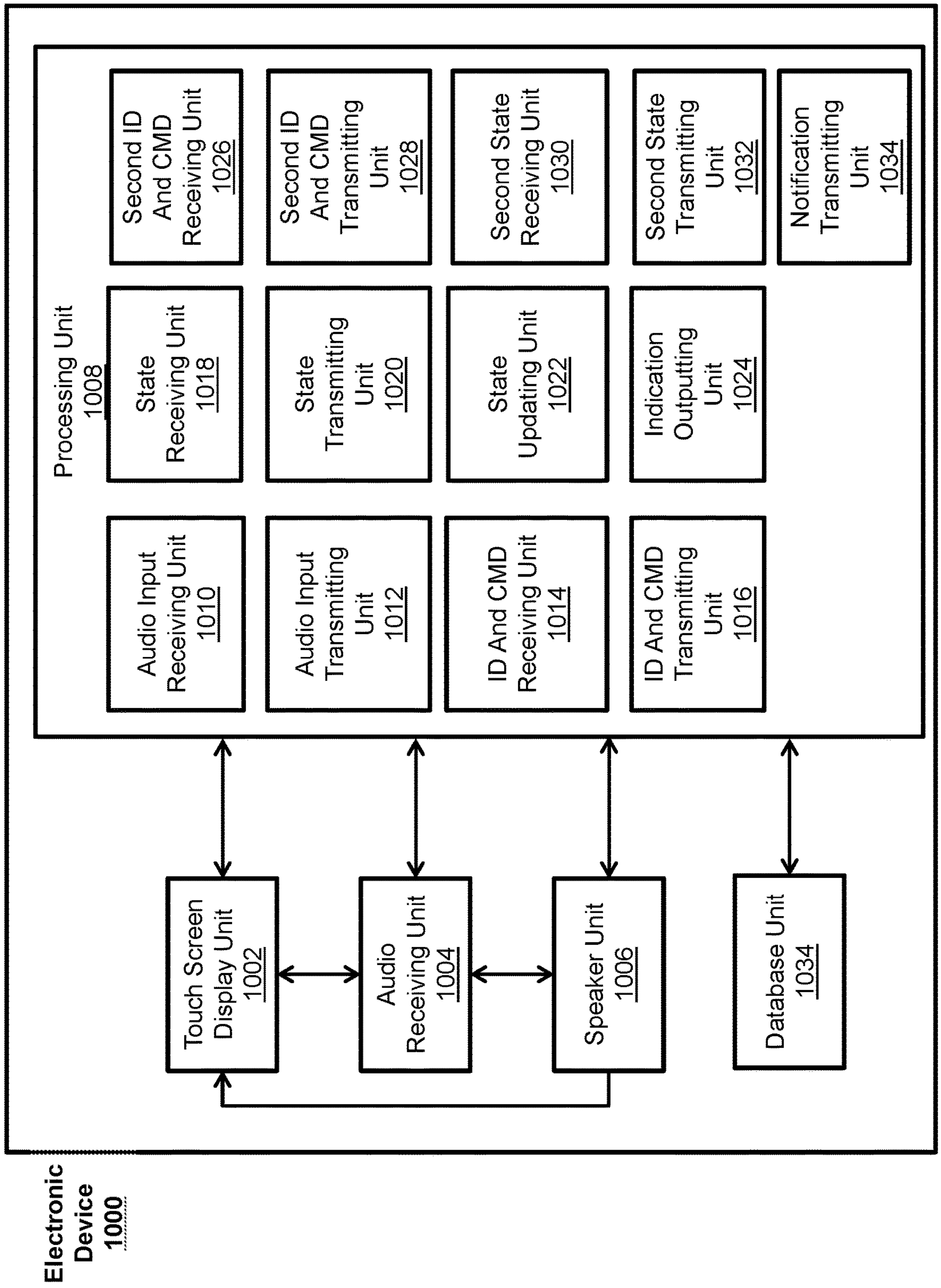
FIG. 10 illustrates a functional block diagram of an electronic device configured to control electronic devices according to various examples.

In accordance with some examples, FIG. 10 shows a functional block diagram of an electronic device 1000 configured in accordance with the principles of the various described examples. The functional blocks of the device can be implemented by hardware, software, or a combination of hardware and software to carry out the principles of the various described examples. It is understood by persons of skill in the art that the functional blocks described in FIG. 10 can be combined or separated into sub-blocks to implement the principles of the various described examples. Therefore, the description herein optionally supports any possible combination or separation or further definition of the functional blocks described herein.

As shown in FIG. 10, electronic device 1000 can include a touch screen display unit 1002 configured to display a user interface and to receive touch input, and a sound receiving unit 1004 configured to receive sound input. In some examples, electronic device 1000 can include a speaker unit 1006 configured to generate sound. Electronic device 1000 can further include a processing unit 1008 coupled to touch screen display unit 1002 and sound receiving unit 1004 (and, optionally, coupled to speaker unit 1006). In some examples, processing unit 1008 can include an audio input receiving unit 1010, an audio input transmitting unit 1012, an identification and command receiving unit 1014, an identification and command transmitting unit 1016, a state receiving unit 1018, a state transmitting unit 1020, a state updating unit 1022, an indication outputting unit 1024, a second identification and command receiving unit 1026, a second identification and command transmitting unit 1028, and a second state receiving unit 1030, a second state transmitting unit 1032, and a notification transmitting unit 1034.

Processing unit 1008 can be configured to receive an audio input (e.g., using audio input receiving unit 1010) containing user speech. Processing unit 1008 can be further configured to transmit (e.g., using audio input transmitting unit 1012) data corresponding to the audio input to one or more servers. Processing unit 1008 can be further configured to receive (e.g., using identification and command receiving unit 1014), from the one or more servers, an identification of a first electronic device determined by the one or more servers based on the data corresponding to the audio input and a first command to be performed by the first electronic device determined by the one or more servers based on the data corresponding to the audio input. The first command can be transmitted to the first electronic device (e.g., using identification and command transmitting unit 1016). A current state of the first electronic device can be received (e.g., using state receiving unit 1018) from the first electronic device after transmitting the first command to the first electronic device. The current state of the first electronic device can be transmitted (e.g., using state transmitting unit 1020) to the one or more servers.

In some examples, first electronic device includes a light bulb. In other examples, the first command includes a command to set an ON/OFF state, dimmable state, or color state of the light. In yet other examples, the current state of the first electronic device includes the ON/OFF state, dimmable state, or color state of the light bulb after transmitting the first command to set the ON/OFF state, dimmable state, or color state of the light bulb.

In some examples, first electronic device includes a switch. In other examples, the first command includes a command to set an ON/OFF state of the switch. In yet other examples, the current state of the first electronic device includes the ON/OFF state of the switch after transmitting the first command to set the ON/OFF state of the switch.

In some examples, the first electronic device includes an electrical outlet. In other examples, the first command includes a command to set an ACTIVE/INACTIVE state of the electrical outlet. In yet other examples, the current state of the first electronic device includes the ACTIVE/INACTIVE state of the electrical outlet after transmitting the command to set the ACTIVE/INACTIVE state of the electrical outlet.

In some examples, the first electronic device includes a door lock. In other examples, the first command includes a command to set a LOCKED/UNLOCKED state of the door lock. In yet other examples, the current state of the first electronic device includes the LOCKED/UNLOCKED state of the door lock after transmitting the command to set the LOCKED/UNLOCKED state of the door lock.

In some examples, the first electronic device includes a garage door. In other examples, the first command includes a command to set an OPEN/CLOSED state of the garage door. In yet other examples, the current state of the first electronic device includes the OPEN/CLOSED state of the garage door after transmitting the command to set the OPEN/CLOSED state of the garage door.

In some examples, the first electronic device includes a thermostat. In other examples, the first command includes a command to set a numerical value of a temperature setting of the thermostat. In yet other examples, the current state of the first electronic device includes the numerical value of the temperature setting of the thermostat after transmitting the first command to set the numerical value of the temperature setting of the thermostat.

In some examples, the first command includes a query for the current state of the first electronic device.

In some examples, the first command can be transmitted (e.g., using identification and command transmitting unit 1016) to first electronic device over a local wireless network.

In some examples, the first command can be transmitted to the first electronic device directly through Bluetooth, line of sight, peer-to-peer, or WiFi communication.

In some examples, processing unit 1008 can be configured to exclude querying the first electronic device for the state of the first electronic device between receiving the first command from the one or more servers and transmitting the first command to the first electronic device.

In some examples, electronic device 1000 can further include a database unit 1034 for storing a state of each of a plurality of electronic devices, the plurality of electronic devices including the first electronic device. In other examples, processing unit 1008 can be further configured to update (e.g., using state updating unit 1022) a state of the first electronic device stored in database unit 1034 based at least in part on the current state of the first electronic device received from the first electronic device.

In some examples, processing unit 1008 can be further configured to output (e.g., using indication outputting unit 1024) an indication of a result of the first command based on the first command and the current state of the first electronic device received from the first electronic device.

In some examples, electronic device 1000 can include a mobile phone, desktop computer, laptop computer, tablet computer, portable media player, television, television set-top box, or wearable electronic device.

In some examples, processing unit 1008 can be further configured to receive (e.g., using second identification and command receiving unit 1026), from the one or more servers, an identification of a second electronic device determined by the one or more servers based on the data corresponding to the audio input and a second command to be performed by the second electronic device determined by the one or more servers based on the data corresponding to the audio input. Processing unit 1008 can be further configured to transmit (e.g., using second identification and command transmitting unit 1028) the second command to the second electronic device and to receive (e.g., using second state receiving unit 1030), after transmitting the second command to the second electronic device, a current state of the second electronic device from the second electronic device. Processing unit 1008 can be further configured to transmit (e.g., using second state transmitting unit 1032) the current state of the second electronic device to the one or more servers.

In some examples, processing unit 1008 can be further configured to transmit (e.g., using notification transmitting unit 1036) a notification associated with the current state of the first electronic device in response to determining that a predetermined condition has been satisfied.

Figure 11:
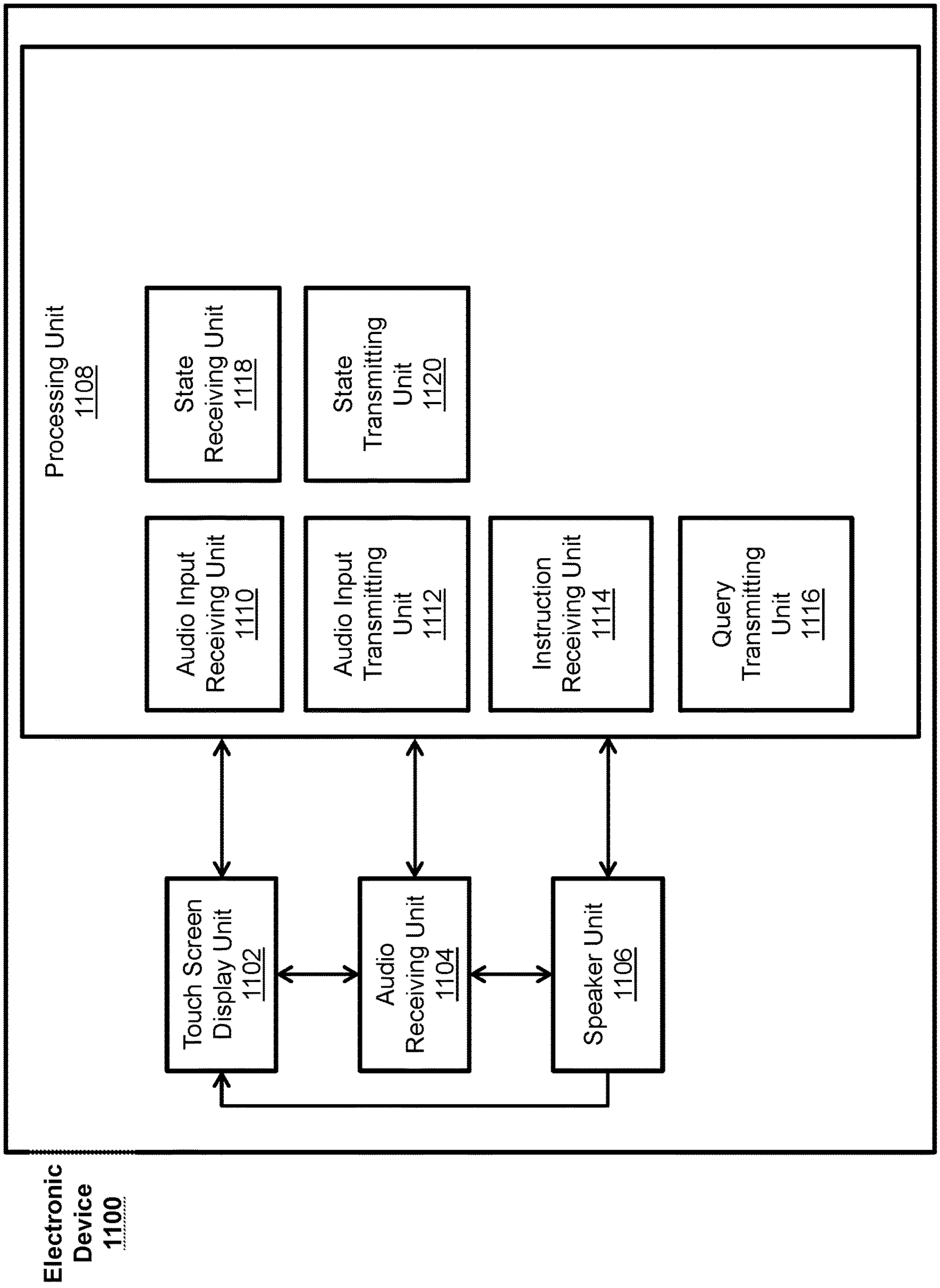
FIG. 11 illustrates a functional block diagram of an electronic device configured to store the states of electronic devices as a configuration according to various examples.

In accordance with some examples, FIG. 11 shows a functional block diagram of an electronic device 1100 configured in accordance with the principles of the various described examples. The functional blocks of the device can be implemented by hardware, software, or a combination of hardware and software to carry out the principles of the various described examples. It is understood by persons of skill in the art that the functional blocks described in FIG. 11 can be combined or separated into sub-blocks to implement the principles of the various described examples. Therefore, the description herein optionally supports any possible combination or separation or further definition of the functional blocks described herein.

As shown in FIG. 11, electronic device 1100 can include a touch screen display unit 1102 configured to display a user interface and to receive touch input, and a sound receiving unit 1104 configured to receive sound input. In some examples, electronic device 1100 can include a speaker unit 1106 configured to generate sound. Electronic device 1100 can further include a processing unit 1108 coupled to touch screen display unit 1102 and sound receiving unit 1104 (and, optionally, coupled to speaker unit 1106). In some examples, processing unit 1108 can include an audio input receiving unit 1110, an audio input transmitting unit 1112, an instruction receiving unit 1114, a query transmitting unit 1116, a state receiving unit 1118, and a state transmitting unit 1120.

Processing unit 1108 can be configured to receive an audio input (e.g., using audio input receiving unit 1110) containing user speech. Processing unit 1108 can be further configured to transmit (e.g., using audio input transmitting unit 1112) data corresponding to the audio input to one or more servers. Processing unit 1108 can be further configured to receive (e.g., using instruction receiving unit 1114), from the one or more servers, an instruction to query a state of each of a plurality of electronic devices determined by the one or more servers based on the data corresponding to the audio input. A state query can be transmitted (e.g., using query transmitting unit 1116) to each of the plurality of electronic devices, and a current state of each of the plurality of electronic devices can be received (e.g., using state receiving unit 1118) from the plurality of electronic devices. The current state of each of the plurality of electronic devices can be transmitted (e.g., using state transmitting unit 1120) to the one or more servers to be stored as a configuration.

Figure 12:
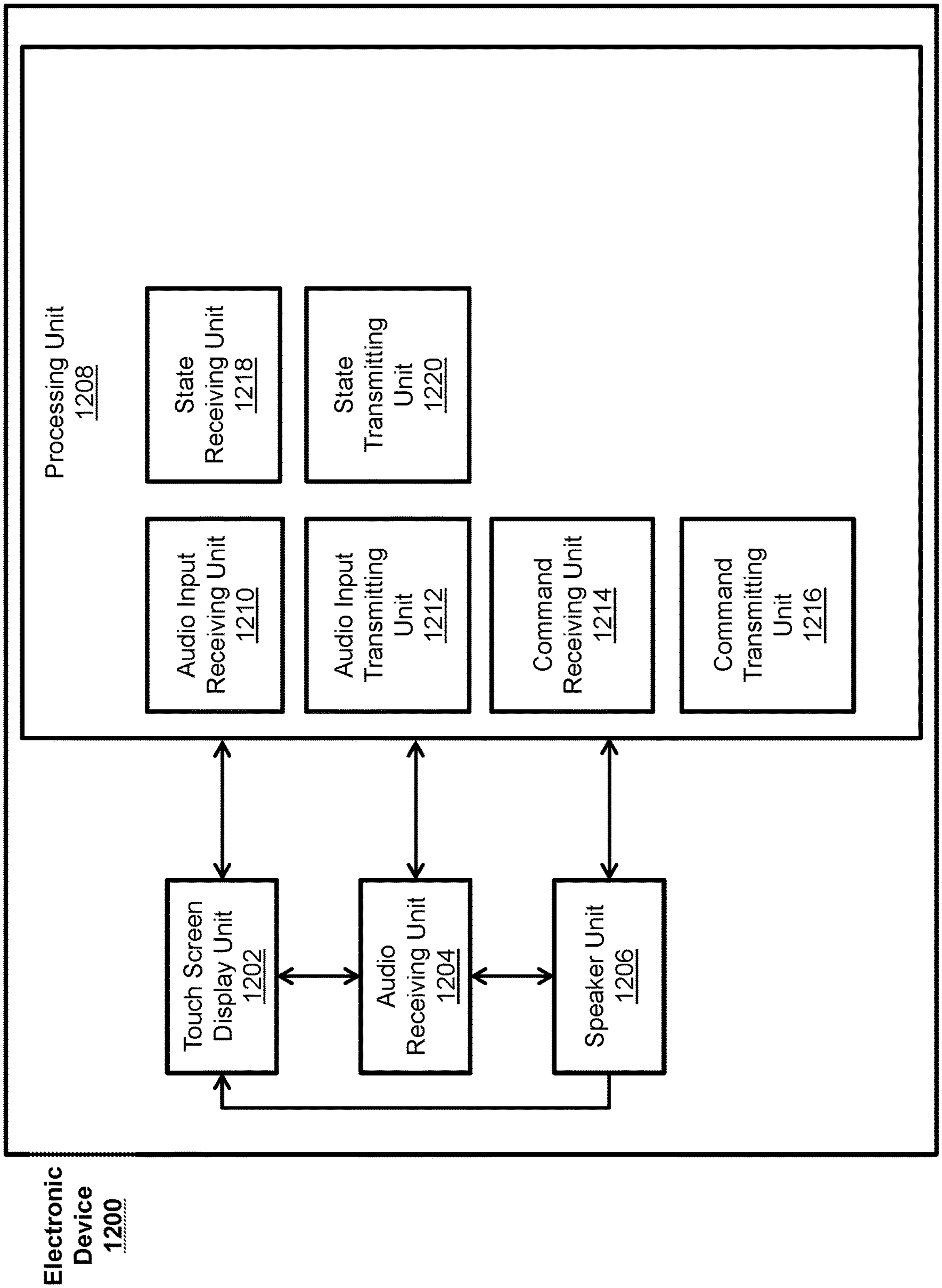
FIG. 12 illustrates a functional block diagram of an electronic device configured to set the states of electronic devices based on a stored configuration according to various examples.

In accordance with some examples, FIG. 12 shows a functional block diagram of an electronic device 1200 configured in accordance with the principles of the various described examples. The functional blocks of the device can be implemented by hardware, software, or a combination of hardware and software to carry out the principles of the various described examples. It is understood by persons of skill in the art that the functional blocks described in FIG. 12 can be combined or separated into sub-blocks to implement the principles of the various described examples. Therefore, the description herein optionally supports any possible combination or separation or further definition of the functional blocks described herein.

As shown in FIG. 12, electronic device 1200 can include a touch screen display unit 1202 configured to display a user interface and to receive touch input, and a sound receiving unit 1204 configured to receive sound input. In some examples, electronic device 1200 can include a speaker unit 1206 configured to generate sound. Electronic device 1200 can further include a processing unit 1208 coupled to touch screen display unit 1202 and sound receiving unit 1204 (and, optionally, coupled to speaker unit 1206). In some examples, processing unit 1208 can include an audio input receiving unit 1210, an audio input transmitting unit 1212, an instruction receiving unit 1214, a query transmitting unit 1216, a state receiving unit 1218, and a state transmitting unit 1220.

In some examples, processing unit 1208 can be further configured to receive (e.g., using audio input receiving unit 1210) an audio input including a user speech, transmit (e.g., using audio input transmitting unit 1212) data corresponding to the audio input to the one or more servers, and receive (e.g., using command receiving unit 1214), from the one or more servers, a plurality of commands to set the state of each of the plurality of electronic devices determined by the one or more servers based on a stored configuration. Processing unit 1208 can be further configured to transmit (e.g., using command transmitting unit 1216) the plurality of commands to the plurality of electronic devices. Processing unit 1208 can be further configured to receive (e.g., using state receiving unit 1218) an updated state of each of the plurality of electronic devices from the plurality of electronic devices and to transmit (e.g., using state transmitting unit 1220) the updated state of each of the plurality of electronic devices to the one or more servers.

Figure 13:
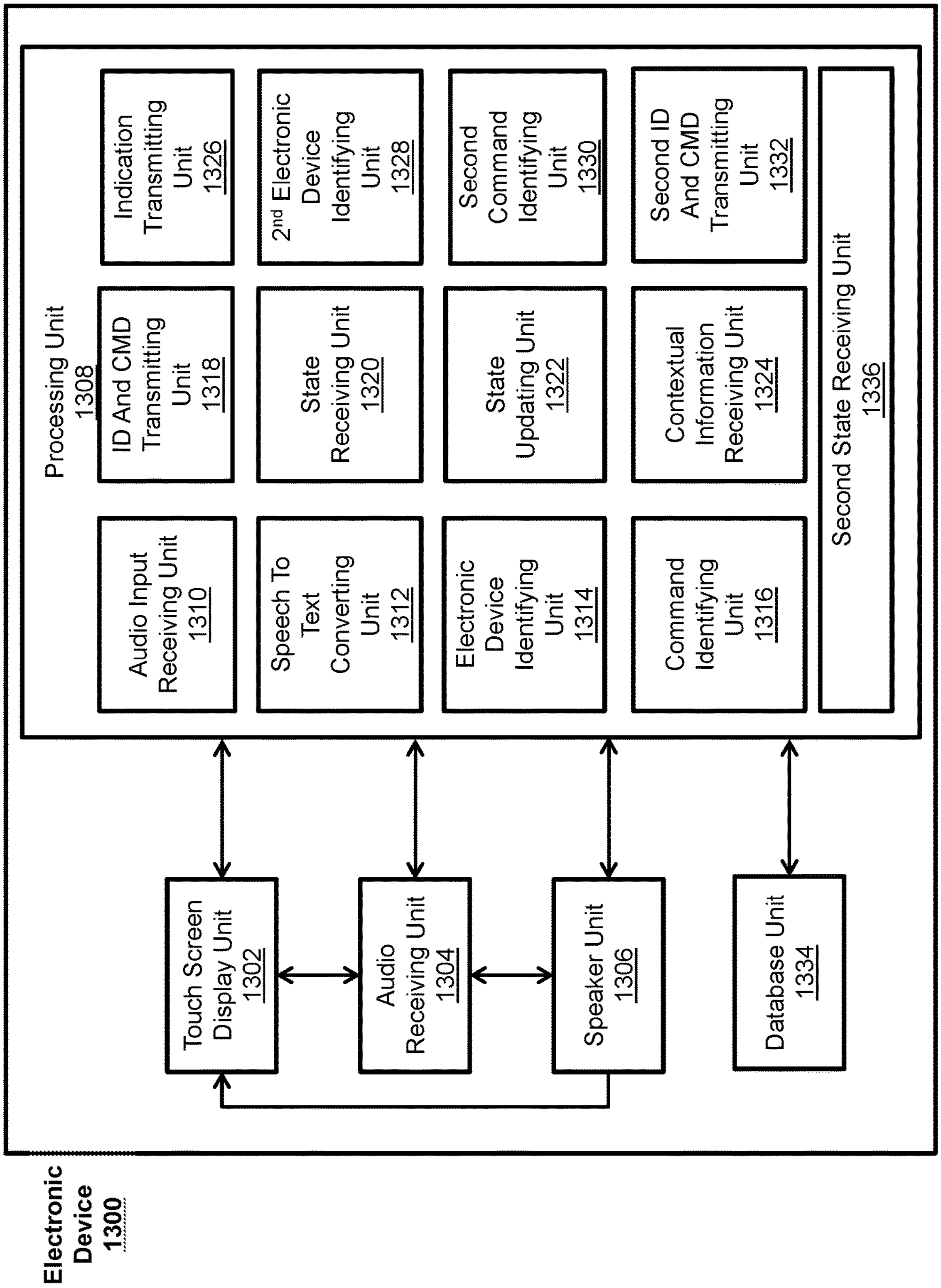
FIG. 13 illustrates a functional block diagram of an electronic device configured to control electronic devices according to various examples.

As shown in FIG. 13, electronic device 1300 can include a touch screen display unit 1302 configured to display a user interface and to receive touch input, and a sound receiving unit 1304 configured to receive sound input. In some examples, electronic device 1300 can include a speaker unit 1306 configured to generate sound. Electronic device 1300 can further include a processing unit 1308 coupled to touch screen display unit 1302 and sound receiving unit 1304 (and, optionally, coupled to speaker unit 1306). In some examples, processing unit 1308 can include an audio input receiving unit 1310, speech-to-text converting unit 1312, an electronic device identifying unit 1314, a command identifying unit 1316, an identification and command transmitting unit 1318, a state receiving unit 1320, a state updating unit 1322, a contextual information receiving unit 1324, an indication transmitting unit 1326, a second electronic device identifying unit 1328, a second command identifying unit 1330, a second identification and command transmitting unit 1332, and a second state receiving unit 1336.

Processing unit 1308 can be configured to receive data corresponding to an audio input (e.g., using audio input receiving unit 1310) containing user speech. Processing unit 1308 can be further configured perform (e.g., using speech to text converting unit 1312) speech-to-text conversion on the data corresponding to the audio input to generate a textual representation of the user speech. Processing unit 1308 can be further configured to identify (e.g., using electronic device identifying unit 1314) a first electronic device based on the textual representation of the user speech. Processing unit 1308 can be further configured to identify (e.g., using command identifying unit 1316) a first command to be performed by the first electronic device based on the textual representation of user speech. Processing unit 1308 can be further configured to transmit (e.g., using identification and command transmitting unit 1318) an identification of the first electronic device and the first command to the user device. Processing unit 1308 can be further configured to receive (e.g., using state receiving unit 1320) a current state of the first electronic device.

In some examples, first electronic device includes a light bulb. In other examples, the first command includes a command to set an ON/OFF state, dimmable state, or color state of the light. In yet other examples, the current state of the first electronic device includes the ON/OFF state, dimmable state, or color state of the light bulb after transmitting the first command to set the ON/OFF state, dimmable state, or color state of the light bulb.

In some examples, the first electronic device includes an electrical outlet. In other examples, the first command includes a command to set an ACTIVE/INACTIVE state of the electrical outlet. In yet other examples, the current state of the first electronic device includes the ACTIVE/INACTIVE state of the electrical outlet after transmitting the command to set the ACTIVE/INACTIVE state of the electrical outlet.

In some examples, the first electronic device includes a switch. In other examples, the first command includes a command to set an ON/OFF state of the switch. In yet other examples, the current state of the first electronic device includes the ON/OFF state of the electrical outlet after transmitting the command to set the ON/OFF state of the switch.

In some examples, the first electronic device includes a door lock. In other examples, the first command includes a command to set a LOCKED/UNLOCKED state of the door lock. In yet other examples, the current state of the first electronic device includes the LOCKED/UNLOCKED state of the door lock after transmitting the command to set the LOCKED/UNLOCKED state of the door lock.

In some examples, the first electronic device includes a garage door. In other examples, the first command includes a command to set an OPEN/CLOSED state of the garage door. In yet other examples, the current state of the first electronic device includes the OPEN/CLOSED state of the garage door after transmitting the command to set the OPEN/CLOSED state of the garage door.

In some examples, the first electronic device includes a thermostat. In other examples, the first command includes a command to set a numerical value of a temperature setting of the thermostat. In yet other examples, the current state of the first electronic device includes the numerical value of the temperature setting of the thermostat after transmitting the first command to set the numerical value of the temperature setting of the thermostat.

In some examples, the first command includes a query for the current state of the first electronic device.

In some examples, electronic device 1300 further includes a database unit 1334 for storing a name, a type, and a state of each of a plurality of electronic devices, the plurality of electronic devices comprising the first electronic device. In other examples, processing unit 1308 can be further configured to update (e.g., using state updating unit 1322) the state of the first electronic device stored in database unit 1334 based on the current state of the first electronic device.

In some examples, processing unit 1308 can be further configured to receive (e.g., using contextual information receiving unit 1324) contextual information within the data corresponding to the audio input from the user device. In other examples, processing unit 1308 can be further configured to identify (e.g., using electronic device identifying unit 1314) the first electronic device based on the contextual information. In yet other examples, processing unit 1308 can be further configured to identify (e.g., using command identifying unit 1316) the first command based on the contextual information. In some examples, the contextual information includes an orientation of the user device when the user device received the audio input or a location of the user device when the user device received the audio input.

In some examples, the textual representation of the user speech excludes the name of the first electronic device. In other examples, the textual representation of the user speech excludes the type of the first electronic device.

In some examples, electronic device 1300 includes a mobile phone, desktop computer, laptop computer, tablet computer, portable media player, television, television set-top box, or wearable electronic device.

In some examples, processing unit 1308 can be further configured to transmit (e.g., using identification and command transmitting unit 1318) the identification of the first electronic device and the first command to the user device, and to receive (e.g., using state receiving unit 1320) the current state of the first electronic device from the user device.

In other examples, processing unit 1308 can be further configured to transmit (e.g., using identification and command transmitting unit 1318) the identification of the first electronic device and the first command to a second user device, and to receive (e.g., using state receiving unit 1320) the current state of the first electronic device from the second user device.

In other examples, processing unit 1308 can be further configured to transmit (e.g., using indication transmitting unit 1326) an indication to the second user device of a result of the first command based on the first command and the current state of the first electronic device.

In other examples, processing unit 1308 can be further configured to identify (e.g., using second electronic device identifying unit 1328) a second electronic device based on the textual representation of the user speech, identify (e.g., using second command identifying unit 1330) a second command to be performed by the second electronic device based on the textual representation of the user speech, transmit (e.g., using second identification and command transmitting unit 1332) an identification of the second electronic device and the second command, and receive (e.g., using second state receiving unit 1336) a current state of the second electronic device.

Figure 14:
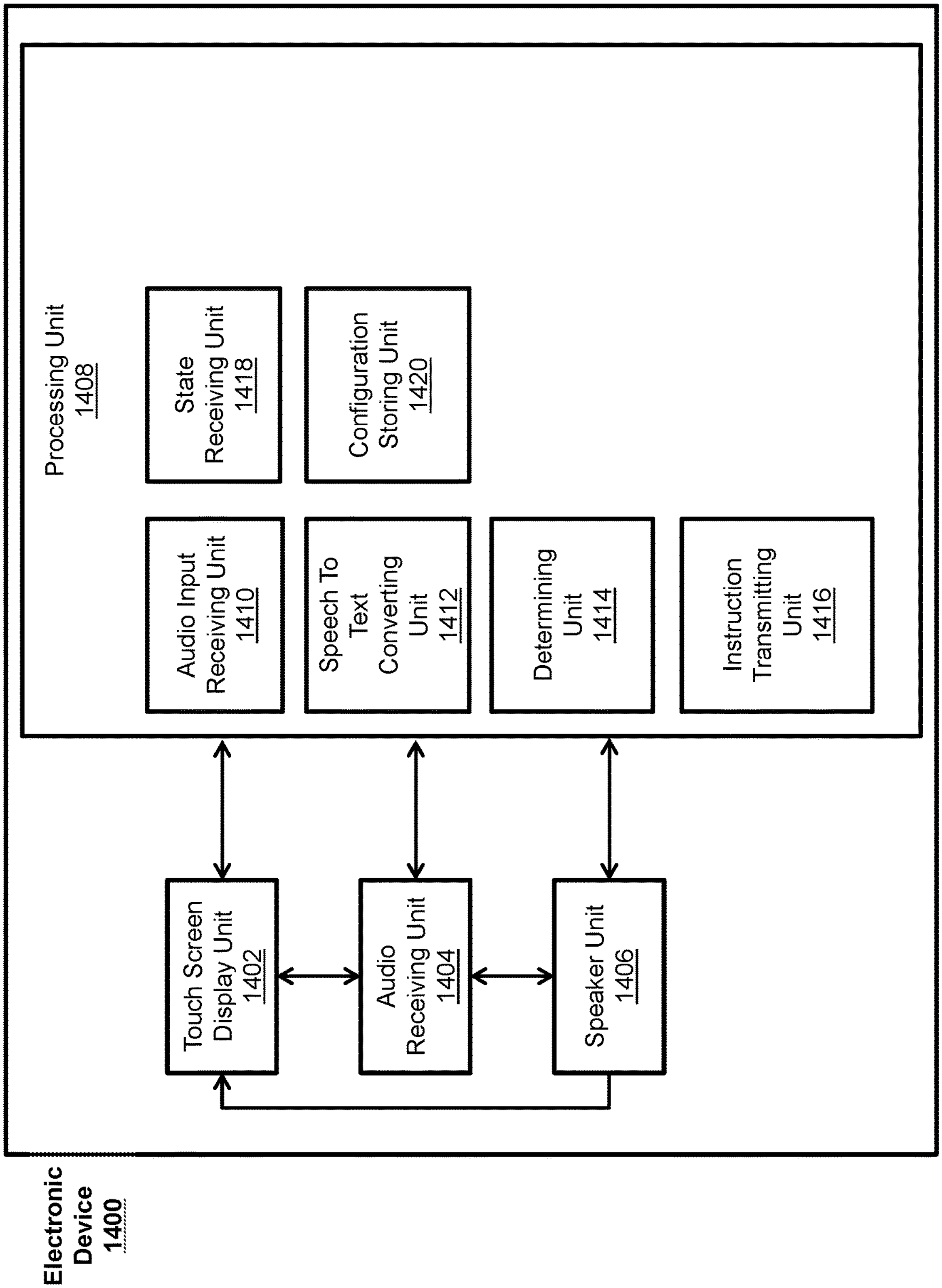
FIG. 14 illustrates a functional block diagram of an electronic device configured to store the states of electronic devices as a configuration according to various examples.

As shown in FIG. 14, electronic device 1400 can include a touch screen display unit 1402 configured to display a user interface and to receive touch input, and a sound receiving unit 1404 configured to receive sound input. In some examples, electronic device 1400 can include a speaker unit 1406 configured to generate sound. Electronic device 1400 can further include a processing unit 1408 coupled to touch screen display unit 1402 and sound receiving unit 1404 (and, optionally, coupled to speaker unit 1406). In some examples, processing unit 1408 can include an audio input receiving unit 1410, speech-to-text converting unit 1412, a determining unit 1414, an instruction transmitting unit 1416, a state receiving unit 1416, a configuration storing unit 1420, a second audio input receiving unit 1422, a second speech to text converting unit 1424, a second determining unit 1426, a command transmitting unit 1428, and a second state receiving unit 1430.

Processing unit 1408 can be configured to receive (e.g., using audio input receiving unit 1410) data corresponding to an audio input comprising a user speech from a user device. Processing unit 1408 can be further configured perform (e.g., using speech to text converting unit 1412) speech-to-text conversion on the data corresponding to the audio input to generate a textual representation of the user speech. Processing unit 1408 can be further configured to determine (e.g., using determining unit 1414) that the textual representation of the user speech represents a user intent to store a state of each of a plurality of electronic devices as a configuration. Processing unit 1408 can be further configured to transmit (e.g., using instruction transmitting unit 1416) an instruction to query the state of each of the plurality of electronic devices. Processing unit 1408 can be further configured to receive (e.g., using state receiving unit 1418) a current state of each of the plurality of electronic devices. Processing unit 1408 can be further configured to store (e.g., using configuration storing unit 1420) the received current state of each of the plurality of electronic devices as the configuration.

Figure 15:
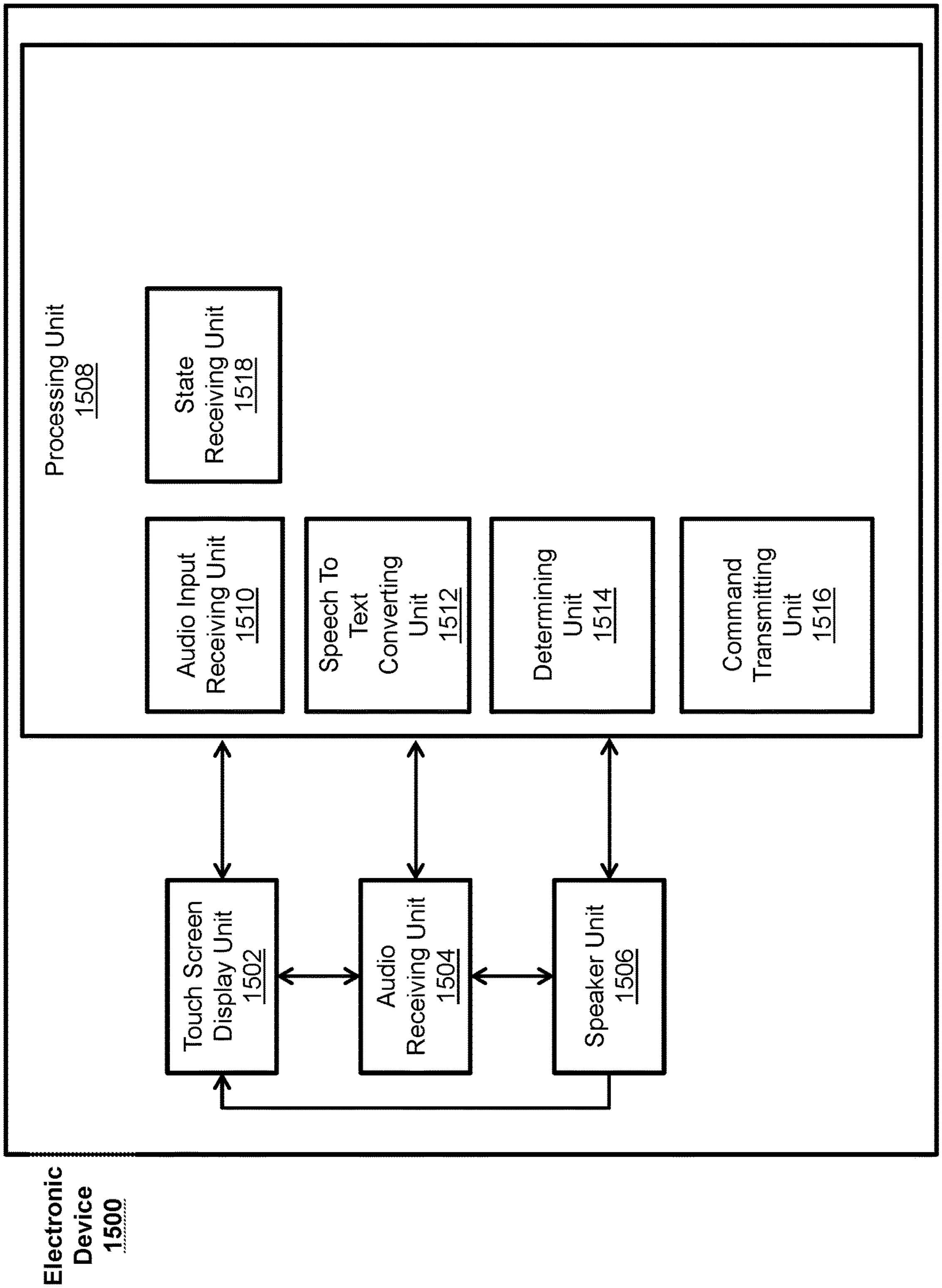
FIG. 15 illustrates a functional block diagram of an electronic device configured to set the states of electronic devices based on a stored configuration according to various examples.

As shown in FIG. 15, electronic device 1500 can include a touch screen display unit 1502 configured to display a user interface and to receive touch input, and a sound receiving unit 1504 configured to receive sound input. In some examples, electronic device 1500 can include a speaker unit 1506 configured to generate sound. Electronic device 1500 can further include a processing unit 1508 coupled to touch screen display unit 1502 and sound receiving unit 1504 (and, optionally, coupled to speaker unit 1506). In some examples, processing unit 1408 can include an audio input receiving unit 1510, speech-to-text converting unit 1512, a determining unit 1514, an instruction transmitting unit 1516, a state receiving unit 1516, a configuration storing unit 1520, a second audio input receiving unit 1522, a second speech to text converting unit 1524, a second determining unit 1526, a command transmitting unit 1528, and a second state receiving unit 1530.

In some examples, processing unit 1508 can be further configured to receive (e.g., using audio input receiving unit 1510) data corresponding to an audio input comprising a user speech, perform (e.g., using speech to text converting unit 1512) speech-to-text conversion on the data corresponding to the audio input to generate a textual representation of the user speech, determine (e.g., using determining unit 1514) that the textual representation of the user speech represents a user intent to change the state of each of the plurality of electronic devices based on the configuration, transmit (e.g., using command transmitting unit 1516) a plurality of commands to set the state of each of the plurality of electronic devices based on the configuration, and receive (e.g., using state receiving unit 1518) an updated state of each of the plurality of electronic devices.

As described above, one aspect of the present technology is the gathering and use of data available from various sources to improve the delivery to users of invitational content or any other content that may be of interest to them. The present disclosure contemplates that in some instances, this gathered data can include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A user device comprising:

one or more processors;

memory; and one or more programs, wherein the one or more programs are stored in the memory and configured to be executed by the one or more processors, the one or more programs including instructions for:

receiving, by the user device, an audio input comprising a user speech;

transmitting data corresponding to the audio input to one or more servers;

receiving, from the one or more servers:

a plurality of commands to set a state of each of a plurality of electronic devices determined by the one or more servers based on a stored configuration, wherein the stored configuration defines a state of each of the plurality of electronic devices to use in response to a command that references the configuration; and identifications associated with each of the plurality of commands, wherein the identifications identify each of the plurality of electronic devices for performing each of the plurality of commands; and transmitting the plurality of commands to the plurality of electronic devices based on the identifications associated with each of the plurality of commands.

2. The user device of claim 1, wherein the one or more programs comprise further instructions for:

before transmitting the plurality of commands, querying each of the plurality of electronic devices to determine a current state of each of the plurality of electronic devices.

3. The user device of claim 1, wherein the one or more programs comprise further instructions for:

after transmitting the plurality of commands, receiving an updated state of each of the plurality of electronic devices from the plurality of electronic devices; and transmitting the updated state of each of the plurality of electronic devices to the one or more servers.

4. The user device of claim 3, wherein the one or more programs comprise further instructions for: outputting an indication of a result of each of the plurality of commands based on the updated state of each of the plurality of electronic devices received from the plurality of electronic devices.

5. The user device of claim 4, wherein the indication of the result of each of the plurality of commands is an audio indication, a visual indication, or both an audio and a visual indication.

6. The user device of claim 3, wherein the plurality of electronic devices comprises a light bulb.

7. The user device of claim 6, wherein the plurality of commands comprises a command to set an ON/OFF state, dimmable state, or color state of the light bulb.

8. The user device of claim 7, wherein the updated state of the light bulb comprises the ON/OFF state, dimmable state, or color state of the light bulb after transmitting the command to set the ON/OFF state, dimmable state, or color state of the light bulb.

9. The user device of claim 3, wherein the plurality of electronic devices comprises an electrical outlet.

10. The user device of claim 9, wherein the plurality of commands comprises a command to set an ACTIVE/INACTIVE state of the electrical outlet.

11. The user device of claim 10, wherein the updated state of the electrical outlet comprises the ACTIVE/INACTIVE state of the electrical outlet after transmitting the command to set the ACTIVE/INACTIVE state of the electrical outlet.

12. The user device of claim 3, wherein the plurality of electronic devices comprises a switch.

13. The user device of claim 12, wherein the plurality of commands comprises a command to set an ON/OFF state of the switch.

14. The user device of claim 13, wherein the updated state of the electrical outlet comprises the ON/OFF state of the electrical outlet after transmitting the command to set the ON/OFF state of the switch.

15. The user device of claim 3, wherein the plurality of electronic devices comprises a door lock.

16. The user device of claim 15, wherein the plurality of commands comprises a command to set a LOCKED/UNLOCKED state of the door lock.

17. The user device of claim 16, wherein the updated state of the door lock comprises the LOCKED/UNLOCKED state of the door lock after transmitting the command to set the LOCKED/UNLOCKED state of the door lock.

18. The user device of claim 3, wherein the plurality of electronic devices comprises a garage door.

19. The user device of claim 18, wherein the plurality of commands comprises a command to set an OPEN/CLOSED state of the garage door.

20. The user device of claim 19, wherein the updated state of the garage door comprises the OPEN/CLOSED state of the garage door after transmitting the command to set the OPEN/CLOSED state of the garage door.

21. The user device of claim 3, wherein the plurality of electronic devices comprises a thermostat.

22. The user device of claim 21, wherein the plurality of commands comprises a command to set a numerical value of a temperature setting of the thermostat.

23. The user device of claim 22, wherein the updated state of the thermostat comprises the numerical value of the temperature setting of the thermostat after transmitting the command to set the numerical value of the temperature setting of the thermostat.

24. The user device of claim 3, wherein the user device comprises a database for storing a current state of each of the plurality of electronic devices, and wherein the current state of each of the plurality of electronic devices is updated based at least in part on the updated state of each of the plurality of electronic devices received from the plurality of electronic devices.

25. The user device of claim 1, wherein the plurality of commands are transmitted to the plurality of electronic devices in response to a determination that a predetermined condition is satisfied.

26. The user device of claim 25, wherein the determination that a predetermined condition is satisfied comprises determining that the user device enters a predetermined area.

27. The user device of claim 25, wherein the determination that a predetermined condition is satisfied comprises determining that the user device exits a predetermined area during a predetermined window of time.

28. A method for controlling a plurality of electronic devices using a virtual assistant on a user device having one or more processors and a memory, the method comprising:
at the user device:
receiving an audio input comprising a user speech;
transmitting data corresponding to the audio input to one or more servers;
receiving, from the one or more servers:
a plurality of commands to set a state of each of a plurality of electronic devices determined by the one or more servers based on a stored configuration, wherein the stored configuration defines a state of each of the plurality of electronic devices to use in response to a command that references the configuration; and
identifications associated with each of the plurality of commands, wherein the identifications identify each of the plurality of electronic devices for performing each of the plurality of commands; and
transmitting the plurality of commands to the plurality of electronic devices based on the identifications associated with each of the plurality of commands.

29. The method of claim 28, further comprising:
before transmitting the plurality of commands, querying each of the plurality of electronic devices to determine a current state of each of the plurality of electronic devices.

30. The method of claim 28, further comprising:
after transmitting the plurality of commands, receiving an updated state of each of the plurality of electronic devices from the plurality of electronic devices; and
transmitting the updated state of each of the plurality of electronic devices to the one or more servers.

31. The method of claim 28, wherein the plurality of commands are transmitted to the plurality of electronic devices in response to a determination that a predetermined condition is satisfied.

32. The method of claim 31, wherein the determination that a predetermined condition is satisfied comprises determining that the user device enters a predetermined area.

33. The method of claim 31, wherein the determination that a predetermined condition is satisfied comprises determining that the user device exits a predetermined area during a predetermined window of time.

34. A non-transitory computer-readable storage medium comprising instructions for one or more programs for execution by one or more processors of a user device, the one or more programs including instructions which, when executed by the one or more processors, cause the user device to perform the method of:
receiving an audio input comprising a user speech;
transmitting data corresponding to the audio input to one or more servers;
receiving, from the one or more servers:
a plurality of commands to set a state of each of a plurality of electronic devices determined by the one or more servers based on a stored configuration, wherein the stored configuration defines a state of each of the plurality of electronic devices to use in response to a command that references the configuration; and
identifications associated with each of the plurality of commands, wherein the identifications identify each of the plurality of electronic devices for performing each of the plurality of commands; and
transmitting the plurality of commands to the plurality of electronic devices based on the identifications associated with each of the plurality of commands.

35. The non-transitory computer-readable storage medium of claim 34, wherein the one or more programs comprise further instructions for:
before transmitting the plurality of commands, querying each of the plurality of electronic devices to determine a current state of each of the plurality of electronic devices.

36. The non-transitory computer-readable storage medium of claim 34, wherein the one or more programs comprise further instructions for:
after transmitting the plurality of commands, receiving an updated state of each of the plurality of electronic devices from the plurality of electronic devices; and
transmitting the updated state of each of the plurality of electronic devices to the one or more servers.

37. The non-transitory computer-readable storage medium of claim 34, wherein the plurality of commands are transmitted to the plurality of electronic devices in response to a determination that a predetermined condition is satisfied.

38. The non-transitory computer-readable storage medium of claim 37, wherein the determination that a predetermined condition is satisfied comprises determining that the user device enters a predetermined area.

39. The non-transitory computer-readable storage medium of claim 37, wherein the determination that a predetermined condition is satisfied comprises determining that the user device exits a predetermined area during a predetermined window of time.

* * * * *